United States Patent
Murakami et al.

(10) Patent No.: US 11,296,788 B2
(45) Date of Patent: Apr. 5, 2022

(54) RECEPTION DEVICE AND RECEPTION METHOD

(71) Applicant: Panasonic Intellectual Property Corporation of America, Torrance, CA (US)

(72) Inventors: Yutaka Murakami, Kanagawa (JP); Ryutaro Monden, Osaka (JP); Nobuhiko Hashida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 70 days.

(21) Appl. No.: 16/697,475

(22) Filed: Nov. 27, 2019

(65) Prior Publication Data

US 2020/0099447 A1 Mar. 26, 2020

Related U.S. Application Data

(63) Continuation of application No. PCT/JP2018/020427, filed on May 29, 2018.

(60) Provisional application No. 62/532,028, filed on Jul. 13, 2017, provisional application No. 62/513,608, filed on Jun. 1, 2017.

(51) Int. Cl.
*H04B 10/116* (2013.01)
*G06K 9/20* (2006.01)
*H04N 5/232* (2006.01)

(52) U.S. Cl.
CPC ......... *H04B 10/116* (2013.01); *G06K 9/209* (2013.01); *H04N 5/23203* (2013.01); *H04N 5/23212* (2013.01)

(58) Field of Classification Search
CPC .... H04B 10/116; H04B 10/114; H04B 10/60; H04B 10/502; H04B 10/1141
See application file for complete search history.

(56) References Cited

U.S. PATENT DOCUMENTS

| | | | | |
|---|---|---|---|---|
| 9,252,879 | B2 * | 2/2016 | Muguruma | H04B 10/116 |
| 10,348,401 | B2 * | 7/2019 | Xu | H04B 10/07953 |
| 10,382,130 | B1 * | 8/2019 | Inskeep | H04B 10/116 |
| 10,742,319 | B2 * | 8/2020 | Murakami | H04W 48/08 |
| 10,778,331 | B2 * | 9/2020 | Murakami | B64D 11/0015 |
| 10,862,585 | B1 * | 12/2020 | Murakami | H04B 10/25752 |
| 10,887,023 | B1 * | 1/2021 | Leefer | H04W 4/46 |

(Continued)

FOREIGN PATENT DOCUMENTS

| | | |
|---|---|---|
| JP | 06083145 B2 * | 10/1994 |
| JP | 2001-292107 | 10/2001 |

(Continued)

OTHER PUBLICATIONS

Y. Goto et al., "A New Automotive VLC System Using Optical Communication Image Sensor," in IEEE Photonics Journal, vol. 8, No. 3, pp. 1-17, Jun. 2016, Art No. 6802716, doi: 10.1109/JPHOT.2016.2555582. (Year: 2016).*

(Continued)

*Primary Examiner* — John Villecco
(74) *Attorney, Agent, or Firm* — Wenderoth, Lind & Ponack, L.L.P.

(57) ABSTRACT

A reception device includes: an image sensor that captures an image, and a reception unit configured to sample a plurality of pixels included in each of N (N being an integer greater than or equal to two) regions included in an imaging surface of the image sensor to receive, in parallel, N mutually different optical signals transmitted from a plurality of light sources.

6 Claims, 69 Drawing Sheets

(56) References Cited

U.S. PATENT DOCUMENTS

| | | | |
|---|---|---|---|
| 2001/0040713 | A1 | 11/2001 | Haruyama |
| 2009/0317088 | A1* | 12/2009 | Niiho ................. H04B 10/1121 398/135 |
| 2012/0157159 | A1* | 6/2012 | Jang ..................... H04B 10/116 455/556.1 |
| 2013/0293722 | A1* | 11/2013 | Chen ......................... F21V 5/02 348/164 |
| 2016/0020855 | A1* | 1/2016 | Guetta ................. H04B 10/116 398/130 |
| 2017/0138571 | A1* | 5/2017 | Chen .................... F21V 23/0471 |
| 2017/0280082 | A1* | 9/2017 | Aoyama ................ H04N 5/378 |
| 2017/0317748 | A1* | 11/2017 | Krapf .................. H04B 10/116 |
| 2020/0092004 | A1* | 3/2020 | Murakami ......... H04B 10/1149 |
| 2020/0153507 | A1* | 5/2020 | Murakami ............... H04N 7/22 |
| 2020/0313768 | A1* | 10/2020 | Cox .......................... G06T 7/20 |
| 2020/0313774 | A1* | 10/2020 | Murakami ........... H04B 10/116 |
| 2020/0328809 | A1* | 10/2020 | Murakami ............ H04W 48/16 |
| 2021/0050916 | A1* | 2/2021 | Murakami ............ H04W 12/06 |
| 2021/0320721 | A1* | 10/2021 | Weverka ................ H04B 10/25 |
| 2021/0344419 | A1* | 11/2021 | Berner ................. H04B 10/114 |

FOREIGN PATENT DOCUMENTS

| | | | |
|---|---|---|---|
| JP | 2007019936 | A * | 1/2007 |
| JP | 2007-33653 | | 2/2007 |
| JP | 2007201681 | A * | 8/2007 |
| JP | 2012080477 | A * | 4/2012 |
| JP | 2014-225781 | | 12/2014 |

OTHER PUBLICATIONS

T. Yamazato et al., "Image-sensor-based visible light communication for automotive applications," in IEEE Communications Magazine, vol. 52, No. 7, pp. 88-97, Jul. 2014, doi: 10.1109/MCOM.2014.6852088. (Year: 2014).*

I. Takai, S. Ito, K. Yasutomi, K. Kagawa, M. Andoh and S. Kawahito, "LED and CMOS Image Sensor Based Optical Wireless Communication System for Automotive Applications," in IEEE Photonics Journal, vol. 5, No. 5, p. 6801418-6801418, Oct. 2013, Art No. 6801418, doi: 10.1109/JPHOT.2013.2277881. (Year: 2013).*

I. Takai, T. Harada, M. Andoh, K. Yasutomi, K. Kagawa and S. Kawahito, "Optical Vehicle-to-Vehicle Communication System Using LED Transmitter and Camera Receiver," in IEEE Photonics Journal, vol. 6, No. 5, pp. 1-14, Oct. 2014, Art No. 7902513, doi: 10.1109/JPHOT.2014.2352620. (Year: 2014).*

Extended European Search Report dated May 27, 2020 in corresponding European Patent Application No. 18809390.0.

International Search Report (ISR) dated Aug. 21, 2018 in International (PCT) Application No. PCT/JP2018/020427.

Seigo Ito, et al., "Bayesian Based Location Estimation System Using Wireless LAN", Third IEEE Conference on Pervasive Computing and Communications Workshops, pp. 273-278, 2005.

Jyunichi Akita, "Advanced Image Sensor", The Journal of The Institute of Image Information and Television Engineers, vol. 66, No. 3, pp. 172-173, 2012, with partial translation & cited in the specification.

Shigetoshi Sugawa, "High Speed Technology Trends in CMOS Image Sensors", The Journal of The Institute of Image Information and Television Engineers, vol. 66, No. 3, pp. 174-177, 2012, with partial translation & cited in the specification.

Mikio Ihama, et al., "Proposal of New Organic CMOS Image Sensor for Reduction in Pixel Size", Fujifilm Research & Development, No. 55, pp. 14-17, 2010, with partial translation & cited in the specification.

* cited by examiner

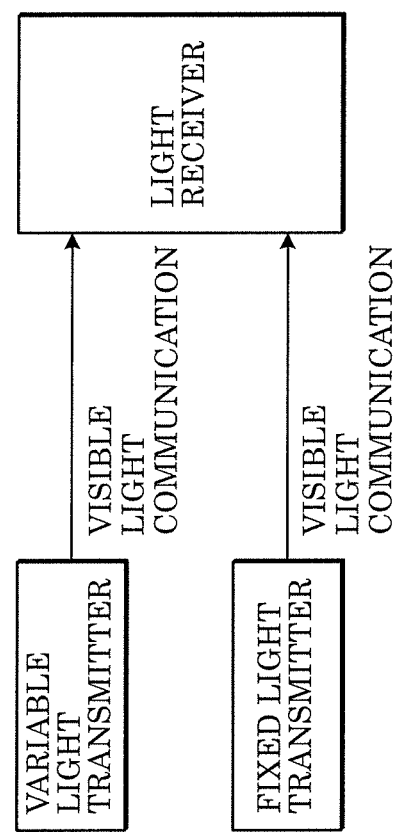

FIG. 55
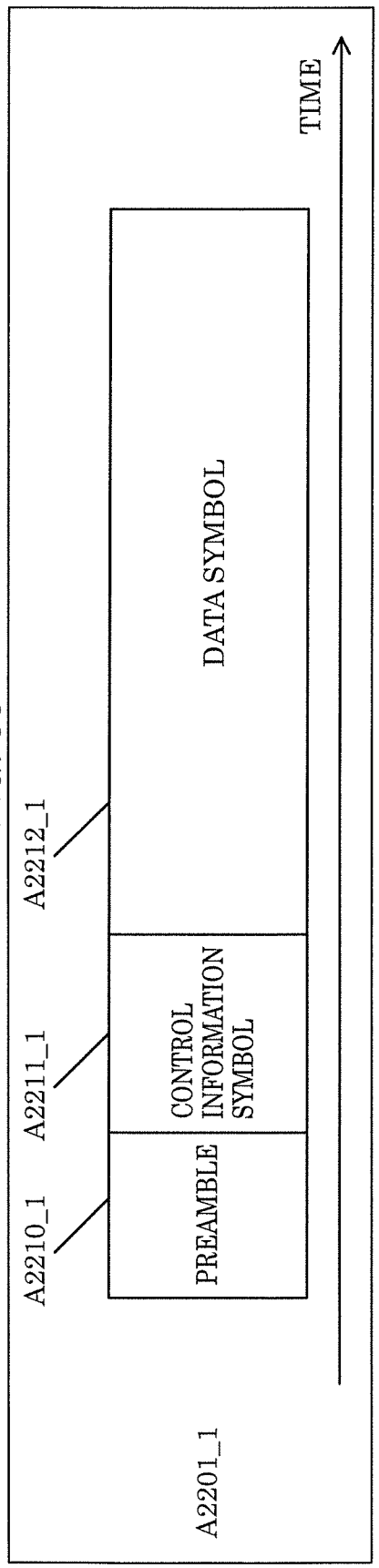
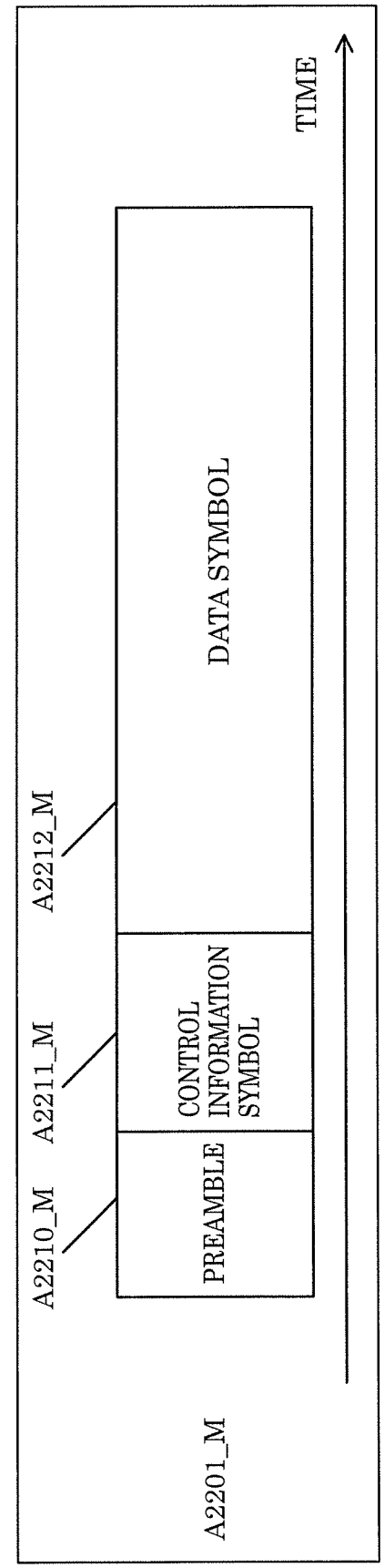

RECEPTION DEVICE AND RECEPTION METHOD

CROSS REFERENCE TO RELATED APPLICATION

This application is a U.S. continuation application of PCT International Patent Application Number PCT/JP2018/020427 filed on May 29, 2018, claiming the benefit of priority of U.S. Provisional Patent Application No. 62/513,608 filed on Jun. 1, 2017 and U.S. Provisional Patent Application No. 62/532,028 filed on Jul. 13, 2017. The entire disclosures of the above-identified applications, including the specifications, drawings and claims are incorporated herein by reference in their entirety.

FIELD

The present disclosure is related to a reception device and a reception method.

BACKGROUND

Terminals can use global positioning system (GPS) as a method for obtaining information on, for example, its own position, in order to use services that are based on the position of the terminal. With methods that use GPS, the terminals receive modulated signals transmitted from a satellite, and estimate location by performing positioning calculation. However, it is difficult for a terminal to estimate its own location when reception of the radio waves transmitted by the satellite is difficult (such as when the terminal is indoors).

For example, one method used by a terminal to estimate its own position in such a situation is disclosed in non-patent literature (NPL) 1. As disclosed in NPL 1, there is a method by which the terminal uses radio waves transmitted from an access point (AP) of a wireless local area network (LAN) to estimate information such as its own location.

CITATION LIST

Non-Patent Literature

[Non-Patent Literature 1]
Bayesian based location estimation system using wireless LAN, Third IEEE Conference on Pervasive Computing and Commun. Workshops, pp. 273-278, 2005.
[Non-Patent Literature 2]
"Advanced Image Sensor", The Journal of The Institute of Image Information and Television Engineers, vol. 66, no. 3, pp. 172-173, 2012.
[Non-Patent Literature 3]
"High Speed Technology Trends in CMOS Image Sensors", The Journal of The Institute of Image Information and Television Engineers, vol. 66, no. 3, pp. 174-177, 2012.
[Non-Patent Literature 4]
"Proposal of New Organic CMOS Image Sensor for Reduction in Pixel Size", FUJIFILM RESEARCH & DEVELOPMENT, no. 55, pp. 14-17, 2010.

SUMMARY

Technical Problem

However, for example, when the terminal does not have information on, for example, the service set identifier (SSID) of the access point that the terminal is to access, it is difficult for the terminal to appropriately determine which of the surrounding access points it is supposed to connect to. Accordingly, for example, when the terminal connects to an access point to obtain information such as information indicating the location of the terminal, there is a possibility that the terminal will connect to an access point whose SSID is insecure, leading to the possibility of a compromise of information.

In one aspect, the present disclosure facilitates the provision of, for example, a reception device that can securely obtain, for example, information to be used to identify an access point that the terminal is to connect to.

Solution to Problem

A reception device according to one aspect of the present disclosure includes: an image sensor that captures an image; and a reception unit configured to sample a plurality of pixels included in each of N regions included in an imaging surface of the image sensor to receive, in parallel, N optical signals that are mutually different and transmitted from a plurality of light sources, where N is an integer greater than or equal to two.

A reception method according to one aspect of the present disclosure includes: capturing an image via an image sensor; and sampling a plurality of pixels included in each of N regions included in an imaging surface of the image sensor to receive, in parallel, N optical signals that are mutually different and transmitted from a plurality of light sources, where N is an integer greater than or equal to two.

General or specific aspects of the above may be realized as a system, method, integrated circuit, computer program, storage medium, or any given combination thereof.

Advantageous Effects

According to one aspect of the present disclosure, it is possible for a terminal to securely obtain information.

Additional benefits and advantages in one aspect of the present disclosure will become apparent from the Specification and Drawings. The benefits and/or advantages may be individually obtained by the various embodiments and features of the Specification and Drawings, which need not all be provided in order to obtain one or more of such benefits and/or advantages.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates a configuration example of a visible light communication system.

FIG. 55 illustrates one example of a frame configuration of a modulated optical signal according to Embodiment 10.

DESCRIPTION OF EMBODIMENTS

Hereinafter, embodiments of the present disclosure will be described in detail with reference to the drawings.
First Example of Modulation and Demodulation Scheme for Visible Light Communication In this embodiment, an optical communication method is used that transmits and receives modulated signals as optical signals.

First, a first example of visible light communication, which is one example of an optical communication method that can be applied to each of the embodiments of the present disclosure will be given.
<Line Scan Sampling>

Smartphones and digital cameras, for example, are equipped with an image sensor such as a CMOS (Complementary Metal Oxide Semiconductor) sensor. For example, the entire scene in a single image captured by the CMOS sensor is not captured at a single instant, but rather, for example, captured line by line using a rolling shutter method, whereby the sensor reads out the amount of light received line by line, as shown in NPL 2 and NPL 3. Accordingly, taking the readout time into account, the starting and stopping of the reception of light is controlled so that there is a time shift from line to line. In other words, images captured by the CMOS sensor are constructed from a plurality of lines captured with a slight time lag between each line.

Figure 1:
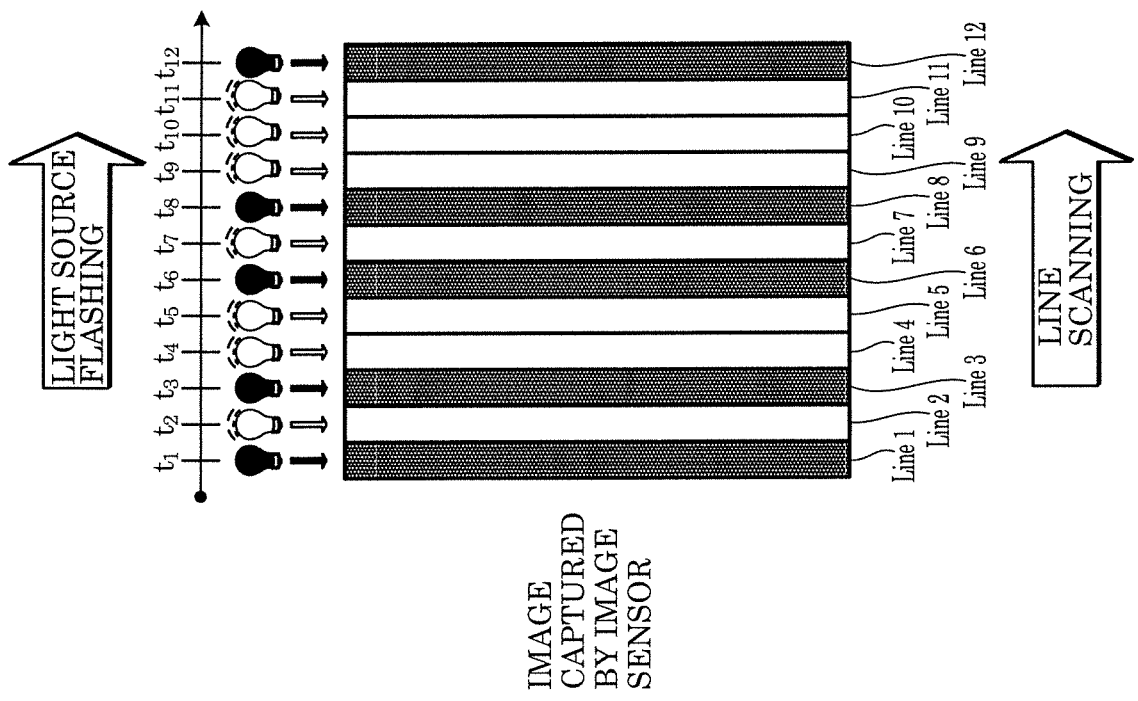
FIG. 1 is for describing line scan sampling principles.

In the first example of a visible light communication method, high-speed reception of visible light signals is achieved based on a method that focuses on the characteristics of the CMOS sensor. In other words, in the first example of a visible light communication method, by utilizing the slight difference in exposure time between lines, the luminance and color of the light source at a plurality of points in time can be measured line by line, from a single image (image captured by the image sensor, i.e., "captured image"), making it possible to capture a modulated signal faster than the frame rate of the image sensor, as illustrated in FIG. 1.

Hereinafter, this sampling technique is referred to as "line scan sampling", and one line of pixels that are exposed at the same time is referred to as an "exposure line".

Note that line scan sampling can be implemented using the rolling shutter scheme of a CMOS sensor, but even when the rolling shutter scheme is implemented using a sensor other than a CMOS sensor, such as a charge-coupled device (CCD) sensor or an organic CMOS sensor exemplified by NPL 4, the line scan sampling can be implemented in the same manner.

Figure 2:
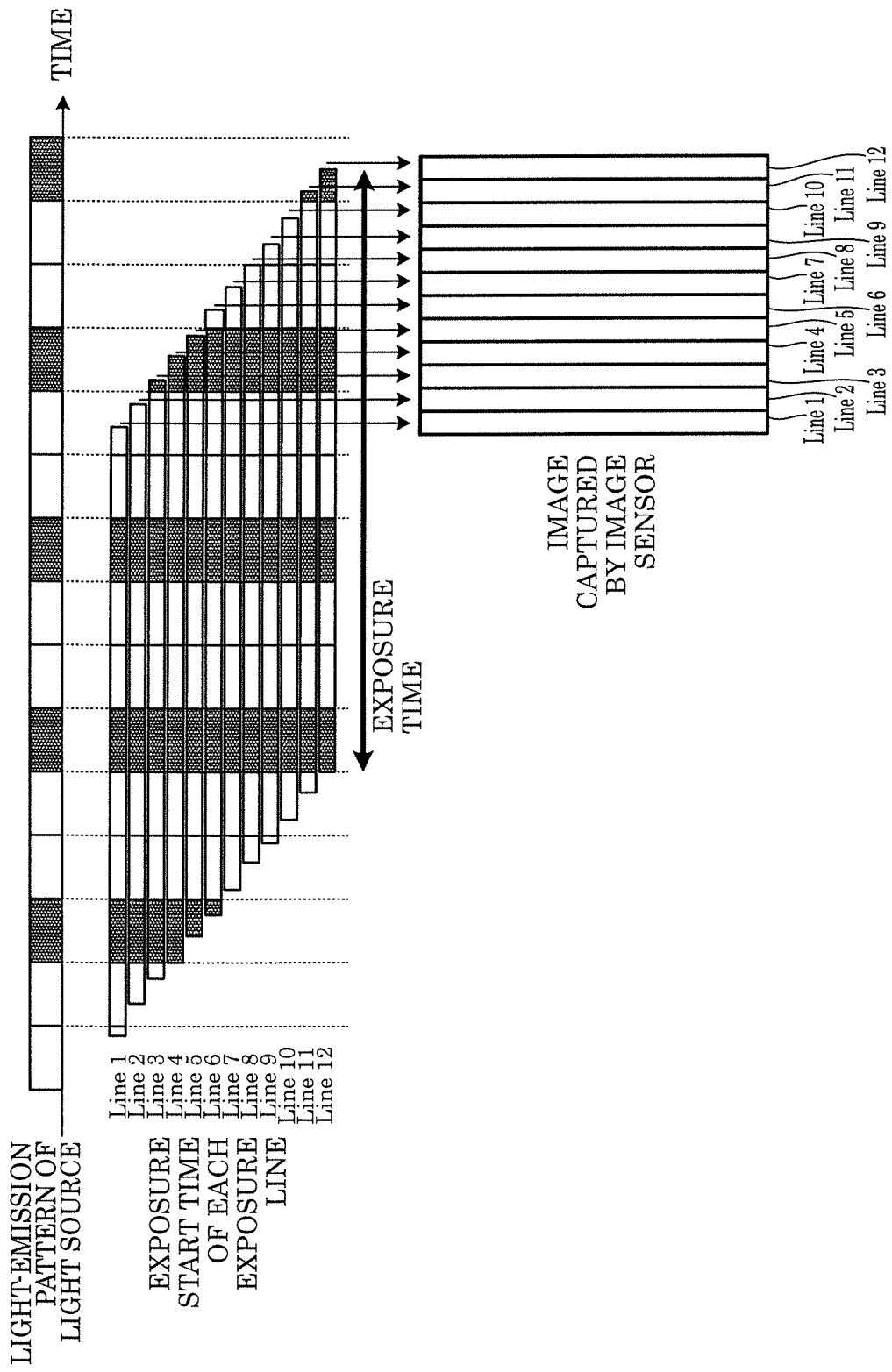
FIG. 2 illustrates one example of a captured image when exposure time is long.

However, when the photography setting for photographing an image using the camera function (the function for capturing a video or still image) is used, even if a rapidly flashing light source is captured, the flashing will not appear as a striped pattern extending along the exposure lines. This is because, with this setting, since the exposure time is sufficiently longer than the flash cycle, as illustrated in FIG. 2, the change in luminance resulting from the light source flashing (light-emission pattern) is uniform, whereby the variation in pixel values between exposure lines is small, resulting in a substantially uniform image.

Figure 3:
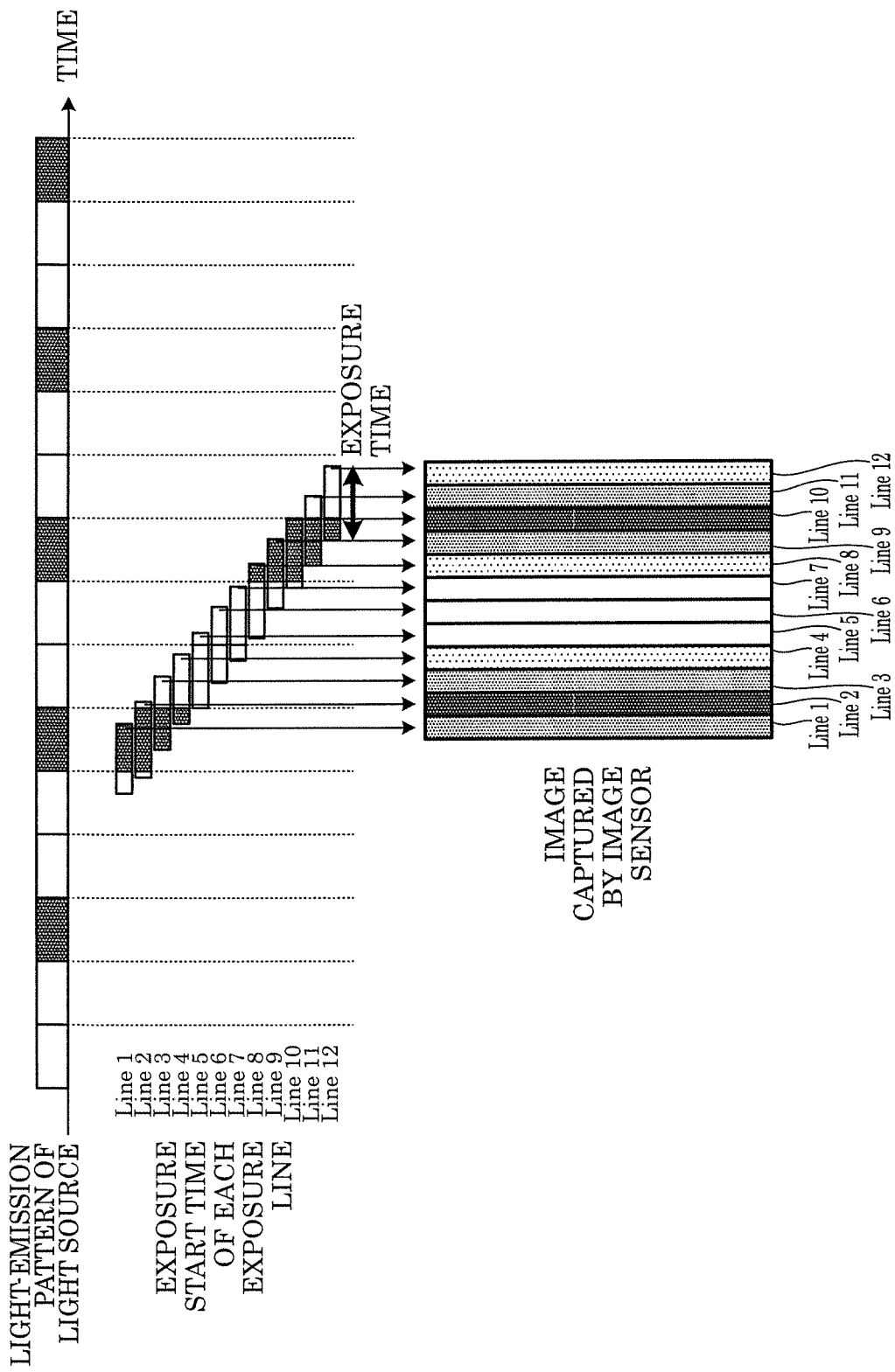
FIG. 3 illustrates one example of a captured image when exposure time is short.

In contrast, by setting the exposure time to the flash cycle of the light source as illustrated in FIG. 3, the state of the flashing of the light source (light-emission pattern) can be observed as a change in luminance between exposure lines. In FIG. 3, the length of the exposure period is set slightly longer than the length of the shortest period of a continuous light-emitting state, and the difference in start times of exposure periods between adjacent exposure lines is set longer than the shortest period of a continuous light-emitting state, but the exposure period setting in line scan sampling is not limited to this example. For example, the length of the exposure period may be set shorter than the shortest period of a continuous light-emitting state, and may be set to approximately double the length of the shortest period of a continuous light-emitting state. Moreover, in addition to a method in which the optical signal is expressed as, for example, a combination of square waves like illustrated in FIG. 4A, a method in which the optical signal continuously changes may be used as the optical communication method.

In any case, with respect to the sampling rate required to receive and demodulate optical signals, a reception device that uses an optical communication method sets the difference between start times or end times between temporally neighboring exposure lines to be less than or equal to the sampling interval corresponding to the sampling rate. Moreover, the reception device having an optical communication method sets the length of the exposure period to be less than or equal to the length of the sampling interval. However, the reception device having an optical communication method may set the length of the exposure period to less than or equal to 1.5 times the sampling interval, and may set the exposure period to less than or equal to 2 times the sampling interval.

For example, exposure lines are designed so as to be parallel to the lengthwise direction of the image sensor. In such cases, in one example, assuming the frame rate is 30 fps (frames per second), at a resolution of 1920×1080, 32,400 or more samples are obtained each second, and at a resolution of 3840×2160, 64,800 or more samples are obtained each second.
<Line Scan Sampling Application Example>

Note that in the above description, line scan sampling in which a signal that indicates an amount of light received per line is read out is described, but the method of sampling optical signals using an image sensor such as a CMOS sensor is not limited to this line scan sampling example. A variety of methods that can obtain signals sampled at a sampling rate higher than the frame rate used in typical video capturing can be implemented as a sampling method used for optical signal reception. For example, a method of controlling the exposure time per pixel and reading out a signal or a method of controlling the exposure time per group of pixels arranged in a shape other than a line and reading out a signal may be used by utilizing the global shutter method disclosed in NPL2 or NPL 3 that has a shutter function for each pixel. Moreover, a method may be used in which a signal is read out a plurality of times from the same pixel during a period corresponding to a single frame in the frame rate used in typical video capturing.

<Frame Sampling>

Furthermore, by employing the frame rate method that gives a shutter function to each pixel disclosed in NPL 2 and NPL 3, it is possible to sample optical signals even in a method that speeds up the frame rate.

For example, the embodiments to be described hereinafter can be realized in any of the methods described above: "Line Scan Sampling", "Line Scan Sampling Application Example", and "Frame Sampling".

<Light Source and Modulation Scheme>

In visible light communication, for example, an LED (Light Emitting Diode) can be used as a transmitter. LEDs are commonly used as light sources in lamps or in display backlights, and are capable of rapidly flashing.

However, light sources that are used as visible light communication transmitters cannot be allowed to flash uncontrolled when performing visible light communication. If the changes in luminance made for visible light communication are recognizable to the human eye, the original functionality of a light source as a lamp will be lost. Accordingly, the transmission signal needs to be emitted at a desired brightness and needs to be imperceptible to the human eye.

Figure 4A:
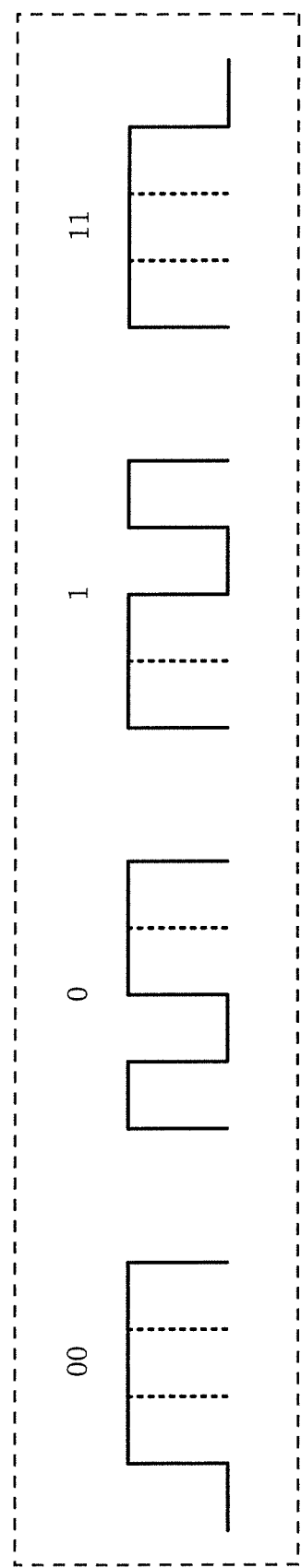
FIG. 4A is for describing 4 PPM.

One example of a modulation scheme that satisfies these conditions is 4 PPM (4-Pulse Position Modulation). As illustrated in FIG. 4A, 4 PPM is a scheme in which two bits are expressed by a group of four time slots each indicating either bright or dark light emitted by a light source. Moreover, as illustrated in FIG. 4A, in 4 PPM, three of the four slots are bright and one of the slots is dark. Accordingly, regardless of the content of the signal, the average brightness (average luminance) is ¾=75%.

Figure 4B:
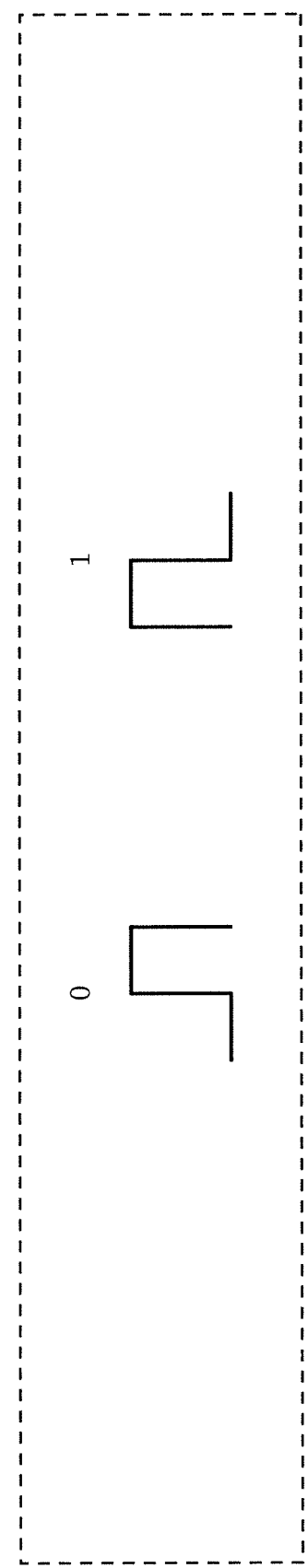
FIG. 4B is for describing Manchester encoding.

For comparison, one example of a similar scheme is Manchester encoding illustrated in FIG. 4B. In the Manchester coding scheme, one bit is expressed with two states, and the modulation efficiency is 50%, which is the same as 4 PPM, but among the two states, one is bright and one is dark, so the average luminance is ½=50%. In other words, 4 PPM is more suitable than Manchester encoding as a modulation scheme for visible light communication. However, since communication capability is not adversely affected by changes in luminance from visible light communication that are recognizable to the human eye, depending on the application, there may be no problem in using a method in which the changes in luminance are recognizable to the human eye. Accordingly, the transmitter (light source) may use, for example, an amplitude shift keying (ASK) method, a phase shift keying (PSK) method, or a pulse amplitude modulation (PAM) method to generate the modulated signal and pulse the light source to emit light.

<Example of Overall Configuration of Communication System>

As illustrated in FIG. 5, the communication system that performs visible light communication includes at least a transmitter that transmits (emits) optical signals and a receiver that receives optical signals. For example, there are two types of transmitters: a variable light transmitter that changes the transmission content depending on the image or content to be displayed; and a fixed light transmitter that continues transmitting fixed transmission content. However, even with a configuration including only either the variable light transmitter or the fixed light transmitter, a communication system that communicates via light can be realized.

The receiver can receive an optical signal from the transmitter, obtain, for example, relevant information associated with the optical signal, and provide it to the user.

This concludes the summary of the visible light communication method, but communication methods applicable to the light communication to be described in the following embodiments are not limited to this example. For example, the light emitter in the transmitter may transmit data using a plurality of light sources. Moreover, the light receiver in the reception device need not be an image sensor such as a CMOS sensor, and may employ a communication method that can use a device that is capable of converting an optical signal into an electrical signal, such as a photodiode. In such cases, since there is no need to perform sampling using the above-described line scan sampling, such a light receiver is applicable even to methods that require 32,400 or more samples per second. Moreover, depending on the application, for example, a radio communication method that uses light in frequencies outside of the visible light range, such as infrared light or ultraviolet light, may be used.

Embodiment 1

Figure 6:
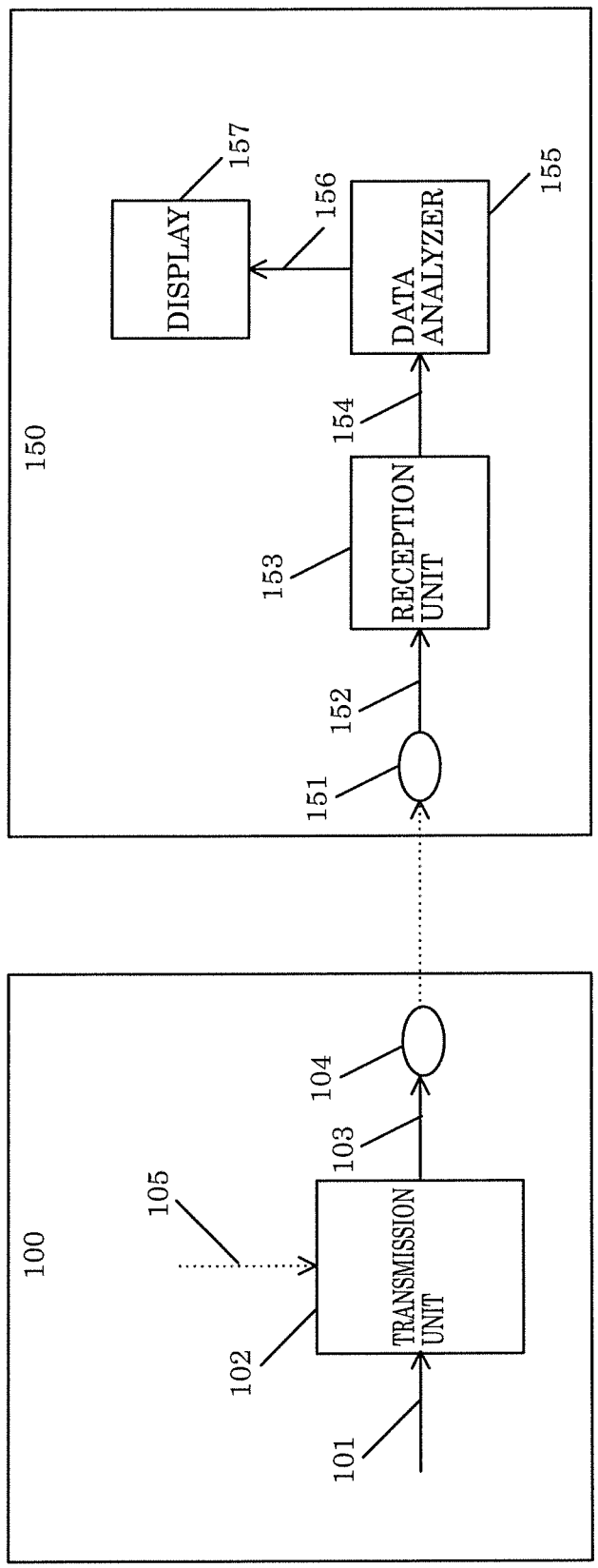
FIG. 6 illustrates a configuration example of a communication system according to Embodiment 1.

FIG. 6 illustrates one example of configurations of device 100 and terminal 150 according to this embodiment.

[Configuration of Device 100]

Device 100 (which corresponds to the visible light communication transmitter) includes a visible-light light source, lamp, or light (hereinafter also expressed by the all-encompassing term "light source") such as a light emitting diode (LED). Note that hereinafter, device 100 is also referred to as "first device".

In first device 100 in FIG. 6, transmission unit 102 receives an input of, for example, information 101 related to a location or position. Moreover, transmission unit 102 may receive an input of information 105 related to time. Moreover, transmission unit 102 may receive inputs of both information 101 related to a location or position and information 105 related to time.

Transmission unit 102 receives inputs of information 101 related to a location or position and/or information 105 related to time, generates modulated signal (for optical communication) 103 based on the input signal(s), and outputs modulated signal 103. Modulated signal 103 is then transmitted from light source 104, for example.

Next, examples of information 101 related to a location or position will be given.

Example 1

Information 101 related to a location or position may be information indicating the latitude and/or longitude of a location or position. For example, information 101 related to a location or position may be information indicating "45 degrees north latitude, 135 degrees east longitude".

Example 2

Information 101 related to a location or position may be information indicating an address. For example, information 101 related to a location or position may be information indicating "1-1-1 XYZ-machi, Chiyoda-ku, Tokyo-to".

Example 3

Information 101 related to a location or position may be information indicating a building or facility, for example.

For example, information 101 related to a location or position may be information indicating "Tokyo Tower".

Example 4

Information 101 related to a location or position may be information indicating a fixed location or position of something at a building or facility, for example.

For example, assume there are five parking spaces for automobiles in a parking lot. Assume the first through fifth parking spaces are named A-1 through A-5, respectively. In this example, information 101 related to a location or position may be information indicating, for example, "A-3".

This example is not limited to only parking spaces in a parking lot. Information 101 related to a location or position may be, for example, information related to a section, a seat, a store, a facility, etc., at, for example, a concert facility, a stadium such as a baseball, soccer, or tennis stadium, an airplane, an airport lounge, a railway, a station, etc.

This concludes the examples of information 101 related to a location or position. Note that methods for configuring information 101 related to a location or position are not limited to the above examples.

[Configuration of Terminal 150]

Terminal 150 in FIG. 6 (which corresponds to the visible light communication receiver) receives modulated signal 103 transmitted from first device 100.

Light receiver (light reception device) 151 is, for example, an image sensor such as a complementary metal oxide semiconductor (CMOS) or organic CMOS image sensor. Light receiver 151 receives light including the modulated signal transmitted from first device 100, and outputs reception signal 152.

Note that reception signal 152 output from light receiver 151 may be a signal including an image or video obtained by an image sensor, and may be a signal output by an element that performs some other photo-electric conversion (converting light into an electric signal). In the following description, when a reception-side device is described as receiving a modulated signal without giving any further details on the processes performed by light receiver 151, this means that the reception-side device obtains a modulated signal for transmitting information, or a modulated signal of an image or video and a modulated signal for transmitting information, by photo-electric conversion (converting light into an electric signal) of light including the modulated signal by light receiver 151. However, the method described above used to receive the modulated signal by the reception-side device is merely one non-limiting example.

Reception unit 153 receives an input of reception signal 152, performs processing such as demodulation and error correction decoding on the modulated signal included in reception signal 152, and outputs reception data 154.

Data analyzer 155 receives an input of reception data 154, estimates, for example, the location or position of terminal 150 by analyzing reception data 154, and outputs information 156 including information on the location or position of at least terminal 150.

Display 157 receives an input of information 156, and displays information related to the location or position of terminal 150 based on information on the location or position of terminal 150 included in information 156.

[Frame Configuration]

Figure 7:
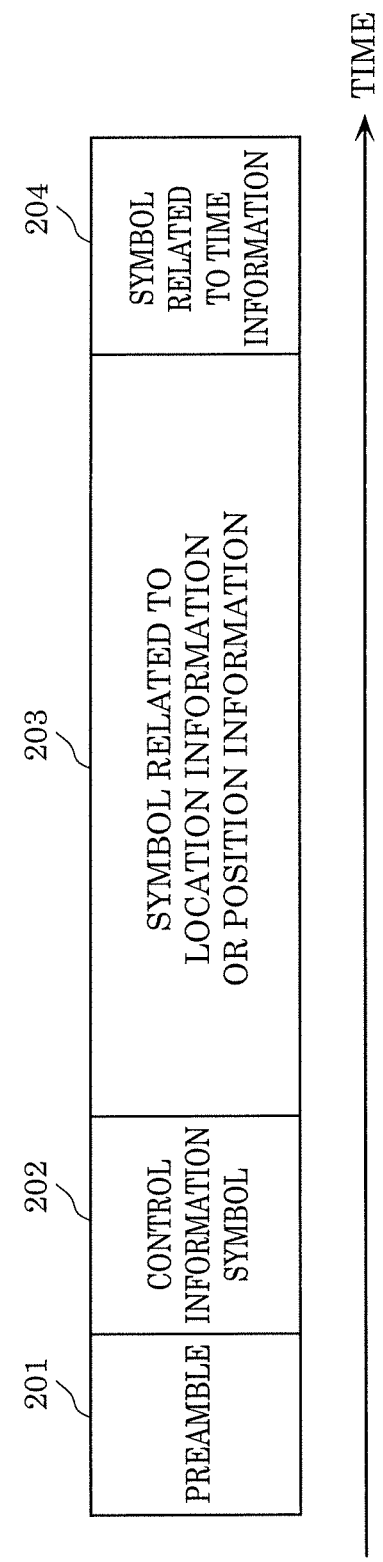
FIG. 7 illustrates a frame configuration example according to Embodiment 1.

FIG. 7 illustrates one example of a frame configuration of a modulated signal transmitted by first device 100.

In FIG. 7, time is represented on the horizontal axis. For example, first device 100 transmits preamble 201 and then transmits control information symbol 202, symbol 203 related to location information or position information, and symbol 204 related to time information.

Preamble 201 is a symbol for terminal 150 that receives the modulated signal transmitted by first device 100 to perform, for example, signal detection, time synchronization, and/or frame synchronization.

Control information symbol 202 is, for example, a symbol including data on, for example, the configuration method of the modulated signal, the error correction encoding scheme used, and/or the frame configuration method.

Symbol 203 related to location information or position information is a symbol including information 101 related to a location or position illustrated in FIG. 6.

Note that the frame may include symbols other than symbols 201, 202, and 203. For example, as illustrated in FIG. 7, the frame may include symbol 204 related to time information. Here, symbol 204 related to time information includes information 105 related to time at which first device 100 transmitted the modulated signal. Note that the configuration of the frame of the modulated signal transmitted by first device 100 is not limited to the example illustrated in FIG. 7, and the symbols included in the modulated signal are not limited to the configuration illustrated in FIG. 7. The frame may include symbols including other data and/or information.

Advantageous Effects

Next, advantageous effects upon first device 100 transmitting a modulated signal and terminal 150 receiving that modulated signal, as illustrated in FIG. 6 and FIG. 7, will be described.

Since first device 100 transmits the modulated signal via visible light, terminal 150 capable of receiving the modulated signal is not in a location significantly far from the location of first device 100. Accordingly, by terminal 150 obtaining the location or position information transmitted by first device 100, terminal 150 can achieve an advantageous effect whereby it is possible to easily (i.e., without having to perform complicated signal processing) obtain accurate position information.

Moreover, when first device 100 is disposed in a location where reception of satellite radio waves from a GPS satellite is difficult, it is possible to achieve an advantageous effect whereby it is possible for terminal 150 to securely obtain accurate position information even in locations in which reception of radio waves from a GPS satellite is difficult, by terminal 150 receiving the modulated signal transmitted by first device 100.

Embodiment 2

In this embodiment, a configuration in which a plurality of first devices 100 described in Embodiment 1 are provided will be described.

Figure 8:
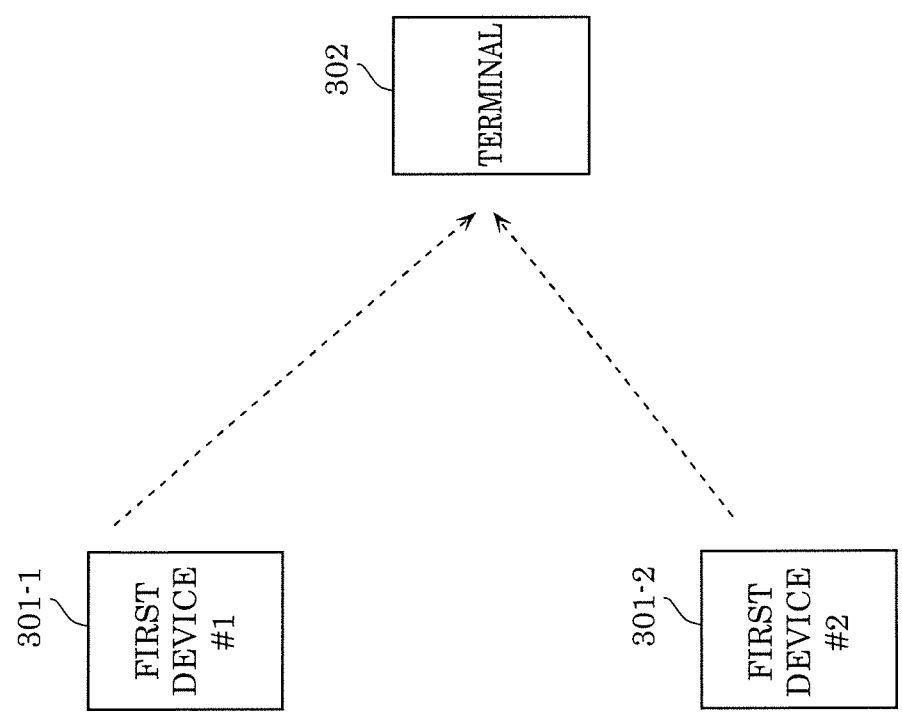
FIG. 8 illustrates the positional relationship between devices and a terminal according to Embodiment 2.

In this embodiment, for example, as illustrated in FIG. 8, first device #1 301-1 having the same configuration as first device 100 illustrated in FIG. 6 transmits a modulated signal. Terminal 302 having the same configuration as terminal 150 illustrated in FIG. 6 receives the modulated signal transmitted by first device #1 301-1, and, for example, obtains information related to the location or position of first device #1 301-1 and information related to time pertaining to first device #1 301-1.

Similarly, first device #2 301-2 having the same configuration as first device 100 illustrated in FIG. 6 transmits a modulated signal. Terminal 302 receives the modulated signal transmitted by first device #2 301-2, and, for example, obtains information related to the location or position of first device #2 301-2 and information related to time pertaining to first device #2 301-2.

Terminal 302 can calculate the distance between first device #1 301-1 and first device #2 301-2 illustrated in FIG. 8 based on the information related to the location or position of first device #1 301-1 and the information related to the location or position of first device #2 301-2. Moreover, terminal 302 can calculate the distance between terminal 302 and first device #1 301-1 based on the information related to time pertaining to first device #1 301-1 and, for example, the time at which terminal 302 received the modulated signal transmitted by first device #1 301-1. Similarly, terminal 302 can calculate the distance between terminal 302 and first device #2 301-2 based on the information related to time pertaining to first device #2 301-2 and, for example, the time at which terminal 302 received the modulated signal transmitted by first device #2 301-2.

Moreover, terminal 302 knows the position of first device #1 301-1 based on the information related to the location or position of first device #1 301-1. Terminal 302 knows the position of first device #2 301-2 based on the information related to the location or position of first device #2 301-2.

Moreover, terminal 302 knows the geometry of the triangle formed by first device #1 301-1, first device #2 301-2, and terminal 302 from the distance between first device #1 301-1 and first device #2 301-2, the distance between first device #1 301-1 and terminal 302, and the distance between first device #2 301-2 and terminal 302.

Accordingly, terminal 302 can accurately calculate and obtain the position of terminal 302 from the position of first device #1 301-1, the position of first device #2 301-2, and the geometry of the triangle formed by first device #1 301-1, first device #2 301-2, and terminal 302.

However, the geodetic measurement method used by terminal 302 to obtain the location or position information is not limited to the method described above; any geodetic measurement method may be used. Examples of geodetic measurement methods include triangulation, traverse calculation, trilateration, leveling, etc.

As described above, in this embodiment, terminal 302 can obtain the above-described information from a plurality of devices 301 including light sources that transmit location information, and as a result, it is possible to achieve an advantageous effect whereby the terminal 302 accurately estimate the position of terminal 302.

Moreover, in this embodiment, when device 301 including a light source that transmits location information is disposed in a location where reception of satellite radio waves from a GPS satellite is difficult, as described in Embodiment 1, it is possible to achieve an advantageous effect whereby it is possible for terminal 302 to securely obtain accurate position information even in locations in which reception of radio waves from a GPS satellite is difficult, by terminal 302 receiving the modulated signal transmitted by device 301.

Note that in the above example, terminal 302 receives modulated signals transmitted by two devices 301, but an embodiment in which terminal 302 receives modulated signals transmitted by more than two devices 301 can be implemented in the same manner. Note that the more devices 301 there are, the more accurately terminal 302 can calculate the position information, so from this viewpoint, more devices 301 are more beneficial.

Embodiment 3

Figure 9:
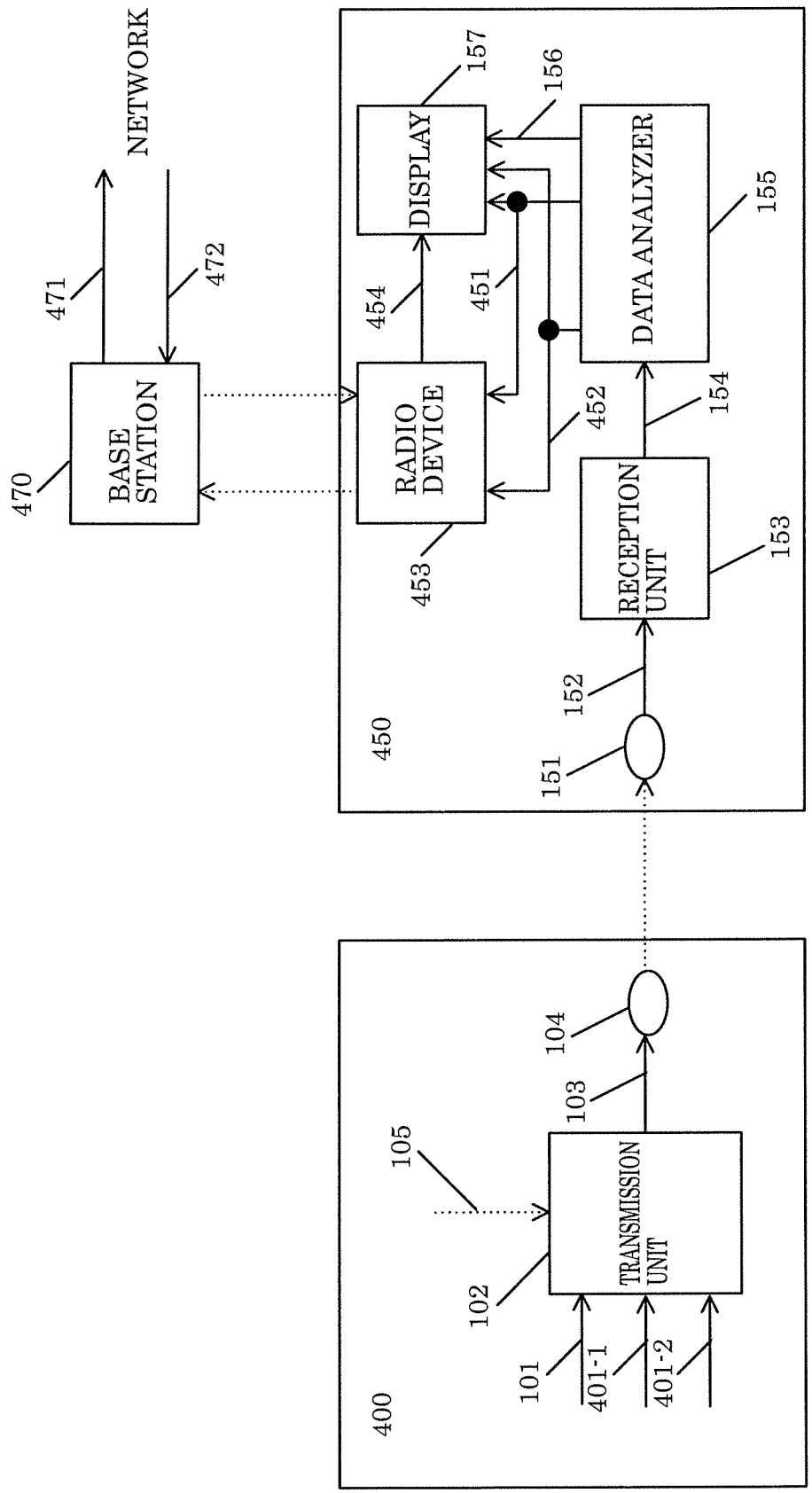
FIG. 9 illustrates a configuration example of a communication system according to Embodiment 3.

FIG. 9 illustrates one example of a configuration of device 400, terminal 450, and base station 470 (or access point (AP)) that communicates with terminal 450 according to this embodiment.

Device 400 includes, for example, an LED visible light source, lamp, light source, and/or light. Note that hereinafter, device 400 is also referred to as "first device".

Note that in first device 400 illustrated in FIG. 9, configurations that operate the same as first device 100 illustrated in FIG. 6 share like reference signs. Moreover, in terminal 450 illustrated in FIG. 9, configurations that operate the same as terminal 150 illustrated in FIG. 6 share like reference signs.

In first device 400 in FIG. 9, transmission unit 102 receives inputs of, for example, information 101 related to a location or position, information 401-1 related to the service set identifier (SSID) of base station 470, and information 401-2 related to an access destination. Moreover, transmission unit 102 may receive an input of information 105 related to time.

Transmission unit 102 receives inputs of information 101 related to a location or position, information 401-1 related to an SSID, and information 401-2 related to an access destination, and/or information 105 related to time, generates modulated signal (for optical communication) 103 based on the input signal(s), and outputs modulated signal 103. Modulated signal 103 is then transmitted from light source 104, for example.

Note that since an example of information 101 related to a location or position has already been given in Embodiment 1, repeated description will be omitted.

Next, information 401-1 related to an SSID and information 401-2 related to an access destination will be described.

First, information 401-1 related to an SSID will be described.

Information 401-1 related to an SSID is information indicating the SSID of base station 470 illustrated in FIG. 9. When processing is performed for determining whether or not the SSID notified via the optical signal is the SSID of a secure base station, first device 400 can provide access to base station 470, which is a secure access destination for terminal 450. With this, terminal 450 illustrated in FIG. 9 can securely obtain accurate position information from base station 470.

On the other hand, first device 400 can restrict the terminals that access base station 470 to terminals in a space in which it is possible to receive optical signals transmitted (emitted) by first device 400.

Note that when terminal 450 receives an optical signal transmitted via a predetermined scheme, it may be determined that the notified SSID is the SSID of a secure base station. Moreover, terminal 450 may also perform processing for determining whether the notified SSID is secure or not. For example, first device 400 may transmit a predetermined identifier in an optical signal, and terminal 450 may determine whether the notified SSID is the SSID of a secure base station or not based on the received identifier. Moreover, the processing for determining whether the base station is secure or not may be omitted by terminal 450, and instead, the user may select a first device 400 that is highly secure utilizing the characteristics of the visible light, and the SSID of the highly secure base station may be obtained by terminal 450 receiving the optical signal from first device 400.

Note that although the only base station that is illustrated in FIG. 9 is base station 470, even when one or more base stations (or APs) other than base station 470 are also present, terminal 450 can access base station 470 using the SSID obtained from first device 400 and obtain information.

Next, information 401-2 related to an access destination will be described.

Information 401-2 related to an access destination is information related to an access destination for obtaining information after terminal 450 accesses base station 470. Note that an example of operations according to this embodiment will be described in greater detail later.

This concludes the description of information 401-1 related to an SSID and information 401-2 related to an access destination.

Terminal 450 receives modulated signal 103 transmitted from first device 400.

Light receiver 151 is, for example, an image sensor such as a CMOS or organic CMOS image sensor. Light receiver 151 receives light including the modulated signal transmitted from first device 400, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and estimates, for example, the location or position of terminal 450 based on reception data 154. Data analyzer 155 then outputs information 156 including the location or position information of at least terminal 450, information 451 related to an SSID, and information 452 related to an access destination.

Display 157 receives inputs of information 156 including the location or position information of terminal 450, information 451 related to an SSID, and information 452 related to an access destination, and, for example, displays the location and/or position of terminal 450, the SSID of the communication partner to be accessed by radio device 453 included in terminal 450, and/or the access destination (hereinafter, this display will be referred to as the "first display").

For example, after the first display, radio device 453 receives inputs of information 451 related to an SSID and information 452 related to an access destination. Radio device 453 then connects to a partner to communicate with based on the information 451 related to an SSID, by using, for example, radio waves. Note that in the example illustrated in FIG. 9, radio device 453 connects to base station 470.

Then, based on information 452 related to an access destination, radio device 453 generates modulated signal from data including the information related to the access destination, and transmits the generated modulated signal to base station 470 by using, for example, radio waves.

Base station 470, which is the communication partner of terminal 450 in FIG. 9, receives the modulated signal transmitted by radio device 453 included in terminal 450.

Base station 470 then performs processing such as demodulation and error correction decoding on the received modulated signal, and outputs reception data 471 including information on the access destination transmitted from terminal 450. Based on this information on the access destination, base station 470 accesses a desired access destination over a network and, for example, obtains desired information 472 from the access destination. Base station 470 then receives an input of desired information 472, generates a modulated signal based on desired information 472, and transmits, to terminal 450 (radio device 453), the generated modulated signal using, for example, radio waves.

Radio device 453 in terminal 450 receives the modulated signal transmitted from base station 470, performs processing such as demodulation and error correction decoding, and obtains desired information 472.

For example, assume the desired information 472 is information related to a section, a seat, a store, a facility, etc., on/at, for example, a map, a map or floor guide for a building, a map or floor guide for a facility, a map or floor guide for a parking lot, a concert facility, a stadium, an airplane, an airport lounge, a railway, a station, etc.

Display 157 receives inputs of information 454 including desired information 472, information 156 including the location or position information of at least terminal 450, and information 451 related to an SSID, and after first display, based on desired information 472 and information 156 including the location or position information of at least terminal 450, displays the position of terminal 450 mapped on information on a map, floor guide, or facility, information on seating information, information on stores.

Figure 10:
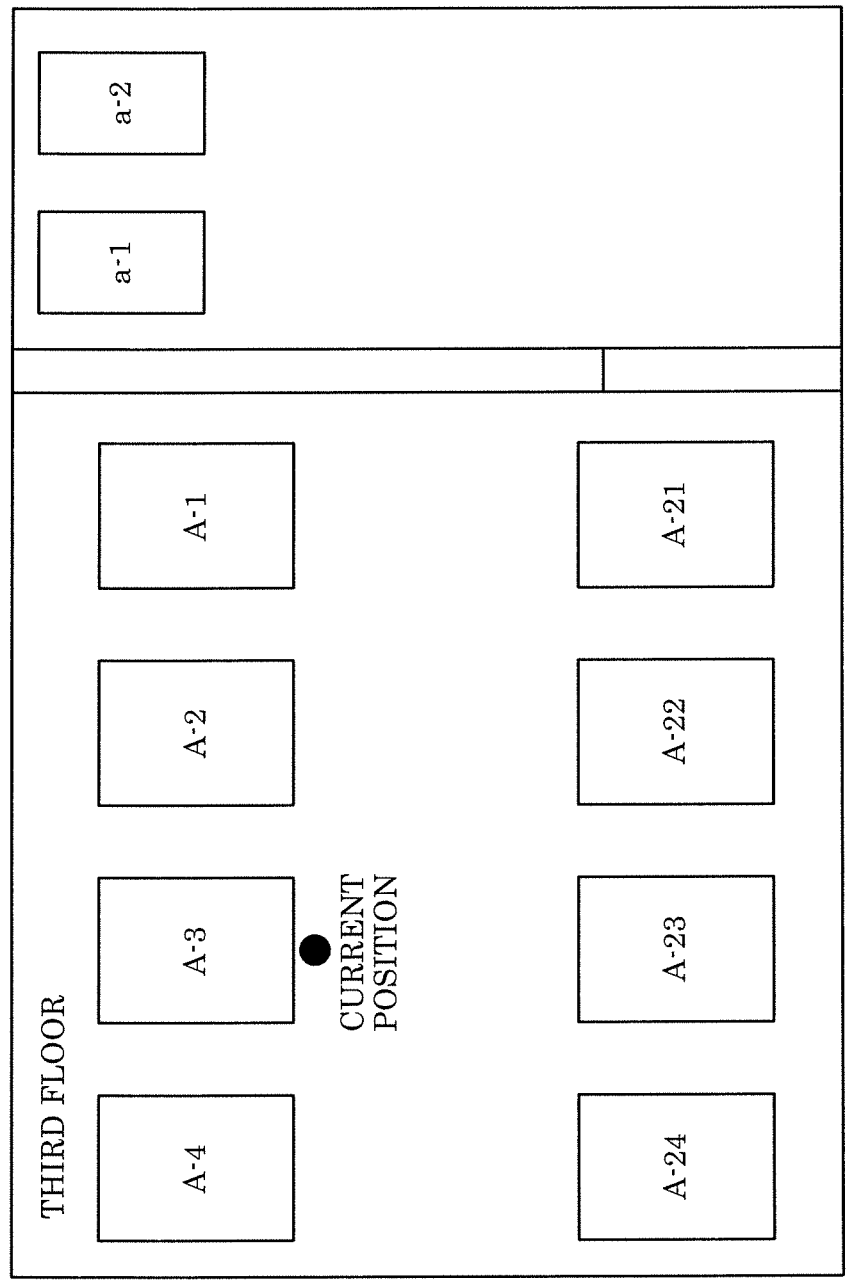
FIG. 10 illustrates a display example displayed by a display according to Embodiment 3.

FIG. 10 is an example of a detailed display by display 157.

The display in FIG. 10 indicates that this is the third floor of a building. Each of A-1, A-2, A-3, A-4, A-21, A-22, A-23, and A-24 indicates a position of a parking space for an automobile. a-1 and a-2 indicate positions of elevators. The information on this map including the positions of the parking spaces and the elevators is one example of desired information 454 (472).

As illustrated in FIG. 10, display 157 displays the current position of terminal 450 mapped on the map. Note that the current position is information obtained from information 156 including the location or position information of at least terminal 450.

Figure 11:
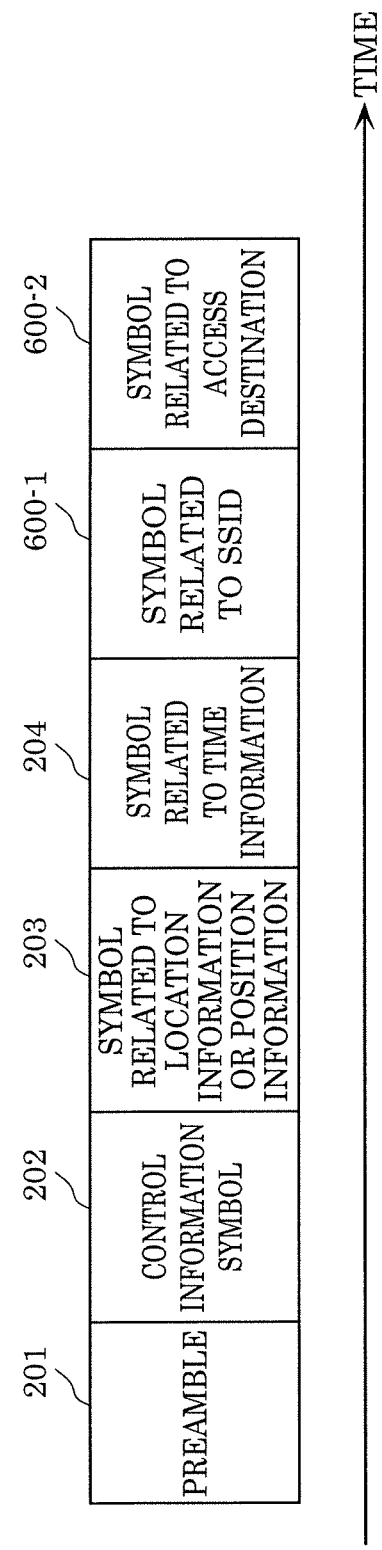
FIG. 11 illustrates a frame configuration example of a modulated signal transmitted by a first device according to Embodiment 3.

FIG. 11 illustrates one example of a frame configuration of a modulated signal transmitted by first device 400 illustrated in FIG. 9. In FIG. 11, time is represented on the horizontal axis. Moreover, in FIG. 11, symbols that transmit the same information as in FIG. 7 share like reference signs, and repeated description thereof is omitted.

First device 400 transmits symbol 600-1 related to an SSID and symbol 600-2 related to an access destination, in addition to preamble 201, control information symbol 202, symbol 203 related to location information or position information, and symbol 204 related to time information.

Symbol 600-1 related to an SSID is a symbol for transmitting information 401-1 related to an SSID in FIG. 9, and symbol 600-2 related to an access destination is a symbol for transmitting information 401-2 related to an access destination in FIG. 9. Note that the frame in FIG. 11 may include symbols other than those shown in FIG. 11. Moreover, the configuration of the frame, including the order in which the symbols are transmitted, is not limited to the configuration illustrated in FIG. 11.

Figure 12:
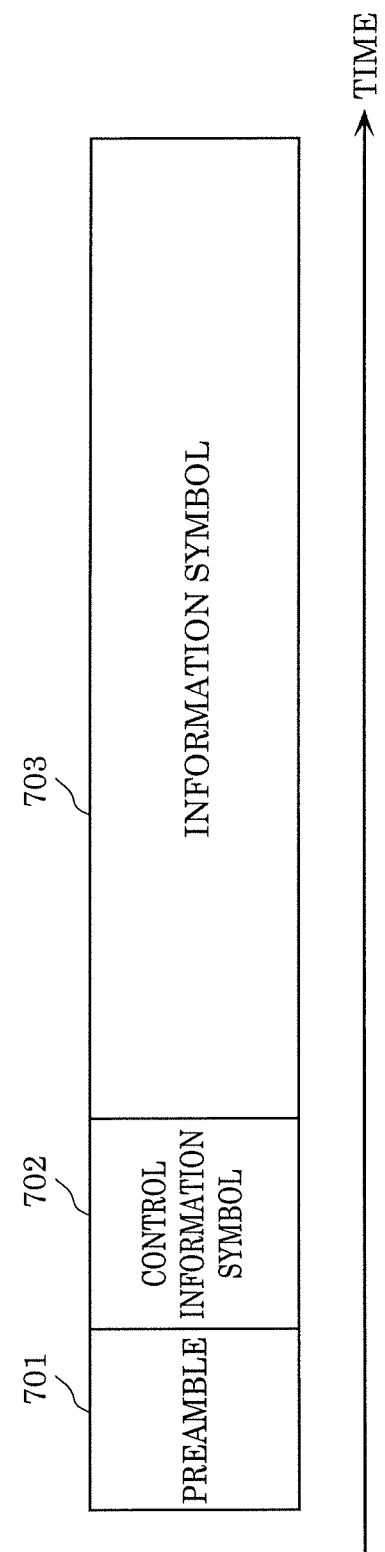
FIG. 12 illustrates a frame configuration example of a modulated signal transmitted by a base station according to Embodiment 3.

FIG. 12 illustrates one example of a frame configuration of a modulated signal transmitted by base station 470 illustrated in FIG. 9. In FIG. 12, time is represented on the horizontal axis.

As illustrated in FIG. 12, base station 470 transmits, for example, preamble 701, and thereafter transmits control information symbol 702 and information symbol 703.

Preamble 701 is a symbol for terminal 450 that receives the modulated signal transmitted by base station 470 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, and information related to the frame configuration. Based on information on control information symbol 702, radio device 453 in terminal 450 implements, for example, demodulation of the modulated signal.

Information symbol 703 is a symbol for transmitting information. Note that in this embodiment, information symbol 703 is a symbol for transmitting the above-described desired information 472.

Note that base station 470 in FIG. 9 may transmit a frame including symbols other than those shown in FIG. 12. For example, base station 470 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 11 and is transmitted by first device 400 at a regular timing, e.g., repeatedly transmitted is conceivable. With this, a plurality of terminals 450 can implement the above-described operations.

Figure 13:
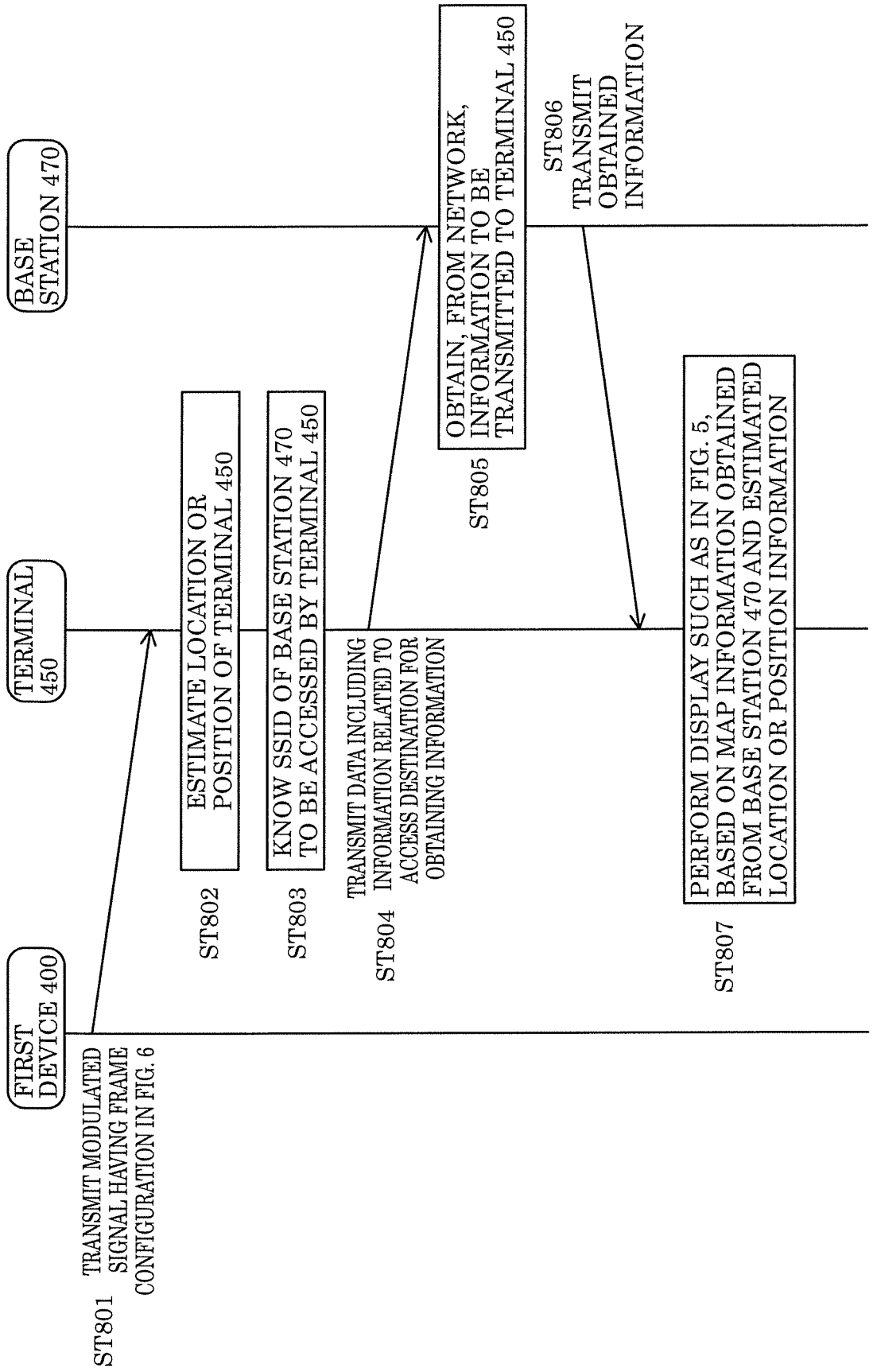
FIG. 13 is a flow chart illustrating an example of processes performed in the communication system according to Embodiment 3.

FIG. 13 is a flow chart illustrating one example of processes implemented by first device 400, terminal 450, and base station 470 illustrated in FIG. 9 and described above.

First, first device 400 transmits a modulated signal having the frame configuration illustrated in FIG. 11 (ST801).

Terminal 450 receives the modulated signal transmitted by first device 400 and estimates the location or position of terminal 450 (ST802).

Terminal 450 also knows the SSID of base station 470 to be accessed by terminal 450 by receiving the modulated signal transmitted by first device 400 (ST803).

Terminal 450 transmits, to base station 470, a modulated signal including data including information 452 related to an access destination for obtaining information such as map information, using radio waves (ST804).

Base station 470 receives the modulated signal transmitted by terminal 450, obtains information on an access destination, accesses a desired access destination via a network, and obtains desired information such as map information (information to be transmitted to terminal 450) (ST805).

Base station 470 then transmits, to terminal 450, a modulated signal including the obtained desired information such as the map information, by using radio waves (ST806).

Terminal 450 receives the modulated signal transmitted by base station 470 and obtains information such as map information. Terminal 450 displays a display like that in FIG. 10, based on the information such as map information and the information on the location or position of terminal 450 that is previously obtained.

Next, an example of operations performed when a plurality of first devices 400 and base station 470 are provided in the location illustrated in FIG. 10.

Figure 14:
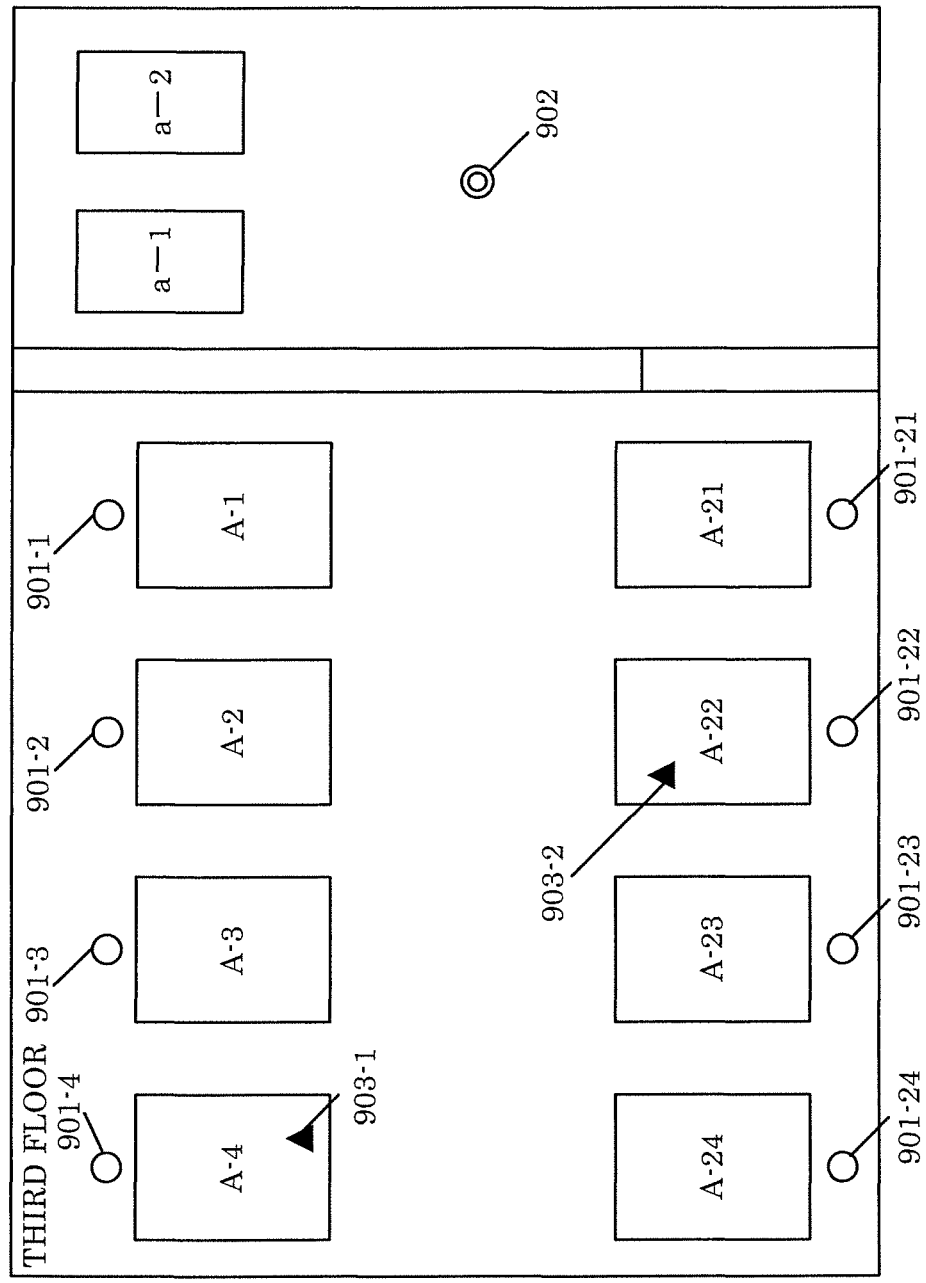
FIG. 14 illustrates a display example displayed by the display according to Embodiment 3.

FIG. 14 is a map of the same location illustrated in FIG. 10. In other words, FIG. 14 is a map of the third floor described with reference to FIG. 10. In FIG. 14, each of A-1, A-2, A-3, A-4, A-21, A-22, A-23, and A-24 indicates a parking space for an automobile, and each of a-1 and a-2 indicates an elevator.

The position of circle 901-1 in FIG. 14 indicates the location of a first device having the same configuration as first device 400 illustrated in FIG. 9. Hereinafter, the first device that has the same configuration as first device 400 and is at the position of 901-1 is referred to as "first device #1 400". First device #1 400 has, as information related to a location or information related to a position, information indicating "A-1", and transmits this information indicating "A-1".

The position of circle 901-2 in FIG. 14 indicates the location of a first device having the same configuration as first device 400 illustrated in FIG. 9. Hereinafter, the first device that has the same configuration as first device 400 and is at the position of 901-2 is referred to as "first device #2 400". First device #2 400 has, as information related to a location or information related to a position, information indicating "A-2", and transmits this information indicating "A-2".

The position of circle 901-3 in FIG. 14 indicates the location of a first device having the same configuration as first device 400 illustrated in FIG. 9. Hereinafter, the first device that has the same configuration as first device 400 and is at the position of 901-3 is referred to as "first device #3 400". First device #3 400 has, as information related to a location or information related to a position, information indicating "A-3", and transmits this information indicating "A-3".

The position of circle 901-4 in FIG. 14 indicates the location of a first device having the same configuration as first device 400 illustrated in FIG. 9. Hereinafter, the first device that has the same configuration as first device 400 and is at the position of 901-4 is referred to as "first device #4 400". First device #4 400 has, as information related to a location or information related to a position, information indicating "A-4", and transmits this information indicating "A-4".

The position of circle 901-21 in FIG. 14 indicates the location of a first device having the same configuration as first device 400 illustrated in FIG. 9. Hereinafter, the first device that has the same configuration as first device 400 and is at the position of 901-21 is referred to as "first device #21 400". First device #21 400 has, as information related to a location or information related to a position, information indicating "A-21", and transmits this information indicating "A-21".

The position of circle 901-22 in FIG. 14 indicates the location of a first device having the same configuration as first device 400 illustrated in FIG. 9. Hereinafter, the first device that has the same configuration as first device 400 and is at the position of 901-22 is referred to as "first device #22 400". First device #22 400 has, as information related to a location or information related to a position, information indicating "A-22", and transmits this information indicating "A-22".

The position of circle 901-23 in FIG. 14 indicates the location of a first device having the same configuration as first device 400 illustrated in FIG. 9. Hereinafter, the first device that has the same configuration as first device 400 and is at the position of 901-23 is referred to as "first device #23 400". First device #23 400 has, as information related to a location or information related to a position, information indicating "A-23", and transmits this information indicating "A-23".

The position of circle 901-24 in FIG. 14 indicates the location of a first device having the same configuration as first device 400 illustrated in FIG. 9. Hereinafter, the first device that has the same configuration as first device 400 and is at the position of 901-24 is referred to as "first device #24 400". First device #24 400 has, as information related to a location or information related to a position, information indicating "A-24", and transmits this information indicating "A-24".

The position of double circle 902 in FIG. 14 indicates the location of a base station (or AP) having the same configuration as base station 470 illustrated in FIG. 9. Hereinafter, the base station (or AP) having the same configuration as base station 470 in FIG. 9 will be referred to simply as "base station 470". Moreover, here, the SSID of base station 470 at position 902 is "abcdef".

When terminal 450 present in the vicinity of the position indicated on the map in FIG. 14 can wirelessly communicate, terminal 450 may access base station 470 at the position of 902 in FIG. 14.

Accordingly, first device #1 400 at 901-1 in FIG. 14 transmits "abcdef" as information related to an SSID (refer to 401-1 in FIG. 9).

Similarly, first device #2 400 at 901-2 in FIG. 14 transmits "abcdef" as information related to an SSID (refer to 401-1 in FIG. 9).

First device #3 400 at 901-3 in FIG. 14 transmits "abcdef" as information related to an SSID (refer to 401-1 in FIG. 9).

First device #4 400 at 901-4 in FIG. 14 transmits "abcdef" as information related to an SSID (refer to 401-1 in FIG. 9).

First device #21 400 at 901-21 in FIG. 14 transmits "abcdef" as information related to an SSID (refer to 401-1 in FIG. 9).

First device #22 400 at 901-22 in FIG. 14 transmits "abcdef" as information related to an SSID (refer to 401-1 in FIG. 9).

First device #23 400 at 901-23 in FIG. 14 transmits "abcdef" as information related to an SSID (refer to 401-1 in FIG. 9).

First device #24 400 at 901-24 in FIG. 14 transmits "abcdef" as information related to an SSID (refer to 401-1 in FIG. 9).

Hereinafter, an example of specific operations will be given.

Assume a terminal having the same configuration as terminal 450 in FIG. 9 is positioned at 903-1 in FIG. 14 (hereinafter, this terminal will be referred to simply as terminal 450). In such cases, terminal 450 receives the modulated signal transmitted by first device #4 400 at the position of 901-4 in FIG. 14, and obtains position information indicating "A-4". Moreover, terminal 450 receives the modulated signal transmitted by first device #4 400 at the position of 901-4 in FIG. 14, and obtains SSID information indicating "abcdef". With this, terminal 450 accesses base station 470 positioned at 902 in FIG. 14. Moreover, terminal 450 obtains, from base station 470 positioned at 902 in FIG. 14, information such as map information. Terminal 450 then displays map information and position information (for example, see FIG. 10; FIG. 10 is merely one non-limiting example).

Similarly, assume a terminal having the same configuration as terminal 450 in FIG. 9 is positioned at 903-2 in FIG. 14 (hereinafter, this terminal will be referred to simply as terminal 450). In such cases, terminal 450 receives the modulated signal transmitted by first device #22 400 at the position of 901-22 in FIG. 14, and obtains position information indicating "A-22". Moreover, terminal 450 receives the modulated signal transmitted by first device #4 400 at the position of 901-22 in FIG. 14, and obtains SSID information indicating "abcdef". With this, terminal 450 accesses base station 470 positioned at 902 in FIG. 14. Moreover, terminal 450 obtains, from base station 470 positioned at 902 in FIG. 14, information such as map information. Terminal 450 then displays map information and position information (for example, see FIG. 10; FIG. 10 is merely one non-limiting example).

Note that terminal 450 may record the map (surrounding area information) and the position information like that in FIG. 14 in a storage (not illustrated in the drawings) included in terminal 450, and may read the information stored in the storage when required by the user of terminal 450. This makes it possible to use the map (surrounding area information) and the position information in a manner that is convenient to the user.

In this way, since first device 400 transmits the modulated signal via visible light, terminal 450 capable of receiving the modulated signal is limited to being located within a region capable of receiving the optical signal from the position of first device 400. Accordingly, by terminal 450 obtaining the location or position information transmitted by first device 400, terminal 450 can easily (i.e., without having to perform complicated signal processing) obtain accurate position information.

Moreover, when first device 400 is disposed in a location where reception of satellite radio waves from a GPS satellite is difficult, it is possible for terminal 450 to securely obtain accurate position information even in locations in which reception of radio waves from a GPS satellite is difficult, by terminal 450 receiving the modulated signal transmitted by first device 400.

Furthermore, based on the information on the SSID transmitted from first device 400, terminal 450 can securely obtain information by connecting to base station (or AP) 470 and obtaining information. This is because, when information from a visible light modulated signal is obtained by terminal 450, since it is visible light, the user can easily visually recognize first device 400 transmitting the modulated signal, making it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that radio device 453 in terminal 450 illustrated in FIG. 9 may further receive inputs of a plurality of signals. For example, radio device 453 may receive an input of a control signal for controlling radio device 453, and may receive an input of information, etc., transmitted to base station 470. Here, one conceivable example is that radio device 453 begins performing communication based on the control signal. As described above, in this embodiment, the configuration of the first device is not limited to the configuration of first device 400 in FIG. 9, the configuration of the terminal is not limited to the configuration of terminal 450 in FIG. 9, and the connection destination and configuration of the base station are not limited to the connection destination and configuration of base station 470 in FIG. 9.

Moreover, in the example in FIG. 9, a single base station 470 is present, but a plurality of (secure) base stations (or APs) that terminal 450 can access may be present. In such cases, the symbol related to an SSID that is transmitted by first device 400 in FIG. 9 may include information indicating the SSID of each of the plurality of base stations (or APs). In such cases, as the display of the access destination (the "first display" described above), display 157 in terminal 450 illustrated in FIG. 9 displays a list of the SSIDs of the plurality of base stations and/or a list of the plurality of access destinations. Then, based on the information on the SSIDs of the plurality of base stations (or APs), terminal 450 in FIG. 9 may select one or more base stations to actually wirelessly connect to (in other words, may concurrently connect to a plurality of base stations).

For example, assume there are three base stations 470. Here, the three base stations 470 shall be referred as base station #A, base station #B, and base station #C. Moreover, assume the SSID of base station #A is "abcdef", the SSID of base station #B is "ghijk", and the SSID of base station #C is "pqrstu". In such cases, symbol 600-1 related to an SSID in the frame configuration illustrated in FIG. 11 of the modulated signal transmitted by first device 400 includes information indicating that the SSID of base station #A is "abcdef", the SSID of base station #B is "ghijk", and the SSID of base station #C is "pqrstu". Then, terminal 450 in FIG. 9 receives symbol 600-1 related to an SSID, and based on the information indicating that the SSID of base station #A is "abcdef", the SSID of base station #B is "ghijk", and the SSID of base station #C is "pqrstu", selects one or more base stations 470 to actually wirelessly connect to.

Embodiment 4

Figure 15:
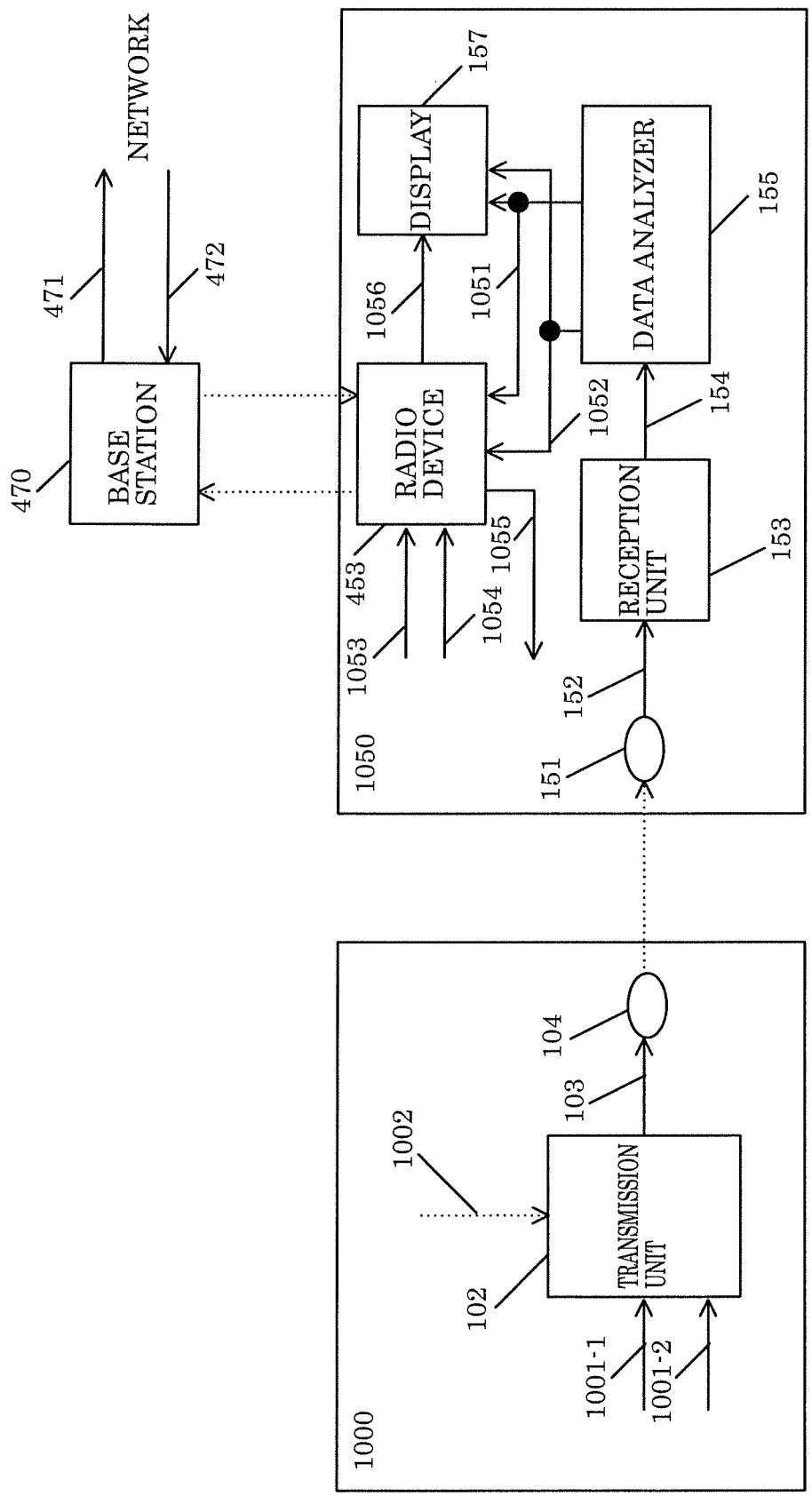
FIG. 15 illustrates a configuration example of a communication system according to Embodiment 4.

FIG. 15 illustrates one example of a configuration of a communication system according to this embodiment.

The communication system illustrated in FIG. 15 includes, for example, device 1000, terminal 1050, and base station (or AP) 470 that communicates with terminal 1050.

Device 1000 includes, for example, an LED visible light source, lamp, light source, and/or light (hereinafter referred to as "light source 104"). Note that hereinafter, device 1000 is also referred to as "second device" in this embodiment.

Note that in second device 1000 illustrated in FIG. 15, configurations that operate the same as first device 100 illustrated in FIG. 6 share like reference signs. Moreover, in terminal 1050 illustrated in FIG. 15, configurations that operate the same as terminal 150 illustrated in FIG. 6 share like reference signs. Moreover, communication between radio device 453 in terminal 1050 and base station 470 illustrated in FIG. 15 uses, for example, radio waves.

In second device 1000 illustrated in FIG. 15, transmission unit 102 receives inputs of information 1001-1 related to an SSID, information 1001-2 related to an encryption key, and data 1002, generates modulated signal (for optical communication) 103 based on the input signal(s), and outputs modulated signal 103. Modulated signal 103 is then transmitted from light source 104, for example.

Next, information 1001-1 related to an SSID and information 1001-2 related to an encryption key will be described.

First, information 1001-1 related to an SSID will be described.

Information 1001-1 related to an SSID is information indicating the SSID of base station 470 illustrated in FIG. 15. Note that in one example, base station 470 transmits a modulated signal to terminal 1050 over radio waves, and receives the modulated signal from terminal 1050 over radio waves. In other words, second device 1000 can provide access to base station 470, which is a secure access destination for terminal 1050. With this, terminal 1050 illustrated in FIG. 15 can securely obtain information from base station 470.

On the other hand, second device 1000 can restrict the terminals that access base station 470 to terminals in a space in which it is possible to receive optical signals transmitted (emitted) by second device 1000.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, second device 1000 may transmit a predetermined identifier in an optical signal, and terminal 1050 may determine whether the notified SSID is the SSID of a secure base station or not based on the received identifier.

Note that although the only base station that is illustrated in FIG. 15 is base station 470, even when, for example, a base station (or AP) other than base station 470 is also present, terminal 1050 can access base station 470 using the SSID obtained from second device 1000 and obtain information.

Next, information 1001-2 related to an encryption key will be described.

Information 1001-2 related to an encryption key is information related to an encryption key that is necessary in order for terminal 1050 to communicate with base station 470. By obtaining information 1001-2 related to an encryption key from second device 1000, terminal 1050 can perform encrypted communication with base station 470.

This concludes the description of information 1001-1 related to an SSID and information 1001-2 related to an encryption key.

Terminal 1050 in FIG. 15 receives a modulated signal transmitted by second device 1000. Note that in terminal 1050 illustrated in FIG. 15, configurations that operate the same as terminal 150 in FIG. 6 and terminal 450 in FIG. 9 share like reference signs.

Light receiver 151 included in terminal 1050 is, for example, an image sensor such as a CMOS or organic CMOS image sensor. Light receiver 151 receives light including the modulated signal transmitted from second device 1000, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on reception data 154, for example, information 1051 on the SSID of the base station to be connected to and information 1052 on the encryption key for communicating with the base station to be connected to. For example, in a wireless local area network (LAN), examples of encryption schemes include wired equivalent privacy (WEP), Wi-Fi (registered trademark) protected access (WPA), and Wi-Fi protected access 2 (WPA2) (pre-shared key (PSK) mode, extended authentication protocol (EAP) mode). Note that the encryption method is not limited to these examples.

Display 157 receives inputs of information 1051 on the SSID and information 1052 on the encryption key, and, for example, displays (i) the SSID of the communication partner to be accessed by radio device 453 included in terminal 1050 and (ii) the encryption key (hereinafter this display is referred to as the "first display" in this embodiment).

For example, after the first display, radio device 453 receives inputs of information 1051 on the SSID and information 1052 on the encryption key, and establishes a connection with base station 470 (for example, assume the connection uses radio waves). Here, when base station 470 communicates with radio device 453 included in terminal 1050, base station 470 also transmits the modulated signal using, for example, radio waves.

Thereafter, radio device 453 receives inputs of data 1053 and control signal 1054, demodulates data 1053 in accordance with the control indicated in control signal 1054, and transmits the modulated signal over radio waves.

Then, for example, base station 470 transmits data over the network (471) and receives data from the network (472). Thereafter, for example, base station 470 transmits the modulated signal to terminal 1050 over radio waves.

Radio device 453 included in terminal 1050 performs processing such as demodulation and error correction decoding on the modulated signal received over radio waves, and obtains reception data 1056. Display 157 performs display based on reception data 1056.

Figure 16:
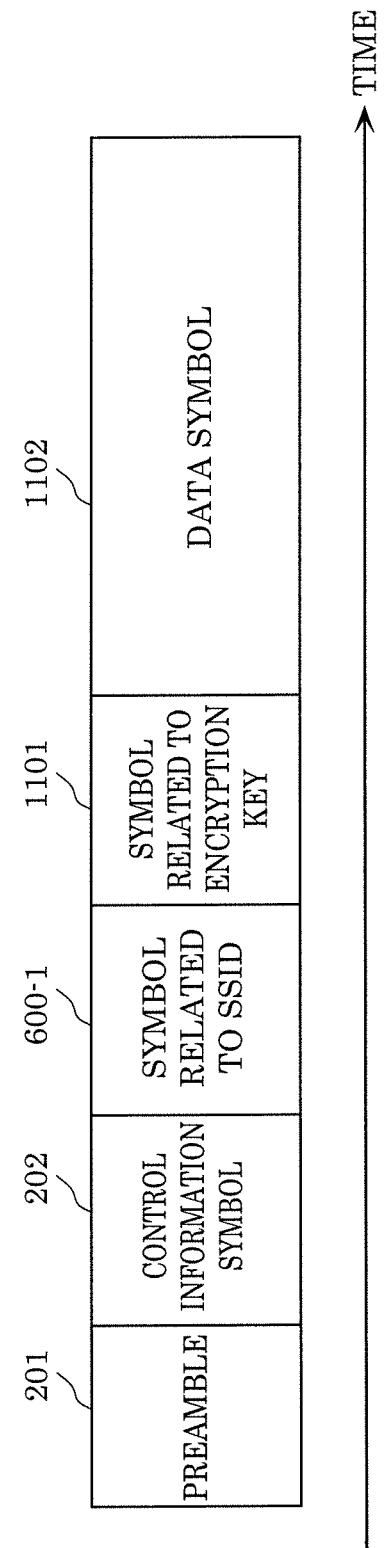
FIG. 16 illustrates a frame configuration example of a modulated signal transmitted by a first device according to Embodiment 4.

FIG. 16 illustrates one example of a frame configuration of a modulated signal transmitted by second device 1000 illustrated in FIG. 15. In FIG. 16, time is represented on the horizontal axis. Moreover, in FIG. 16, symbols that are the same as in FIG. 7 and FIG. 11 share like reference numbers, and repeated description thereof will be omitted.

Symbol 600-1 related to an SSID is a symbol for transmitting information 1001-1 related to an SSID illustrated in FIG. 15, and symbol 1101 related to the encryption key is a symbol for transmitting information 1001-2 related to an encryption key illustrated in FIG. 15. Data symbol 1102 is a symbol for transmitting data 1002 illustrated in FIG. 15.

Second device 1000 transmits preamble 201, control information symbol 202, symbol 600-1 related to an SSID, symbol 1101 related to the encryption key, and data symbol 1102. Note that second device 1000 may transmit a frame including symbols other than those shown in FIG. 16. Moreover, the configuration of the frame, including the order in which the symbols are transmitted, is not limited to the configuration illustrated in FIG. 16.

Figure 17:
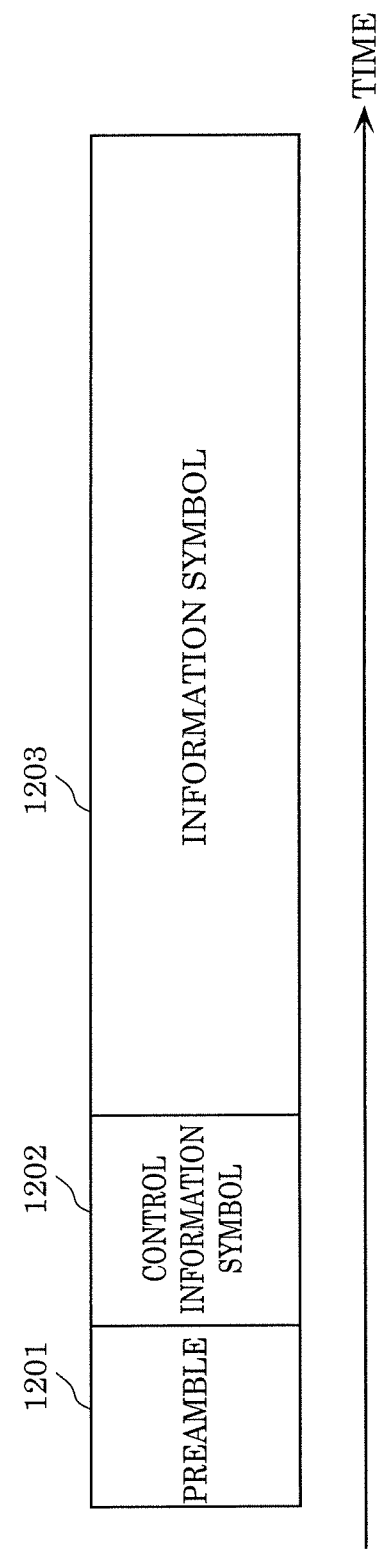
FIG. 17 illustrates a frame configuration example of a modulated signal transmitted by a radio device in a terminal according to Embodiment 4.

FIG. 17 illustrates one example of a frame configuration of a modulated signal transmitted by radio device 453 included in terminal 1050 illustrated in FIG. 15. In FIG. 17, time is represented on the horizontal axis.

As illustrated in FIG. 17, radio device 453 included in terminal 1050 transmits, for example, preamble 1201, and thereafter transmits control information symbol 1202 and information symbol 1203.

Preamble 1201 is a symbol for base station 470 that receives the modulated signal transmitted by radio device 453 in terminal 1050 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used in the generation of the modulated signal, information related to the frame configuration, and information related to transmission method. Based on information on control information symbol 1202, base station 470 implements, for example, demodulation of the modulated signal.

Information symbol 1203 is a symbol for radio device 453 in terminal 1050 to transmit data.

Note that radio device 453 in terminal 1050 may transmit a frame including symbols other than those shown in FIG. 17. For example, radio device 453 may transmit a frame including a pilot symbol (reference symbol) between information symbols 1203. Moreover, the configuration of the frame, including the order in which the symbols are transmitted, is not limited to the configuration illustrated in FIG. 17. Moreover, in FIG. 17, a plurality of symbols may be arranged along the frequency axis. In other words, in FIG. 17, symbols may be present on a plurality of frequencies (a plurality of carriers). Moreover, in Embodiment 3, when radio device 453 included in terminal 450 illustrated in FIG. 9 transmits a modulated signal, the frame configuration illustrated in FIG. 17 may be used.

The frame configuration of the modulated signal transmitted by base station 470 in this embodiment is the same as the frame configuration illustrated in FIG. 12 and described in Embodiment 3. In other words, as illustrated in FIG. 12, base station 470 transmits, for example, preamble 701, and thereafter transmits control information symbol 702 and information symbol 703.

Preamble 701 is a symbol for radio device 453 in terminal 1050 that receives the modulated signal transmitted by base station 470 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, radio device 453 in terminal 1050 implements, for example, demodulation of the modulated signal.

Information symbol 703 is a symbol for base station 470 to transmit information.

Note that base station 470 in FIG. 15 may transmit a frame including symbols other than those shown in FIG. 12. For example, base station 470 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 16 and is transmitted by second device 1000 at a regular timing, e.g., repeatedly transmitted is conceivable. With this, a plurality of terminals 1050 can implement the above-described operations.

Figure 18:
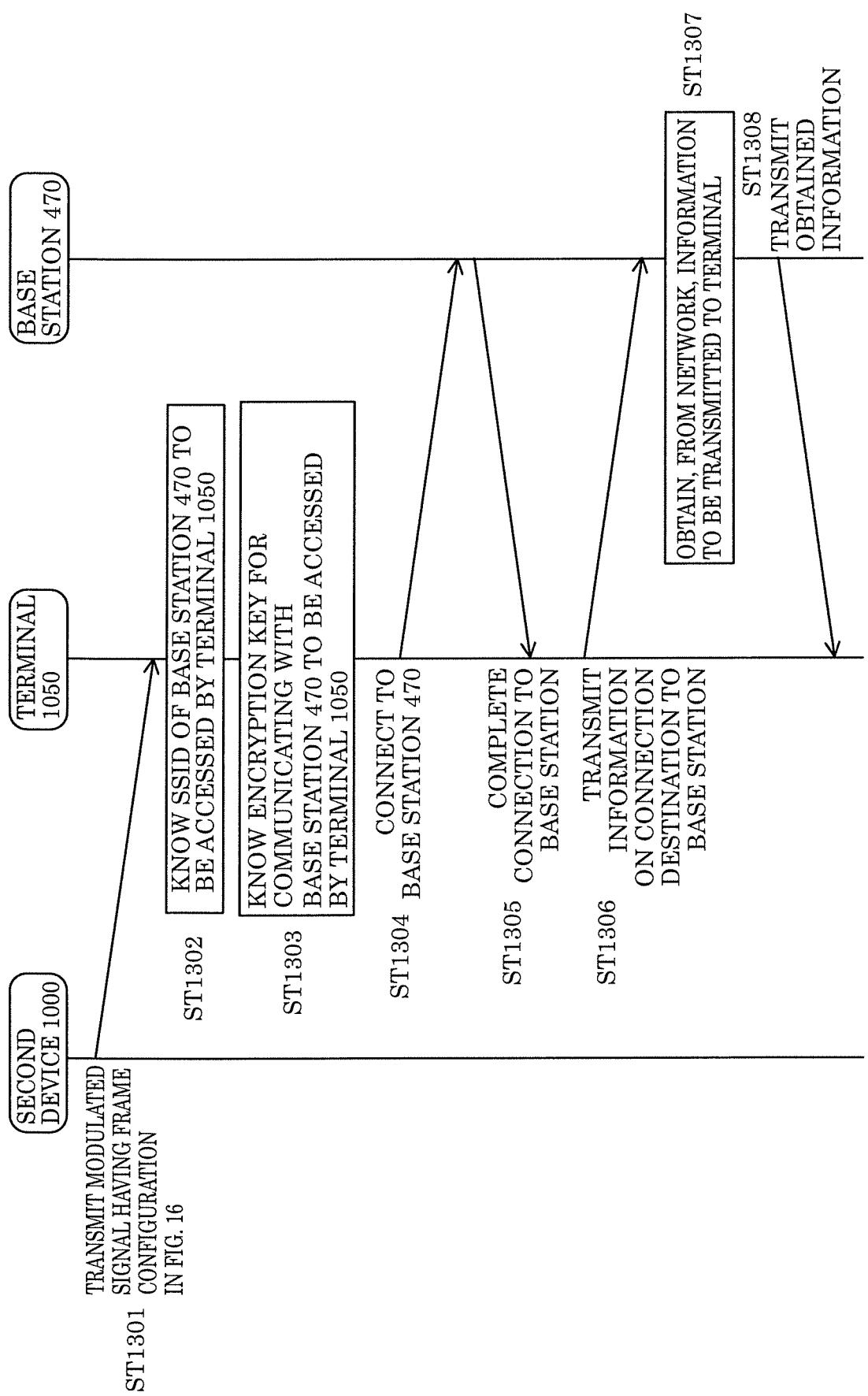
FIG. 18 is a flow chart illustrating an example of processes performed in the communication system according to Embodiment 4.

FIG. 18 is a flow chart illustrating one example of processes implemented by second device 1000, terminal 1050, and base station 470 illustrated in FIG. 15.

First, second device 1000 transmits a modulated signal having the frame configuration illustrated in FIG. 16 (ST1301).

Terminal 1050 obtains the SSID of base station 470 to be accessed by terminal 1050 by receiving the modulated signal transmitted by second device 1000 (ST1302).

Terminal 1050 also obtains the encryption key to be used in communication with base station 470 to be accessed by terminal 1050 (ST1303).

Terminal 1050 then connects with base station 470 over radio waves (ST1304). Terminal 1050 completes the connection with base station 470 by receiving a response from base station 470 (ST1305).

Terminal 1050 then transmits information on the connection destination to base station 470 using radio waves (ST1306).

Base station 470 obtains information for transmitting to terminal 1050 from the network (ST1307).

Base station 470 then transmits the obtained information to terminal 1050 using radio waves, and terminal 1050 obtains the information (ST1308). When necessary, terminal 1050, for example, obtains required information from the network via base station 470.

As described above, based on the information on the SSID and information on the encryption key transmitted from second device 1000, terminal 1050 connects with base station 470 and obtains information to securely obtain information from base station 470, whose security has been authenticated. This is because, when information from a visible light modulated signal is obtained by terminal 1050, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which second device 1000 transmits encryption key information has been described. However, for example, when base station 470 does not perform encrypted communication using an encryption key, second device 1000 may transmit only SSID information, without transmitting encryption key information. In such cases, the present disclosure can be implemented in the same manner simply by removing the configuration related to an encryption key from the above configurations.

Moreover, the configuration of the second device is not limited to the configuration of second device 1000 illustrated in FIG. 15, the configuration of the terminal is not limited to the configuration of terminal 1050 illustrated in FIG. 15, and the connection destination and configuration of the base station is not limited to the connection destination and configuration of base station 470 illustrated in FIG. 15.

Moreover, in the example in FIG. 15, a single base station 470 is present, but a plurality of (secure) base stations (or APs) that terminal 1050 can access may be present. Note that these plurality of base stations and terminal 1050 respectively transmit and receive modulated signals using radio waves. In such cases, the symbol related to an SSID that is transmitted by second device 1000 in FIG. 15 may include information indicating the SSID of each of the plurality of base stations (or APs). In such cases, as the display of the access destination, display 157 in terminal 1050 illustrated in FIG. 15 displays a list of the SSIDs of the plurality of base stations and/or a list of the plurality of access destinations. Moreover, the symbol related to an encryption key that is transmitted by second device 1000 in FIG. 15 may include information indicating the encryption key to be used for connection with each of the plurality of base stations (or APs). Then, based on the information on the SSIDs of the plurality of base stations and the information on the encryption keys to be used for connection with the plurality of base stations, terminal 1050 in FIG. 15 may select one or more base stations to actually wirelessly connect to (via, for example radio waves) (in other words, may concurrently connect to a plurality of base stations).

For example, assume there are three base stations 470. Here, the three base stations 470 shall be referred as base station #A, base station #B, and base station #C. Moreover, assume the SSID of base station #A is "abcdef", the SSID of base station #B is "ghijk", and the SSID of base station #C is "pqrstu". Moreover, assume the encryption key for connecting with base station #A is "123", the encryption key for connecting with base station #B is "456", and the encryption key for connecting with base station #C is "789".

In such cases, symbol 600-1 related to an SSID in the frame configuration illustrated in FIG. 16 of the modulated signal transmitted by second device 1000 includes information indicating that the SSID of base station #A is "abcdef", the SSID of base station #B is "ghijk", and the SSID of base station #C is "pqrstu". Moreover, symbol 1101 related to the encryption key in the frame configuration illustrated in FIG. 16 includes information indicating that the encryption key for connecting with base station #A is "123", the encryption key for connecting with base station #B is "456", and the encryption key for connecting with base station #C is "789".

Terminal 1050 in FIG. 15 receives symbol 600-1 related to an SSID, and thus obtains information indicating that the SSID of base station #A is "abcdef", the SSID of base station #B is "ghijk", and the SSID of base station #C is "pqrstu". Moreover, terminal 1050 receives symbol 1101 related to the encryption key, and thus obtains information indicating that the encryption key for connecting with base station #A is "123", the encryption key for connecting with base station #B is "456", and the encryption key for connecting with base station #C is "789". Then, based on this information, terminal 1050 selects one or more base station to actually wirelessly (via, for example, radio waves) connect to, and connects to the selected one or more base station.

As described in this embodiment, as a result of terminal 1050 setting which base station 470 to access, utilizing a light source, exemplified here as an LED light source, a mode for making a special setting for processes for establishing a wireless connection between terminal 1050 and base station 470 in the modulated signal for connection over radio waves that is transmitted by terminal 1050 is not required. Moreover, a mode for making a special setting for processes for establishing a wireless connection between terminal 1050 and base station 470 in the modulated signal that is transmitted by base station 470 is not required. With this, in this embodiment, data transmission efficiency in radio communication can be improved.

Moreover, the encryption key may be an encryption key for an SSID on a wireless LAN, as described above, and may be an encryption key for limiting the connection type, the service type, or the connection region of a network, for example. In other words, it is acceptable so long as an encryption key for limiting something or other is implemented.

Embodiment 5

Figure 19:
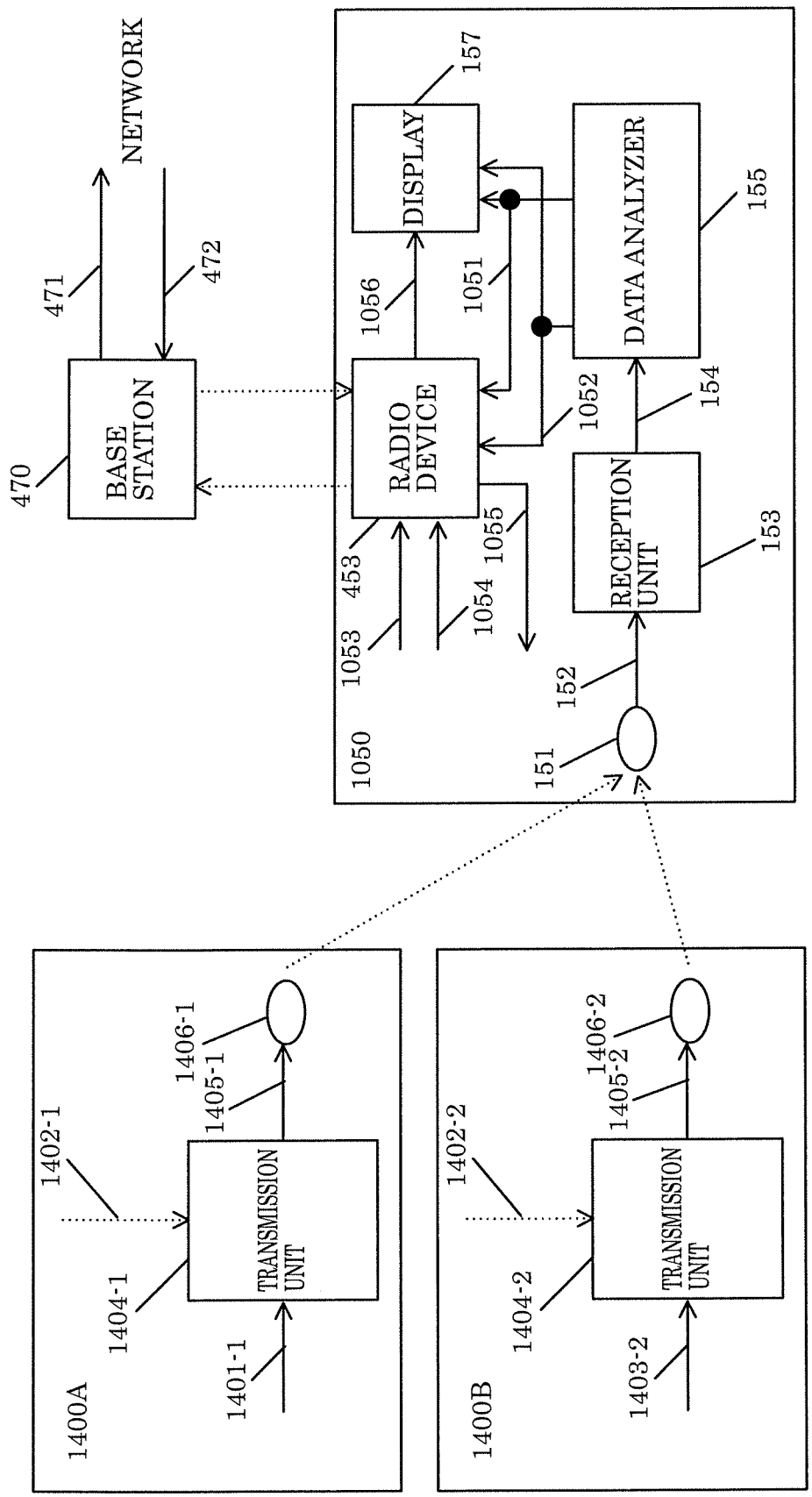
FIG. 19 illustrates a configuration example of a communication system according to Embodiment 5.

FIG. 19 illustrates one example of a configuration of a communication system according to this embodiment.

The communication system illustrated in FIG. 19 includes, for example, devices 1400A and 1400B, terminal 1050, and base station (or AP) 470 that communicates with terminal 1050.

Devices 1400A and 1400B include, for example, an LED visible light source, lamp, light source, and/or light (hereinafter referred to as light sources 1406-1 and 1406-2). Note that hereinafter, device 1400A is also referred to as "third device" and device 1400B is also referred to as "fourth device" in this embodiment.

Moreover, in terminal 1050 illustrated in FIG. 19, configurations that operate the same as terminal 150 illustrated in FIG. 1 or terminal 1050 illustrated in FIG. 15 share like reference signs. Moreover, in base station (or AP) 470 illustrated in FIG. 19, configurations that operate the same as base station 470 illustrated in FIG. 9 have the same references signs as in FIG. 9. Moreover, communication between radio device 453 in terminal 1050 and base station 470 illustrated in FIG. 19 uses, for example, radio waves.

In third device 1400A illustrated in FIG. 19, transmission unit 1404-1 receives inputs of information 1401-1 related to an SSID and data 1402-1, generates modulated signal (for optical communication) 1405-1 based on the input signals, and outputs modulated signal 1405-1. Modulated signal 1405-1 is then transmitted from light source 1406-1, for example.

In fourth device 1400B illustrated in FIG. 19, transmission unit 1404-2 receives inputs of information 1403-2 related to an encryption key and data 1402-2, generates modulated signal (for optical communication) 1405-2 based on the input signals, and outputs modulated signal 1405-2. Modulated signal 1405-2 is then transmitted from light source 1406-2, for example.

Next, information 1401-1 related to an SSID and information 1403-2 related to an encryption key will be described.

First, information 1401-1 related to an SSID will be described.

Information 1401-1 related to an SSID is information indicating the SSID of base station 470 illustrated in FIG. 19. In other words, third device 1400A can provide access to base station 470 via radio waves, which is a secure access destination for terminal 1050. With this, terminal 1050 illustrated in FIG. 19 can securely obtain information from base station 470.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, third device 1400A may transmit a predetermined identifier in an optical signal, and terminal 1050 may determine whether the notified SSID is the SSID of a secure base station or not based on the received identifier.

Note that although the only base station that is illustrated in FIG. 19 is base station 470, even when, for example, a base station (or AP) other than base station 470 is also present, terminal 1050 can access base station 470 using the SSID obtained from third device 1400A and the encryption key obtained from fourth device 1400B, and obtain information.

Next, information 1403-2 related to an encryption key will be described.

Information 1403-2 related to an encryption key is information related to an encryption key that is necessary in order for terminal 1050 to communicate with base station 470 via radio waves. By obtaining information 1403-2 related to an encryption key from fourth device 1400B, terminal 1050 can perform encrypted communication with base station 470.

This concludes the description of information 1401-1 related to an SSID and information 1403-2 related to an encryption key.

Terminal 1050 in FIG. 19 receives a modulated signal transmitted by third device 1400A.

Light receiver 151 included in terminal 1050 is, for example, an image sensor such as a CMOS or organic CMOS image sensor. Light receiver 151 receives light including the modulated signal transmitted from third device 1400A, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on the reception data, for example, information 1051 on the SSID of the base station to be connected to. Radio device 453 obtains, from information 1051 on the SSID, information on the SSID of base station 470 that radio device 453 connects with via radio waves.

Terminal 1050 in FIG. 19 receives a modulated signal transmitted by fourth device 1400B.

Light receiver 151 included in terminal 1050 is, for example, an image sensor such as a CMOS or organic CMOS image sensor. Light receiver 151 receives light including the modulated signal transmitted from fourth device 1400B, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on the reception data, for example, information 1052 on the encryption key for communicating with the base station to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). Note that the encryption method is not limited to these examples.

Radio device 453 included in terminal 1050 obtains, from information 1052 on the encryption key for communicating with the base station to be connected to (via, for example, radio waves), information on the encryption key of base station 470 that radio device 453 is to connect to.

Display 157 receives inputs of information 1051 on the SSID and information 1052 on the encryption key, and, for example, displays (i) the SSID of the communication partner to be accessed by radio device 453 included in terminal 1050 and (ii) the encryption key (hereinafter this display is referred to as the "first display" in this embodiment).

For example, after the first display, radio device 453 receives inputs of information 1051 on the SSID and information 1052 on the encryption key, and establishes a connection with base station 470 via radio waves. Here, when base station 470 communicates with radio device 453 included in terminal 1050, base station 470 also transmits the modulated signal using, for example, radio waves.

Thereafter, radio device 453 receives inputs of data 1053 and control signal 1054, demodulates data 1053 in accordance with the control indicated in control signal 1054, and transmits the modulated signal over radio waves.

Then, for example, base station 470 transmits data over the network (471) and receives data from the network (472). Thereafter, for example, base station 470 transmits the modulated signal to terminal 1050 over radio waves.

Radio device 453 included in terminal 1050 performs processing such as demodulation and error correction decoding on the modulated signal received over radio waves, and obtains reception data 1056. Display 157 performs display based on reception data 1056.

Figure 20:
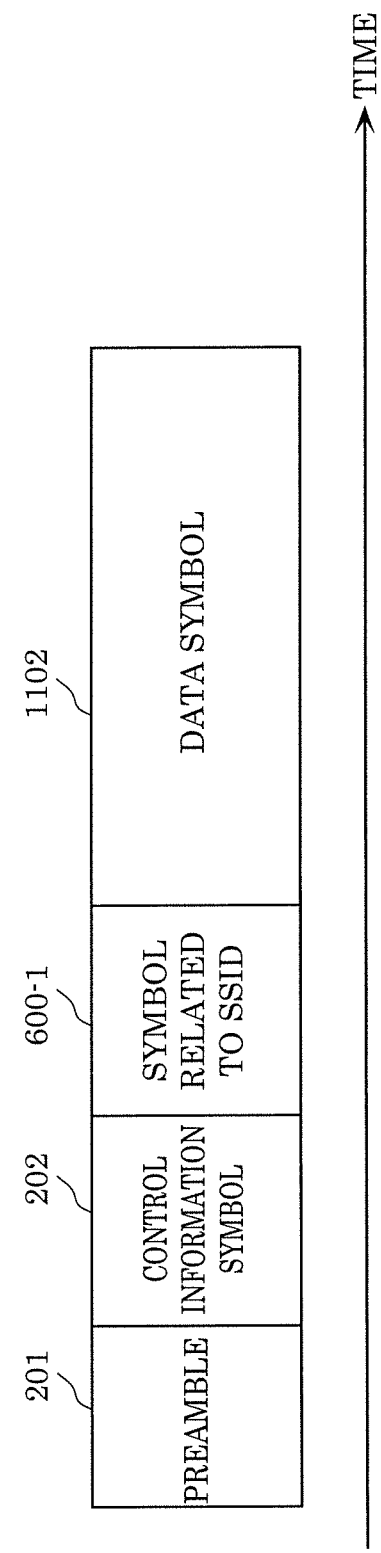
FIG. 20 illustrates a frame configuration example of a modulated signal including an SSID, that is transmitted by a third device according to Embodiment 5.

FIG. 20 illustrates one example of a frame configuration of a modulated signal transmitted by third device 1400A illustrated in FIG. 19. In FIG. 20, time is represented on the horizontal axis. Moreover, in FIG. 20, symbols that are the same as in FIG. 2, FIG. 11, and FIG. 16 share like reference numbers, and repeated description thereof will be omitted.

Symbol 600-1 related to an SSID is a symbol for transmitting information 1401-1 related to an SSID illustrated in FIG. 19. Data symbol 1102 is a symbol for transmitting data 1402-1.

Third device 1400A transmits preamble 201, control information symbol 202, symbol 600-1 related to an SSID, and data symbol 1102. Note that third device 1400A may transmit a frame including symbols other than those shown in FIG. 20. Moreover, the configuration of the frame, including the order in which the symbols are transmitted, is not limited to the configuration illustrated in FIG. 20.

Figure 21:
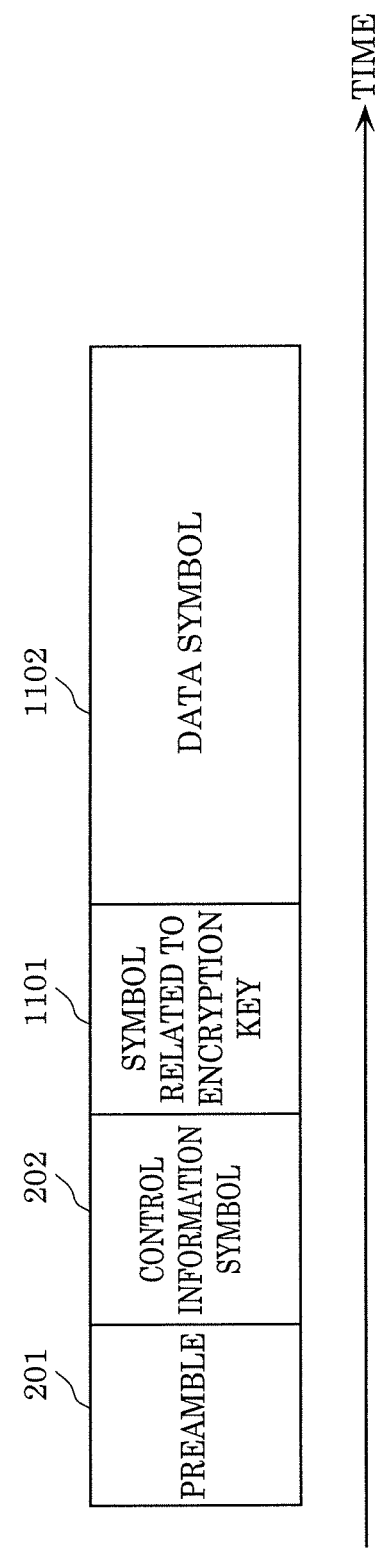
FIG. 21 illustrates a frame configuration example of a modulated signal including an encryption key, that is transmitted by the third device according to Embodiment 5.

FIG. 21 illustrates one example of a frame configuration of a modulated signal transmitted by fourth device 1400B illustrated in FIG. 19. In FIG. 21, time is represented on the horizontal axis. Moreover, in FIG. 21, symbols that are the same as in FIG. 7 and FIG. 16 share like reference numbers, and repeated description thereof will be omitted.

Symbol 1101 related to the encryption key is a symbol for transmitting information 1403-2 related to an encryption key illustrated in FIG. 19. Data symbol 1102 is a symbol for transmitting data 1402-2.

Fourth device 1400B transmits preamble 201, control information symbol 202, symbol 1101 related to the encryption key, and data symbol 1102. Note that fourth device 1400B in FIG. 19 may transmit a frame including symbols other than those shown in FIG. 21. Moreover, the configuration of the frame, including the order in which the symbols are transmitted, is not limited to the configuration illustrated in FIG. 21.

The frame configuration of the modulated signal transmitted by radio device 453 in this embodiment is the same as the frame configuration illustrated in FIG. 17 and described in Embodiment 4. In other words, as illustrated in FIG. 17, radio device 453 included in terminal 1050 transmits, for example, preamble 1201, and thereafter transmits control information symbol 1202 and information symbol 1203.

Preamble 1201 is a symbol for base station (or AP) 470 that receives the modulated signal transmitted by radio device 453 in terminal 1050 illustrated in FIG. 19 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used in the generation of the modulated signal, information related to the frame configuration, and information related to transmission method. Based on information on control information symbol 1202, base station 470 implements, for example, demodulation of the modulated signal.

Information symbol 1203 is a symbol for radio device 453 in terminal 1050 to transmit data.

Note that radio device 453 in terminal 1050 illustrated in FIG. 19 may transmit a frame including symbols other than those shown in FIG. 17. For example, radio device 453 may transmit a frame including a pilot symbol (reference symbol) between information symbols 1203. Moreover, the configuration of the frame, including the order in which the symbols are transmitted, is not limited to the configuration illustrated in FIG. 17. Moreover, in FIG. 17, a plurality of symbols may be arranged along the frequency axis. In other words, in FIG. 17, symbols may be present on a plurality of frequencies (a plurality of carriers).

The frame configuration of the modulated signal transmitted by base station 470 in this embodiment is the same as the frame configuration illustrated in FIG. 12 and described in Embodiment 3. In other words, as illustrated in FIG. 12, base station 470 transmits, for example, preamble 701, and thereafter transmits control information symbol 702 and information symbol 703.

Preamble 701 is a symbol for radio device 453 in terminal 1050 illustrated in FIG. 19 that receives the modulated signal transmitted by base station 470 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, radio device 453 in terminal 1050 illustrated in FIG. 19 implements, for example, demodulation of the modulated signal.

Information symbol 703 is a symbol for base station 470 illustrated in FIG. 19 to transmit information.

Note that base station 470 in FIG. 19 may transmit a frame including symbols other than those shown in FIG. 12. For example, base station 470 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 20 and is transmitted by third device 1400A at a regular timing, e.g., repeatedly transmitted is conceivable. With this, a plurality of terminals 1050 can implement the above-described operations. Similarly, a modulated signal that has the frame configuration illustrated in FIG. 21 and is transmitted by fourth device 1400B at a regular timing, e.g., repeatedly transmitted is conceivable. With this, a plurality of terminals 1050 can implement the above-described operations.

Figure 22:
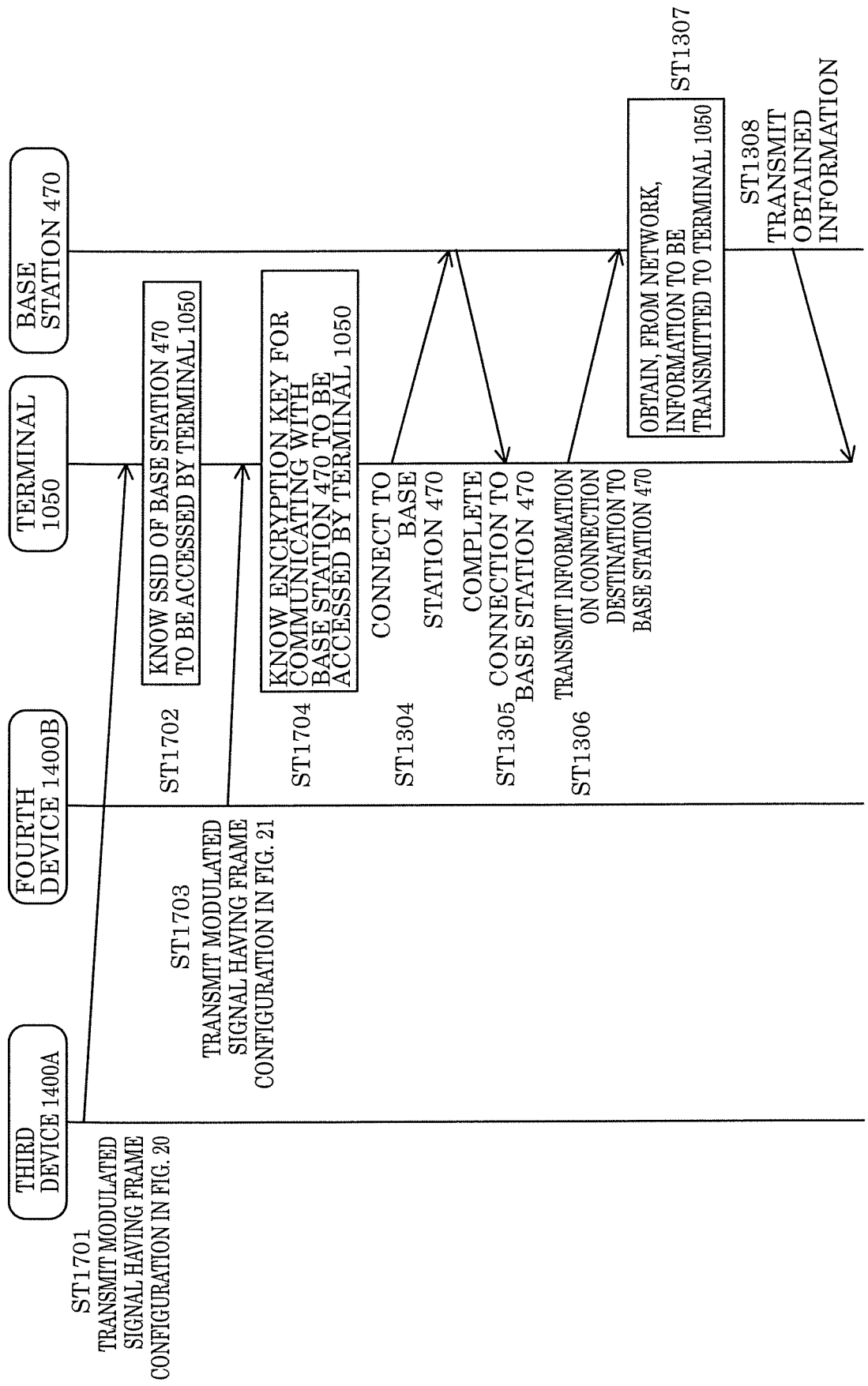
FIG. 22 is a flow chart illustrating an example of processes performed in the communication system according to Embodiment 5.

FIG. 22 is a flow chart illustrating a first example of processes implemented by third device 1400A, fourth device 1400B, terminal 1050, and base station 470 illustrated in FIG. 19. Note that in FIG. 22, configurations that operate in the same manner as FIG. 18 share like reference signs.

First, third device 1400A transmits a modulated signal having the frame configuration illustrated in FIG. 20 (ST1701).

Terminal 1050 obtains the SSID of base station 470 to be accessed by terminal 1050 by receiving the modulated signal transmitted by third device 1400A (ST1702).

Next, fourth device 1400B transmits a modulated signal having the frame configuration illustrated in FIG. 21 (ST1703).

Terminal 1050 obtains the encryption key used to communicate with base station 470 to be accessed by terminal 1050 by receiving the modulated signal transmitted by fourth device 1400B (ST1704).

Terminal 1050 then connects with base station 470 over radio waves (ST1304). Terminal 1050 completes the connection with base station 470 over radio waves by receiving a response from base station 470 (ST1305).

Terminal 1050 then transmits information on the connection destination to base station 470 using radio waves (ST1306).

Base station 470 obtains information for transmitting to terminal 1050 from the network (ST1307).

Base station 470 then transmits the obtained information to terminal 1050 using radio waves, and terminal 1050 obtains the information (ST1308). When necessary, terminal 1050, for example, obtains required information from the network via base station 470.

Figure 23:
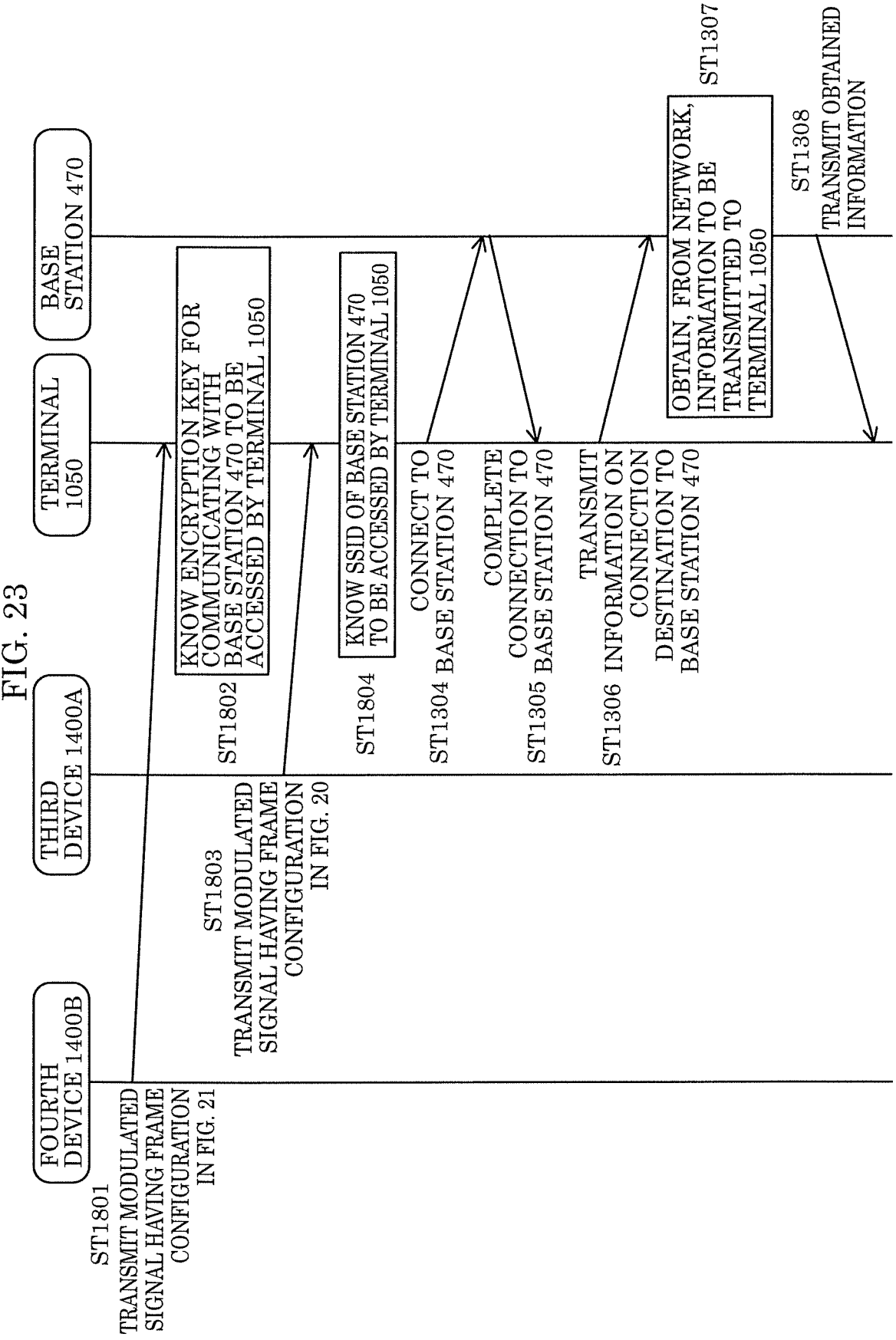
FIG. 23 is a flow chart illustrating another example of processes performed in the communication system according to Embodiment 5.

FIG. 23 is a flow chart illustrating a second example of processes implemented by third device 1400A, fourth device 1400B, terminal 1050, and base station 470 illustrated in FIG. 19. Note that in FIG. 23, configurations that operate in the same manner as FIG. 18 share like reference signs.

First, fourth device 1400B transmits a modulated signal having the frame configuration illustrated in FIG. 21 (ST1801).

Terminal 1050 obtains the encryption key used to communicate with base station 470 to be accessed by terminal 1050 by receiving the modulated signal transmitted by fourth device 1400B (ST1802).

Next, third device 1400A transmits a modulated signal having the frame configuration illustrated in FIG. 20 (ST1803).

Terminal 1050 obtains the SSID of base station 470 to be accessed by terminal 1050 by receiving the modulated signal transmitted by third device 1400A (ST1804).

Terminal 1050 then connects with base station 470 over radio waves (ST1304). Terminal 1050 completes the connection with base station 470 over radio waves by receiving a response from base station 470 (ST1305).

Terminal 1050 then transmits information on the connection destination to base station 470 using radio waves (ST1306).

Base station 470 obtains information for transmitting to terminal 1050 from the network (ST1307).

Base station 470 then transmits the obtained information to terminal 1050 using radio waves, and terminal 1050 obtains the information (ST1308). When necessary, terminal 1050, for example, obtains required information from the network via base station 470.

As described above, based on the SSID transmitted from third device 1400A and the encryption key information transmitted from fourth device 1400B, terminal 1050 connects with base station 470 and obtains information. In other words, since the device that terminal 1050 obtains the SSID information from and the device that terminal 1050 obtains the encryption key information from are different, terminal 1050 can securely obtain the information via base station 470 whose security has been authenticated. This is because, when information from a visible light modulated signal is obtained by terminal 1050, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which fourth device 1400B transmits encryption key information has been described. However, for example, when base station 470 does not perform encrypted communication using an encryption key, third device 1400A may transmit SSID information, and fourth device 1400B need not transmit encryption key information. In such cases, the present disclosure can be implemented in the same manner simply by removing the configuration related to an encryption key from the above configurations.

Moreover, like in this embodiment, by employing a configuration in which the device that transmits the information related to an SSID (third device 1400A) and the device that transmits information related to an encryption key (fourth device 1400B) are separate devices, it is possible for terminal 1050 to more securely communicate with base station 470.

Figure 24:
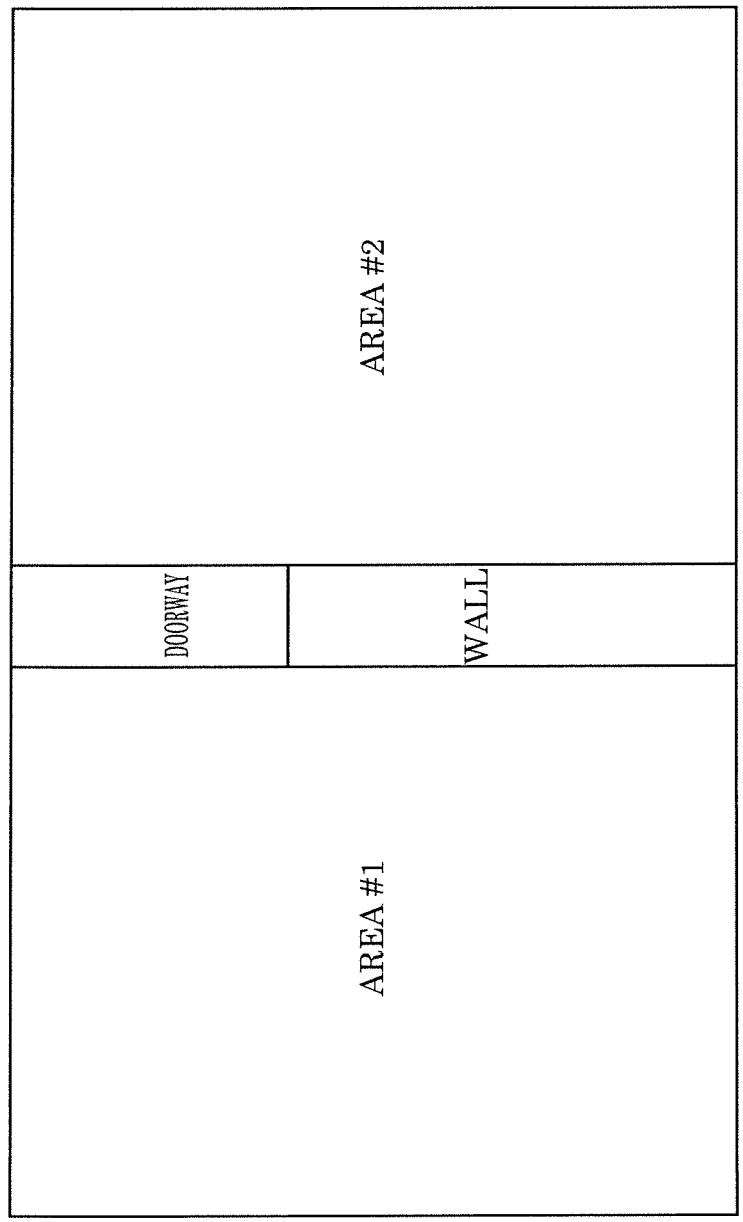
FIG. 24 illustrates one example of a space in which the communication system according to Embodiment 5 is disposed.

For example, consider the space illustrated in FIG. 24. As illustrated in FIG. 24, the space includes area #1 and area #2, and a wall and a doorway between area #1 and area #2. In other words, in the space illustrated in FIG. 24, movement from area #1 to area #2 and movement from area #2 to area #1 is only possible through the doorway.

Base station 470, third device 1400A, and fourth device 1400B are disposed in area #1 in FIG. 24. Only third device 1400A is disposed in area #2. Moreover, assume that the radio waves transmitted by base station 470 are receivable in either of areas #1 or #2 in FIG. 24.

Here, terminal 1050 in area #1 in which fourth device 1400B is disposed can obtain the encryption key for base station 470 from fourth device 1400B and communicate with base station 470. Moreover, even when terminal 1050 connected to base station 470 in area #1 moves to area #2, terminal 1050 can still communicate with base station 470 using the encryption key obtained from fourth device 1400B in area #1. Additionally, even when terminal 1050 connected to base station 470 in area #1 moves to an area other than area #1 or area #2 and then returns to either one of areas #1 or #2, terminal 1050 can still communicate with base station 470 using the encryption key obtained from fourth device 1400B in area #1.

However, terminal 1050 that cannot enter area #1 cannot obtain an encryption key from fourth device 1400B. In such cases, terminal 1050 knows only the SSID of base station (or AP) 470. Therefore, for example, communication with base station 470 via a service that can be accepted with nothing more than knowledge of the SSID of base station 470 may be received by terminal 1050. The service that can be accepted with nothing more than knowledge of the SSID of base station 470 can be more restrictive than a service that can be accepted when both the SSID and the encryption key are known.

Accordingly, it is possible to exclusively allow only terminal 1050 that can enter area #1 to communicate with base station 470. This makes it possible to assure secure communication. Moreover, this makes it possible to construct a system that can provide different services for different areas.

Note that by changing (for example, on a per time interval basis) the encryption key for terminal 1050 to communicate with base station 470, it is possible to prohibit terminal 1050 having an old encryption key from before the change from communicating with base station 470. Using such a system makes it possible to provide even more secure communication.

Moreover, the configuration of the third device is not limited to the configuration of third device 1400A illustrated in FIG. 19, the configuration of the fourth device is not limited to the configuration of fourth device 1400B illustrated in FIG. 19, the configuration of the terminal is not limited to the configuration of terminal 1050 illustrated in FIG. 19, and the connection destination and configuration of the base station is not limited to the connection destination and configuration of base station 470 illustrated in FIG. 19.

Moreover, in the example in FIG. 19, a single base station 470 is present, but a plurality of (secure) base stations (or APs) that terminal 1050 can access may be present. In such cases, the symbol related to an SSID that is transmitted by third device 1400A in FIG. 19 may include information indicating the SSID of each of the plurality of base stations 470. Moreover, the symbol related to an encryption key that is transmitted by fourth device 1400B in FIG. 19 may include information indicating the encryption key to be used for connection with each of the plurality of base stations. In such cases, as the display of the access destination (the "first display" described above), display 157 in terminal 1050 illustrated in FIG. 19 displays a list of the SSIDs of the plurality of base stations and/or a list of the plurality of access destinations. Then, based on the information on the SSIDs of the plurality of base stations and the information on the encryption keys to be used for connection with the plurality of base stations, terminal 1050 in FIG. 19 may select one or more base stations to actually wirelessly connect to (in other words, may concurrently connect to a plurality of base stations).

For example, assume there are three base stations 470. Here, the three base stations 470 shall be referred as base station #A, base station #B, and base station #C. Moreover, assume the SSID of base station #A is "abcdef", the SSID of base station #B is "ghijk", and the SSID of base station #C is "pqrstu". Moreover, assume the encryption key for connecting with base station #A is "123", the encryption key for connecting with base station #B is "456", and the encryption key for connecting with base station #C is "789".

In such cases, symbol 600-1 related to an SSID in the frame configuration illustrated in FIG. 20 of the modulated signal transmitted by third device 1400A includes information indicating that the SSID of base station #A is "abcdef", the SSID of base station #B is "ghijk", and the SSID of base station #C is "pqrstu". Moreover, symbol 1101 related to the encryption key in the frame configuration illustrated in FIG. 21 of the modulated signal transmitted by fourth device 1400B includes information indicating that the encryption key for connecting with base station #A is "123", the encryption key for connecting with base station #B is "456", and the encryption key for connecting with base station #C is "789".

Terminal 1050 in FIG. 19 receives symbol 600-1 related to an SSID, and thus obtains information indicating that the SSID of base station #A is "abcdef", the SSID of base station #B is "ghijk", and the SSID of base station #C is "pqrstu". Moreover, terminal 1050 receives symbol 1101 related to the encryption key, and thus obtains information indicating that the encryption key for connecting with base station #A is "123", the encryption key for connecting with base station #B is "456", and the encryption key for connecting with base station #C is "789". Then, based on this information, terminal 1050 selects a base station to wirelessly (via, for example, radio waves) connect to, and connects to the selected base station.

As described in this embodiment, as a result of terminal 1050 setting which base station 470 to access, utilizing a light source, exemplified here as an LED light source, a mode for making a special setting for processes for establishing a wireless connection between terminal 1050 and base station 470 in the modulated signal for connection over radio waves that is transmitted by terminal 1050 is not required. Moreover, a mode for making a special setting for processes for establishing a wireless connection between terminal 1050 and base station 470 in the modulated signal that is transmitted by base station 470 is not required. With this, in this embodiment, data transmission efficiency in radio communication can be improved.

Moreover, the encryption key may be an encryption key for an SSID on a wireless LAN, as described above, and may be an encryption key for limiting the connection type, the service type, or the connection region of a network, for example. In other words, it is acceptable so long as an encryption key for limiting something or other is implemented.

Embodiment 6

Figure 25:
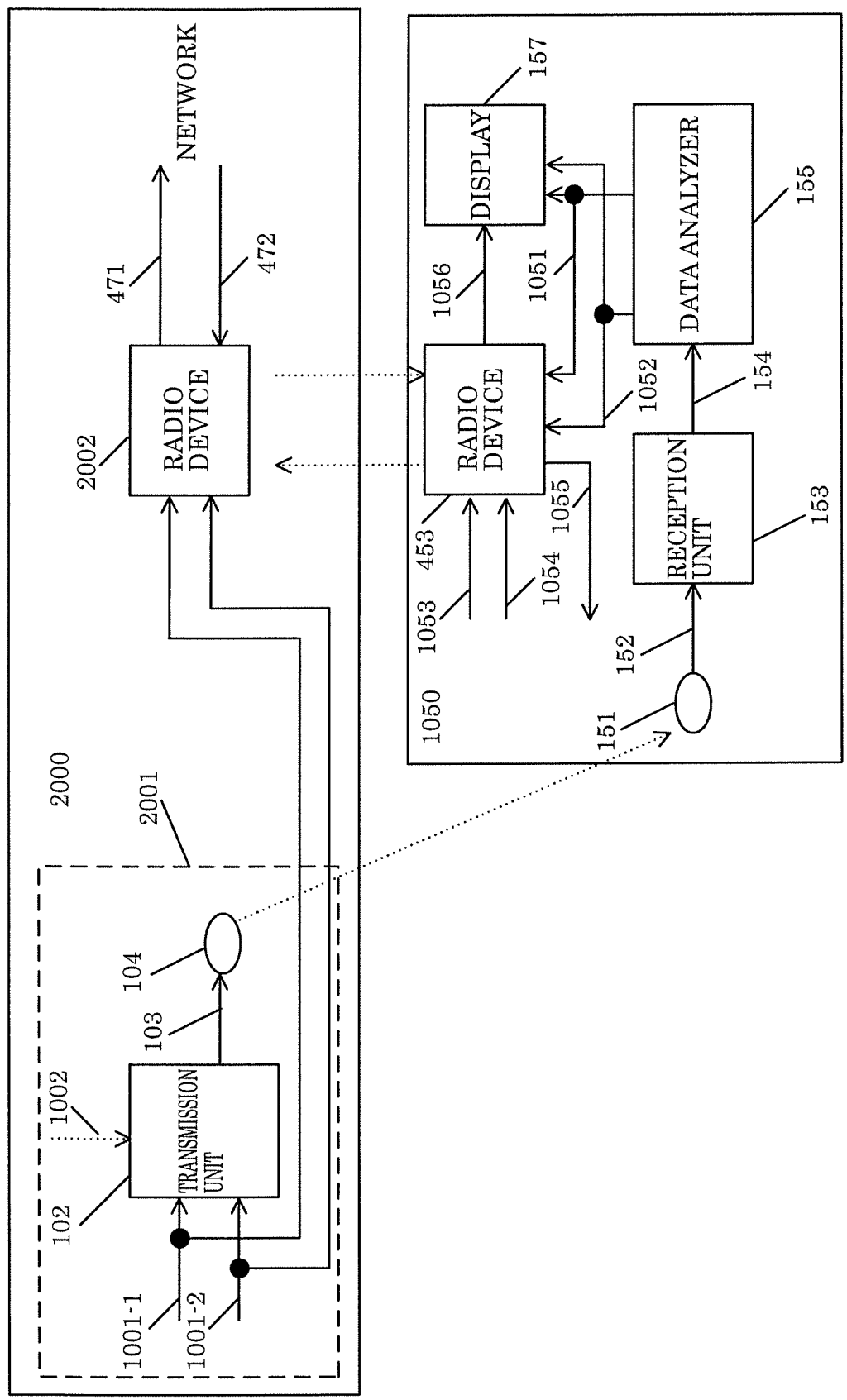
FIG. 25 illustrates a configuration example of a communication system according to Embodiment 6.

FIG. 25 illustrates one example of a configuration of a communication system according to this embodiment.

The communication system illustrated in FIG. 25 includes, for example, base station 2000 and terminal 1050. Moreover, base station 2000 includes transmission device 2001 and radio device 2002. In FIG. 25, symbols that are the same as in FIG. 6 and FIG. 15 share like reference numbers, and repeated description thereof will be omitted. Moreover, communication between radio device 2002 and radio device 453 illustrated in FIG. 25 uses, for example, radio waves.

Transmission device 2001 included in base station (or AP) 2000 in FIG. 25 includes, for example, an LED visible light source, lamp, light source, and/or light (hereinafter referred to as "light source 104"). First, operations performed by transmission device 2001 (i.e., the element related to the LED lamp, light source, and/or light that emits visible light) will be described.

In transmission device 2001, transmission unit 102 receives inputs of information 1001-1 related to an SSID, information 1001-2 related to an encryption key, and data 1002, generates modulated signal (for optical communication) 103 based on the input signals, and outputs modulated signal 103. Modulated signal 103 is then transmitted from light source 104, for example.

Next, information 1001-1 related to an SSID and information 1001-2 related to an encryption key will be described.

First, information 1001-1 related to an SSID will be described.

Information 1001-1 related to an SSID is information indicating the SSID of radio device 2002, which uses radio waves and is included in base station 2000 illustrated in FIG. 25. In other words, transmission device 2001 can provide access to radio device 2002, which is a wireless secure access destination for terminal 1050. With this, terminal 1050 illustrated in FIG. 25 can securely obtain information from radio device 2002.

On the other hand, transmission device 2001 can restrict the terminals that access radio device 2002 to terminals in a space in which it is possible to receive optical signals transmitted (emitted) by transmission device 2001.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, transmission device 2001 may transmit a predetermined identifier in an optical signal, and terminal 1050 may determine whether the notified SSID is the SSID of a secure base station or not based on the received identifier.

Note that although the only base station that is illustrated in FIG. 25 is base station 2000, even when, for example, a base station (or AP) other than base station 2000 is also present, terminal 1050 can access radio device 2002 of base station 2000 using the SSID and the encryption key obtained from transmission device 2001, and obtain information.

Next, information 1001-2 related to an encryption key will be described.

Information 1001-2 related to an encryption key is information related to an encryption key that is necessary in order for terminal 1050 to communicate with radio device 2002. By obtaining information 1001-2 related to an encryption key from transmission device 2001, terminal 1050 can perform encrypted communication with radio device 2002.

This concludes the description of information 1001-1 related to an SSID and information 1001-2 related to an encryption key.

Terminal 1050 in FIG. 25 receives a modulated signal transmitted by transmission device 2001. Note that in terminal 1050 illustrated in FIG. 25, configurations that operate the same as terminal 150 in FIG. 6 and terminal 1050 in FIG. 15 share like reference signs.

Light receiver 151 included in terminal 1050 is, for example, an image sensor such as a CMOS or organic CMOS image sensor. Light receiver 151 receives light including the modulated signal transmitted from transmission device 2001, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on the reception data, for example, information 1051 on the SSID for radio device 2002 included in base station 2000 to be connected to, and information 1052 on the encryption key for communicating with radio device 2002 included in base station 2000 to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). Note that the encryption method is not limited to these examples.

Display 157 receives inputs of information 1051 on the SSID and information 1052 on the encryption key, and, for example, displays (i) the SSID of the communication partner to be accessed by radio device 453 included in terminal 1050 and (ii) the encryption key (hereinafter this display is referred to as the "first display" in this embodiment).

For example, after the first display, radio device 453 receives inputs of information 1051 on the SSID and information 1052 on the encryption key, and establishes a connection with radio device 2002 in base station 2000 (for example, assume the connection uses radio waves). Here, when radio device 2002 in base station 2000 communicates with radio device 453 included in terminal 1050, radio device 2002 also transmits the modulated signal using, for example, radio waves.

Thereafter, radio device 453 receives inputs of data 1053 and control signal 1054, demodulates data 1053 in accordance with the control indicated in control signal 1054, and transmits the modulated signal over radio waves.

Then, for example, radio device 2002 in base station 2000 transmits data over the network (471) and receives data from the network (472). Thereafter, for example, radio device 2002 in base station 2000 transmits the modulated signal to terminal 1050 over radio waves.

Radio device 453 included in terminal 1050 performs processing such as demodulation and error correction decoding on the modulated signal received over radio waves, and obtains reception data 1056. Display 157 performs display based on reception data 1056.

The frame configuration of the modulated signal transmitted by transmission device 2001 in base station 2000 according to this embodiment is the same as the frame configuration illustrated in FIG. 16 and described in Embodiment 4. In other words, in FIG. 16, symbol 600-1 related to an SSID is a symbol for transmitting information 1001-1 related to an SSID illustrated in FIG. 25, and symbol 1101 related to the encryption key is a symbol for transmitting information 1001-2 related to an encryption key illustrated in FIG. 25. Data symbol 1102 is a symbol for transmitting data 1002 illustrated in FIG. 25.

As illustrated in FIG. 16, transmission device 2001 in base station 2000 transmits preamble 201, control information symbol 202, symbol 600-1 related to an SSID, symbol 1101 related to the encryption key, and data symbol 1102. Note that transmission device 2001 in base station 2000 may transmit a frame including symbols other than those shown in FIG. 16. Moreover, the configuration of the frame, including the order in which the symbols are transmitted, is not limited to the configuration illustrated in FIG. 16.

The frame configuration of the modulated signal transmitted by radio device 453 included in terminal 1050 according to this embodiment is the same as the frame configuration illustrated in FIG. 17 and described in Embodiment 4. In other words, as illustrated in FIG. 17, radio device 453 included in terminal 1050 and illustrated in FIG. 25 transmits, for example, preamble 1201, and thereafter transmits control information symbol 1202 and information symbol 1203.

Here, preamble 1201 is a symbol for radio device 2002 in base station 2000 that receives the modulated signal transmitted by radio device 453 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used by terminal 1050 in the generation of the modulated signal, information related to the frame configuration, and information related to transmission method. Based on information on control information symbol 1202, radio device 2002 in base station 2000 implements, for example, demodulation of the modulated signal.

Information symbol 1203 is a symbol for radio device 453 in terminal 1050 to transmit data.

Note that radio device 453 in terminal 1050 may transmit a frame including symbols other than those shown in FIG. 17. For example, radio device 453 may transmit a frame including a pilot symbol (reference symbol) between information symbols 1203. Moreover, the configuration of the frame, including the order in which the symbols are transmitted, is not limited to the configuration illustrated in FIG. 17. Moreover, in FIG. 17, a plurality of symbols may be arranged along the frequency axis. In other words, in FIG. 17, symbols may be present on a plurality of frequencies (a plurality of carriers).

The frame configuration of the modulated signal transmitted by radio device 2002 in this embodiment is the same as the frame configuration illustrated in FIG. 12 and described in Embodiment 3. In other words, as illustrated in FIG. 12, radio device 2002 transmits, for example, preamble 701, and thereafter transmits control information symbol 702 and information symbol 703.

Preamble 701 is a symbol for radio device 453 in terminal 1050 that receives the modulated signal transmitted by radio device 2002 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, radio device 453 in terminal 1050 implements, for example, demodulation of the modulated signal.

Information symbol 703 is a symbol for radio device 2002 to transmit information.

Note that radio device 2002 included in base station 2000 illustrated in FIG. 25 may transmit a frame including symbols other than those shown in FIG. 12. For example, radio device 2002 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 16 and is transmitted by transmission device 2001 at a regular timing, e.g., repeatedly transmitted is conceivable. With this, a plurality of terminals 1050 can implement the above-described operations.

Figure 26:
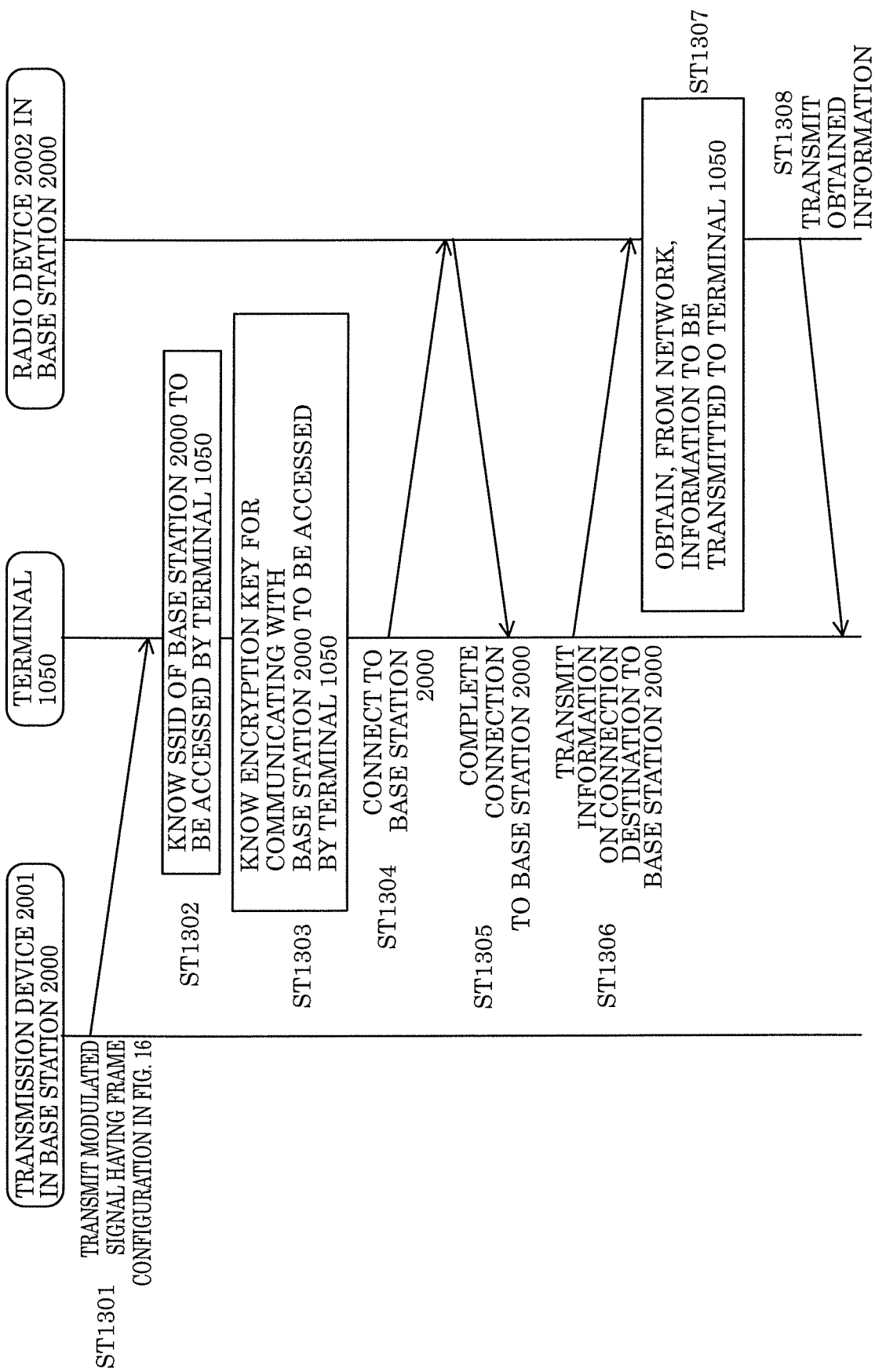
FIG. 26 is a flow chart illustrating an example of processes performed in the communication system according to Embodiment 6.

FIG. 26 is a flow chart illustrating one example of processes implemented by transmission device 2001 in base station 2000, terminal 1050, and radio device 2002 in base station 2000 illustrated in FIG. 25.

First, transmission device 2001 transmits a modulated signal having the frame configuration illustrated in FIG. 16 (ST1301).

Terminal 1050 obtains the SSID of base station 2000 (radio device 2002) to be accessed by terminal 1050 by receiving the modulated signal transmitted by transmission device 2001 (ST1302).

Terminal 1050 also obtains the encryption key to be used in communication with base station 2000 (radio device 2002) to be accessed by terminal 1050 (ST1303).

Terminal 1050 then connects with radio device 2002 in base station 2000 over radio waves (ST1304). Terminal 1050 completes the connection with radio device 2002 in base station 2000 by receiving a response from radio device 2002 in base station 2000 (ST1305).

Terminal 1050 then transmits information on the connection destination to radio device 2002 in base station 2000 using radio waves (ST1306).

Radio device 2002 in base station 2000 obtains information for transmitting to terminal 1050 from the network (ST1307).

Radio device 2002 in base station 2000 then transmits the obtained information to terminal 1050 using radio waves, and terminal 1050 obtains the information (ST1308). When necessary, terminal 1050, for example, obtains required information from the network via radio device 2002 in base station 2000.

As described above, based on the information on the SSID and information on the encryption key transmitted from transmission device 2001 in base station 2000, terminal 1050 connects with radio device 2002 in base station 2000 and obtains information to securely obtain information from base station 2000, whose security has been authenticated. This is because, when information from a visible light modulated signal is obtained by terminal 1050, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which transmission device 2001 transmits encryption key information has been described. However, for example, when radio device 2002 in base station 2000 does not perform encrypted communicating using an encryption key, transmission device 2001 may transmit only SSID information, without transmitting encryption key information. In such cases, the present disclosure can be implemented in the same manner simply by removing the configuration related to an encryption key from the above configurations included in transmission device 2001.

Moreover, as illustrated in FIG. 25, a configuration is acceptable in which the SSID and encryption key of radio device 2002 in base station 2000 can be rewritten. For example, in FIG. 25, radio device 2002 receives inputs of information 1001-1 related to an SSID and information 1001-2 related to an encryption key. Radio device 2002 in base station 2000 overwrites the SSID and the encryption key in accordance with the input information 1001-1 related to an SSID and information 1001-2 related to an encryption key. With this configuration, even more secure communication between terminal 1050 and radio device 2002 in base station 2000 can be assured. Note that in FIG. 25, although radio device 2002 in base station 2000 has a function of overwriting the SSID and the encryption key, a configuration in which the function for overwriting both or one of the SSID and the encryption key is also acceptable.

Moreover, the configuration of the transmission device is not limited to the configuration of transmission device 2001 illustrated in FIG. 25, the configuration of the terminal is not limited to the configuration of terminal 1050 illustrated in FIG. 25, and the connection destination and configuration of the radio device is not limited to the connection destination and configuration of radio device 2002 illustrated in FIG. 25.

Moreover, in the example in FIG. 25, a single base station 2000 is present, but a plurality of radio devices 2002 in (secure) base stations (or APs) 2000 that terminal 1050 can access may be present. Note that these plurality of radio devices 2002 in base stations 2000 and terminal 1050 respectively transmit and receive modulated signals using radio waves. In such cases, the symbol related to an SSID that is transmitted by transmission device 2001 in FIG. 25 may include information indicating the SSID of each of the plurality of radio devices 2002 in base stations 2000. Moreover, the symbol related to an encryption key that is transmitted by transmission device 2001 in FIG. 25 may include information indicating the encryption key to be used for connection with each of the plurality of radio devices 2002 in base stations 2000. Terminal 1050 in FIG. 25 may select a radio device 2002 in a base station 2000 to wirelessly connect to (for example, over radio waves), based on the information on the SSIDs and encryption key information of the plurality of radio devices 2002 in base stations 2000 (or connect to the plurality of radio devices 2002 in base stations 2000).

For example, assume there are three base stations 2000 including radio devices 2002. Here, the three radio devices 2002 in the three base stations 2000 shall be referred as radio device #A, radio device #B, and radio device #C. Moreover, assume the SSID of radio device #A is "abcdef", the SSID of radio device #B is "ghijk", and the SSID of radio device #C is "pqrstu". Moreover, assume the encryption key for connecting with radio device #A is "123", the encryption key for connecting with radio device #B is "456", and the encryption key for connecting with radio device #C is "789".

In such cases, symbol 600-1 related to an SSID in the frame configuration illustrated in FIG. 16 of the modulated signal transmitted by transmission device 2001 includes information indicating that the SSID of radio device #A is "abcdef", the SSID of radio device #B is "ghijk", and the SSID of radio device #C is "pqrstu". Moreover, symbol 1101 related to the encryption key in the frame configuration illustrated in FIG. 16 includes information indicating that the encryption key for connecting with radio device #A is "123", the encryption key for connecting with radio device #B is "456", and the encryption key for connecting with radio device #C is "789".

Terminal 1050 in FIG. 25 receives symbol 600-1 related to an SSID, and thus obtains information indicating that the SSID of radio device #A is "abcdef", the SSID of radio device #B is "ghijk", and the SSID of radio device #C is "pqrstu". Moreover, terminal 1050 receives symbol 1101 related to the encryption key, and thus obtains information indicating that the encryption key for connecting with radio device #A is "123", the encryption key for connecting with radio device #B is "456", and the encryption key for connecting with radio device #C is "789". Then, based on this information, terminal 1050 selects a base station to wirelessly (via, for example, radio waves) connect to, and connects to the selected base station.

As described in this embodiment, as a result of terminal 1050 setting which radio device 2002 in base station 2000 to access, utilizing a light source, exemplified here as an LED light source, a mode for making a special setting for processes for establishing a wireless connection between terminal 1050 and base station 2000 in the modulated signal for connection over radio waves that is transmitted by terminal 1050 is not required. Moreover, a mode for making a special setting for processes for establishing a wireless connection between terminal 1050 and base station 2000 in the modulated signal that is transmitted by base station 2000 is not required. With this, in this embodiment, data transmission efficiency in radio communication can be improved.

Moreover, the encryption key may be an encryption key for an SSID on a wireless LAN, as described above, and may be an encryption key for limiting the connection type, the service type, or the connection region of a network, for example. In other words, it is acceptable so long as an encryption key for limiting something or other is implemented.

Embodiment 7

Figure 27:
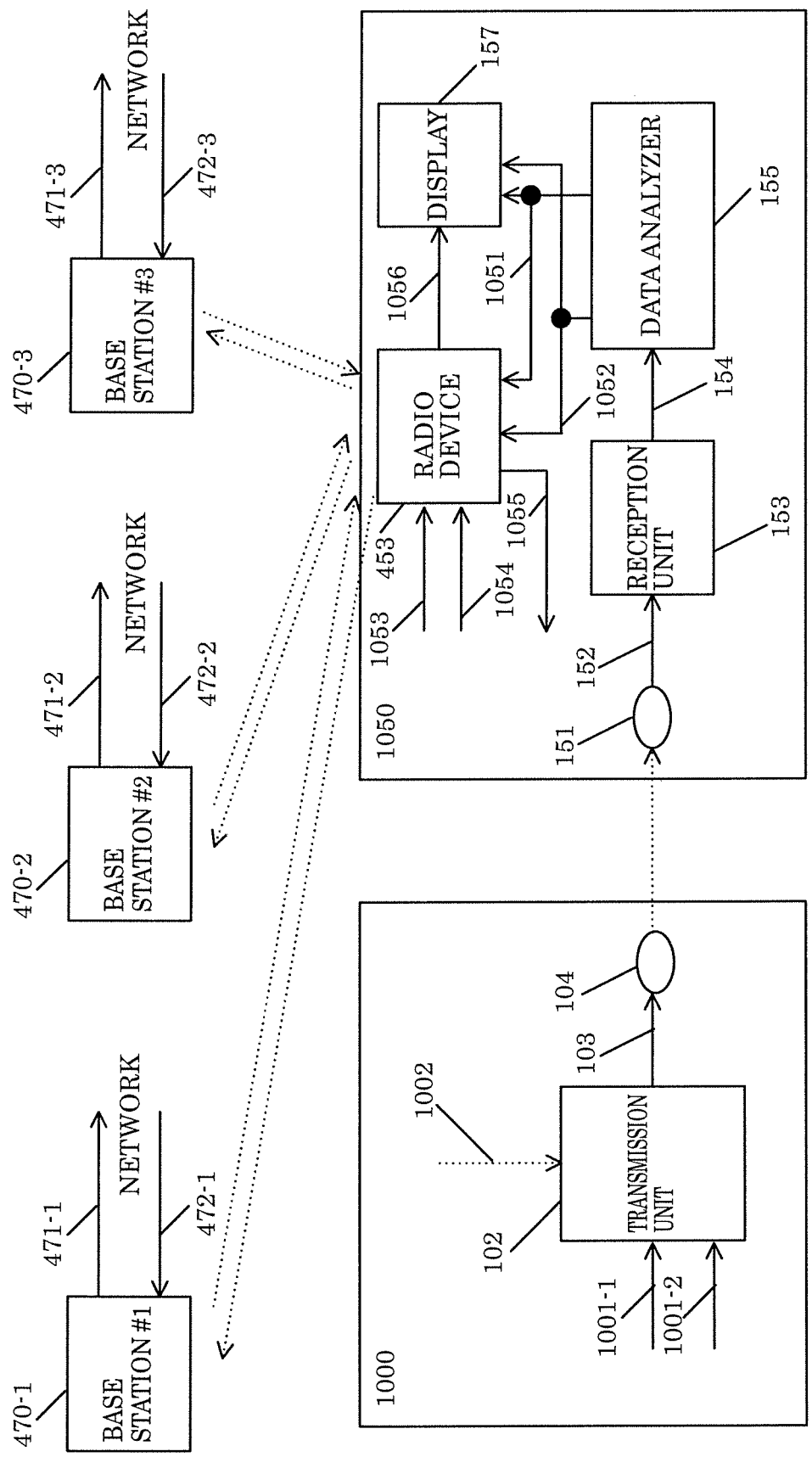
FIG. 27 illustrates a configuration example of a communication system according to Embodiment 7.

FIG. 27 illustrates one example of a configuration of a communication system according to this embodiment.

The communication system illustrated in FIG. 27 includes device 1000, terminal 1050, and base station (or AP) 470-1 (base station #1), base station (or AP) 470-2 (base station #2), and base station (or AP) 470-3 (base station #3) that communicate with terminal 1050. In FIG. 27, symbols that are the same as in FIG. 6, FIG. 9, and FIG. 15 share like reference numbers, and repeated description thereof will be omitted.

Device 1000 includes, for example, an LED visible light source, lamp, light source, and/or light (light source 104). Note that hereinafter, device 1000 is also referred to as "fifth device" in this embodiment. Moreover, communication between radio device 453 and base station 470-1 (base station #1) illustrated in FIG. 27, communication between radio device 453 and base station 470-2 (base station #2) in FIG. 27, and communication between radio device 453 and base station 470-3 (base station #3) in FIG. 27 uses, for example, radio waves.

In fifth device 1000 illustrated in FIG. 27, transmission unit 102 receives inputs of information 1001-1 related to an SSID, information 1001-2 related to an encryption key, and data 1002, generates modulated signal (for optical communication) 103 based on the input signals, and outputs modulated signal 103. Modulated signal 103 is then transmitted from light source 104, for example.

Next, information 1001-1 related to an SSID and information 1001-2 related to an encryption key will be described.

First, information 1001-1 related to an SSID will be described.

Information 1001-1 related to an SSID includes, for example, information indicating the SSID of base station 470-1 (base station #1) in FIG. 27, information indicating the SSID of base station 470-2 (base station #2) in FIG. 27, and information indicating the SSID of base station 470-3 (base station #3) in FIG. 27. Note that in one example, base stations 470-1, 470-2, and 470-3 transmit modulated signals to terminal 1050 over radio waves, and receive modulated signals from terminal 1050 over radio waves. In other words, fifth device 1000 can provide access to base stations 470-1, 470-2, and 470-3, which are secure access destinations for terminal 1050. With this, terminal 1050 illustrated in FIG. 27 can securely obtain information from base stations 470-1, 470-2, and 470-3.

On the other hand, fifth device 1000 can restrict the terminals that access base stations 470-1, 470-2, and 470-3 to terminals in a space in which it is possible to receive optical signals transmitted (emitted) by fifth device 1000.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, fifth device 1000 may transmit a predetermined identifier in an optical signal, and terminal 1050 may determine whether the notified SSID is the SSID of a secure base station or not based on the received identifier.

Note that although the example illustrated in FIG. 27 shows base stations 470-1, 470-2, and 470-3, base stations (or APs) other than base stations 470-1, 470-2, and 470-3 may be present, for example.

Next, information 1001-2 related to an encryption key will be described.

Information 1001-2 related to an encryption key is information related to an encryption key that is necessary in order for terminal 1050 to communicate with base stations 470-1, 470-2, and 470-3. By obtaining information 1001-2 related to an encryption key from fifth device 1000, encrypted communication can be performed between terminal 1050 and base station 470-1, between terminal 1050 and base station 470-2, and between terminal 1050 and base station 470-3.

This concludes the description of information 1001-1 related to an SSID and information 1001-2 related to an encryption key.

Terminal 1050 in FIG. 27 receives a modulated signal transmitted by fifth device 1000. Note that in terminal 1050 illustrated in FIG. 27, configurations that operate the same as terminal 150 in FIG. 6 and terminal 450 in FIG. 9 share like reference signs.

Light receiver 151 included in terminal 1050 is, for example, an image sensor such as a CMOS or organic CMOS image sensor. Light receiver 151 receives light including the modulated signal transmitted from fifth device 1000, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on reception data 154, for example, information 1051 on the SSIDs of base stations 470-1, 470-2, and 470-3 to be connected to, and information 1052 on the encryption keys for communicating with base stations 470-1, 470-2, and 470-3 to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). Note that the encryption method is not limited to these examples.

Display 157 receives inputs of information 1051 on the SSID and information 1052 on the encryption key, and, for example, displays (i) the SSID of the communication partner to be accessed by radio device 453 included in terminal 1050 and (ii) the encryption key (hereinafter this display is referred to as the "first display" in this embodiment).

For example, after the first display, radio device 453 receives inputs of information 1051 on the SSIDs and information 1052 on the encryption keys, and establishes a connection with any one of base stations 470-1, 470-2, or 470-3 (for example, assume the connection uses radio waves). Here, when base station 470 connected to communicates with radio device 453 included in terminal 1050, that base station 470 also transmits the modulated signal using, for example, radio waves.

Thereafter, radio device 453 receives inputs of data 1053 and control signal 1054, demodulates data 1053 in accordance with the control indicated in control signal 1054, and transmits the modulated signal over radio waves.

Then, for example, base station 470 connected to transmits data over the network (any one of 471-1, 471-2, and 471-3) and receives data from the network (any one of 472-1, 472-2, and 472-3). Thereafter, for example, base station 470 connected to transmits the modulated signal to terminal 1050 over radio waves.

Radio device 453 included in terminal 1050 performs processing such as demodulation and error correction decoding on the modulated signal received over radio waves, and obtains reception data 1056. Display 157 performs display based on reception data 1056.

Figure 28:
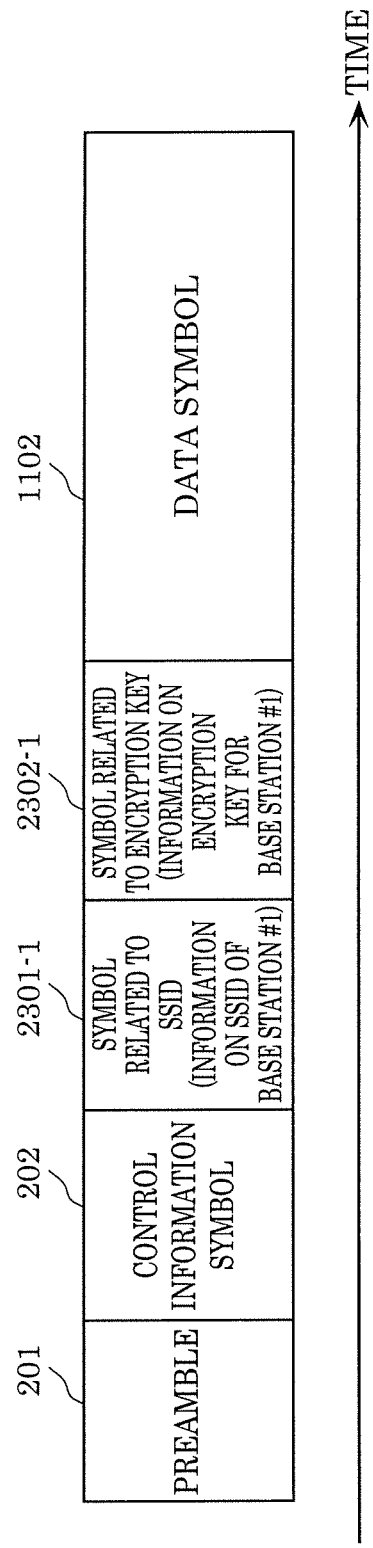
FIG. 28 illustrates a frame configuration example of a modulated signal transmitted by a fifth device according to Embodiment 7.
Figure 29:
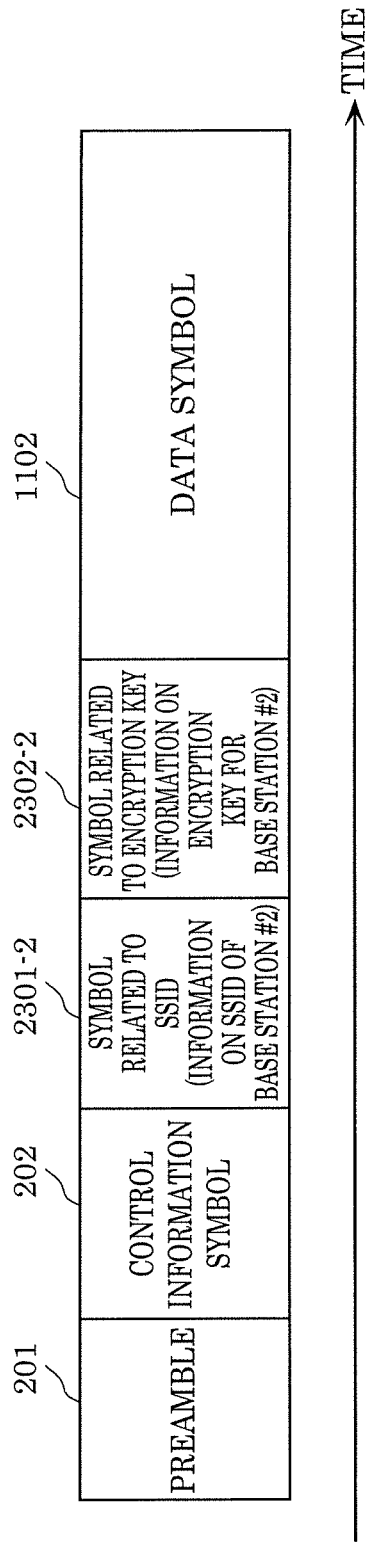
FIG. 29 illustrates a frame configuration example of a modulated signal transmitted by the fifth device according to Embodiment 7.
Figure 30:
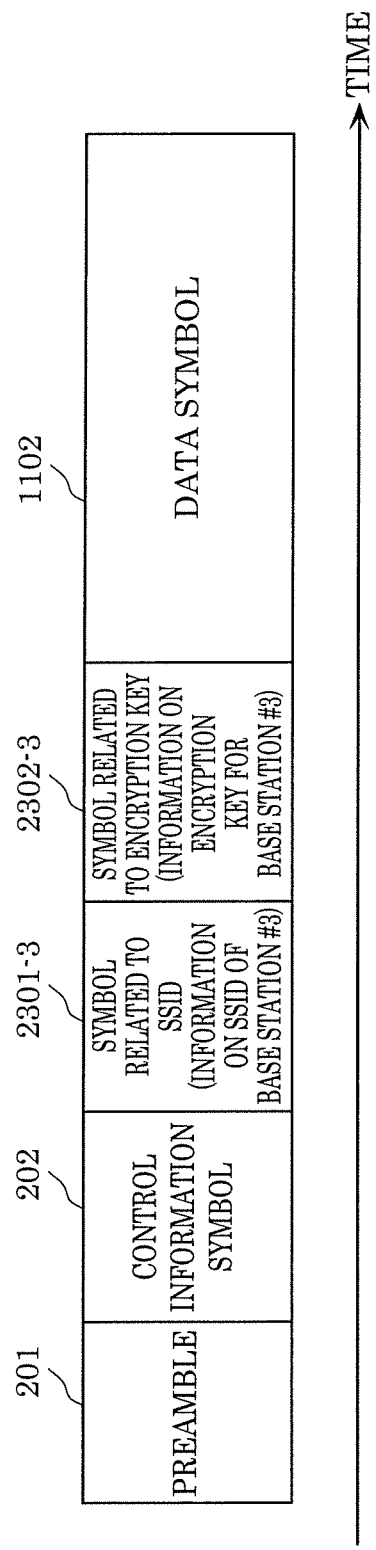
FIG. 30 illustrates a frame configuration example of a modulated signal transmitted by the fifth device according to Embodiment 7.

In the example illustrated in FIG. 27, fifth device 1000 transmits three modulated signals having three different frame configurations. FIG. 28 illustrates frame 2300-1 (frame #1) among the three frame configurations, FIG. 29 illustrates frame 2300-2 (frame #2) among the three frame configurations, and FIG. 30 illustrates frame 2300-3 (frame #3) among the three frame configurations.

FIG. 28 illustrates an example of the configuration of frame 2300-1 (frame #1) of a modulated signal transmitted by fifth device 1000. In FIG. 28, time is represented on the horizontal axis. Moreover, in FIG. 28, symbols that are the same as in FIG. 2 and FIG. 16 share like reference numbers, and repeated description thereof will be omitted. Frame 2300-1 (frame #1) illustrated in FIG. 28 is a frame for transmitting information on the SSID of base station 470-1 (base station #1) in FIG. 27 and information on the encryption key of base station 470-1 (base station #1) in FIG. 27 (the encryption key for accessing base station 470-1).

Symbol 2301-1 related to an SSID is a symbol for transmitting information 1001-1 related to an SSID illustrated in FIG. 27. Moreover, symbol 2301-1 related to an SSID is a symbol for fifth device 1000 in FIG. 27 to transmit the SSID of base station 470-1 (base station #1).

Symbol 2302-1 related to the encryption key is a symbol for transmitting information 1001-2 related to an encryption key illustrated in FIG. 27. Moreover, symbol 2302-1 related to the encryption key is a symbol for fifth device 1000 in FIG. 27 to transmit the encryption key of base station 470-1 (base station #1) (the encryption key for accessing base station 470-1).

Fifth device 1000 transmits preamble 201, control information symbol 202, symbol 2301-1 related to an SSID, symbol 2302-1 related to the encryption key, and data symbol 1102. Note that fifth device 1000 may transmit frame 2300-1 (frame #1) including a symbol other than the symbols illustrated in FIG. 28. Moreover, the configuration of the frame, including the order in which the symbols are transmitted, is not limited to the configuration of frame 2300-1 (frame #1) illustrated in FIG. 28.

FIG. 29 illustrates an example of the configuration of frame 2300-2 (frame #2) of a modulated signal transmitted by fifth device 1000. In FIG. 29, time is represented on the horizontal axis. Moreover, in FIG. 29, symbols that are the same as in FIG. 2 and FIG. 16 share like reference numbers, and repeated description thereof will be omitted. Frame 2300-2 (frame #2) illustrated in FIG. 29 is a frame for transmitting information on the SSID of base station 470-2 (base station #2) in FIG. 27 and information on the encryption key of base station 470-2 (base station #2) in FIG. 27 (the encryption key for accessing base station 470-2).

Symbol 2301-2 related to an SSID is a symbol for transmitting information 1001-1 related to an SSID illustrated in FIG. 27. Moreover, symbol 2301-2 related to an SSID is a symbol for fifth device 1000 in FIG. 27 to transmit the SSID of base station 470-2 (base station #2).

Symbol 2302-2 related to the encryption key is a symbol for transmitting information 1001-2 related to an encryption key illustrated in FIG. 27. Moreover, symbol 2302-2 related to the encryption key is a symbol for fifth device 1000 in FIG. 27 to transmit the encryption key of base station 470-2 (base station #2) (the encryption key for accessing base station 470-2).

Fifth device 1000 transmits preamble 201, control information symbol 202, symbol 2301-2 related to an SSID, symbol 2302-2 related to the encryption key, and data symbol 1102. Note that fifth device 1000 may transmit frame 2300-2 (frame #2) including a symbol other than the symbols illustrated in FIG. 29. Moreover, the configuration of the frame, including the order in which the symbols are transmitted, is not limited to the configuration of frame 2300-2 (frame #2) illustrated in FIG. 29.

FIG. 30 illustrates an example of the configuration of frame 2300-3 (frame #3) of a modulated signal transmitted by fifth device 1000. In FIG. 30, time is represented on the horizontal axis. Moreover, in FIG. 30, symbols that are the same as in FIG. 2 and FIG. 16 share like reference numbers, and repeated description thereof will be omitted. Frame 2300-3 (frame #3) illustrated in FIG. 30 is a frame for transmitting information on the SSID of base station 470-3 (base station #3) in FIG. 27 and information on the encryption key of base station 470-3 (base station #3) in FIG. 27 (the encryption key for accessing base station 470-3).

Symbol 2301-3 related to an SSID is a symbol for transmitting information 1001-1 related to an SSID illustrated in FIG. 27. Moreover, symbol 2301-3 related to an SSID is a symbol for fifth device 1000 in FIG. 27 to transmit the SSID of base station 470-3 (base station #3).

Symbol 2302-3 related to the encryption key is a symbol for transmitting information 1001-2 related to an encryption key illustrated in FIG. 27. Moreover, symbol 2302-3 related to the encryption key is a symbol for fifth device 1000 to transmit the encryption key of base station 470-3 (base station #3) (the encryption key for accessing base station 470-3).

Fifth device 1000 transmits preamble 201, control information symbol 202, symbol 2301-3 related to an SSID, symbol 2302-3 related to the encryption key, and data symbol 1102. Note that fifth device 1000 may transmit frame 2300-3 (frame #3) including a symbol other than the symbols illustrated in FIG. 30. Moreover, the configuration of the frame, including the order in which the symbols are transmitted, is not limited to the configuration of frame 2300-3 (frame #3) illustrated in FIG. 30.

Figure 31:
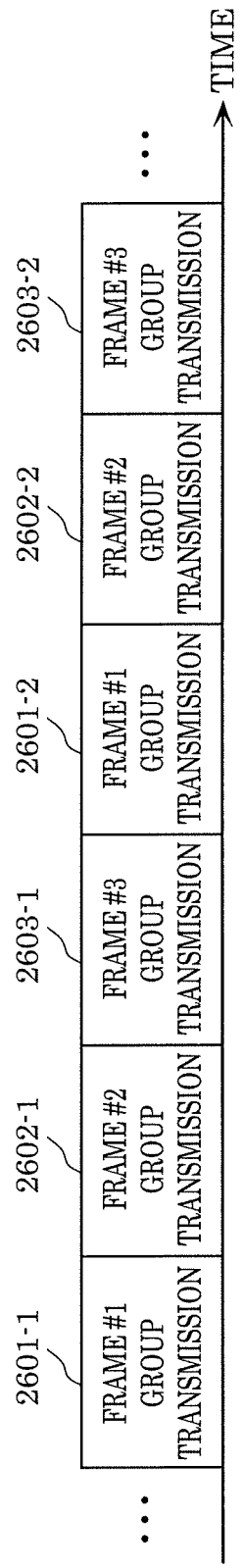
FIG. 31 illustrates one example of a frame transmission method used by the fifth device according to Embodiment 7.

FIG. 31 illustrates an example of a transmission method used when fifth device 1000 transmits frame 2300-1 (frame #1) in FIG. 28, frame 2300-2 (frame #2) in FIG. 29, and frame 2300-3 (frame #3) in FIG. 30. In FIG. 31, time is represented on the horizontal axis.

In FIG. 31, in frame #1 group transmissions of 2601-1 and 2601-2, one or more of frame 2300-1 (frame #1) illustrated in FIG. 28 is transmitted. Moreover, in frame #2 group transmissions of 2602-1 and 2602-2, one or more of frame 2300-2 (frame #2) illustrated in FIG. 29 is transmitted. Moreover, in frame #3 group transmissions of 2603-1 and 2603-2, one or more of frame 2300-3 (frame #3) illustrated in FIG. 30 is transmitted.

Next, this will be described in greater detail.

First, the transmission of one or more of frame 2300-1 (frame #1) illustrated in FIG. 28 in frame #1 group transmissions of 2601-1 and 2601-2 will be described.

For example, when an image sensor such as a CMOS or organic CMOS sensor is used in light receiver 151, it is possible to process reception signals frame by frame of a video or still image. Note that, for example, when a video is labeled "4K 30p", this means that one frame has 3840×2160 pixels, and the number of frames per second is 30.

Accordingly, when fifth device 1000 transmits a modulated signal having a configuration in which frame 2300-1 (frame #1) in FIG. 28, frame 2300-2 (frame #2) in FIG. 29, and frame 2300-3 (frame #3) in FIG. 30 are present, terminal 1050 in FIG. 27 has difficulty in selecting a base station 470 to access from among the plurality of base stations 470-1, 470-2, and 470-3.

In view of this, this embodiment proposes a frame configuration like that illustrated in FIG. 31.

<Method 1-1>

Method 1-1 makes the time interval that each of frame #1 group transmissions of 2601-1 and 2601-2 occupies longer than a frame of a video or still image by including a plurality of frames 2300-1 (frame #1) illustrated in FIG. 28, in frame #1 group transmissions of 2601-1 and 2601-2.

This method makes it possible for terminal 1050 to prevent the reception, from fifth device 1000, of a modulated signal including, in a single frame of a video or still image, frame 2300-1 (frame #1) in FIG. 28, frame 2300-2 (frame #2) in FIG. 29, and frame 2300-3 (frame #3) in FIG. 30, that is to say, a modulated signal including different SSIDs and encryption keys. With this, terminal 1050 illustrated in FIG. 27 can easily select a base station 470 to access from among the plurality of base stations 470-1, 470-2, and 470-3.

<Method 2-1>

Method 2-1 makes the time interval that frame 2300-1 (frame #1) in FIG. 28 occupies longer than a frame of a video or still image.

For example, symbol 2301-1 related to an SSID in FIG. 28 may include a plurality of items of the information on the SSID for base station #1 (i.e., the information on the SSID for base station #1 is repeatedly included), and symbol 2302-1 related to an encryption key may include a plurality of items of the information on the encryption key for base station #1 (the encryption key for connecting with base station #1) (i.e., the information on the encryption key for base station #1 (the encryption key for connecting with base station #1) is repeatedly included).

This method makes it possible for terminal 1050 to prevent the reception, from fifth device 1000, of a modulated signal including, in a single frame of a video or still image, frame 2300-1 (frame #1) in FIG. 28, frame 2300-2 (frame #2) in FIG. 29, and frame 2300-3 (frame #3) in FIG. 30, that is to say, a modulated signal including different SSIDs and encryption keys. With this, terminal 1050 illustrated can easily select a base station 470 to access from among the plurality of base stations 470-1, 470-2, and 470-3.

Similarly, frame #2 group transmissions of 2602-1 and 2602-2 may have the following configurations.

<Method 1-2>

Method 1-2 makes the time interval that frame #2 group transmission occupies longer than a frame of a video or still image by including a plurality of frames 2300-2 (frame #2) illustrated in FIG. 29, in each of frame #2 group transmissions of 2602-1 and 2602-2.

<Method 2-2>

Method 2-2 makes the time interval that frame 2300-2 (frame #2) in FIG. 29 occupies longer than a frame of a video or still image.

For example, symbol 2301-2 related to an SSID in FIG. 29 may include a plurality of items of the information on the SSID for base station #2 (i.e., the information on the SSID for base station #2 is repeatedly included), and symbol 2302-2 related to an encryption key may include a plurality of items of the information on the encryption key for base station #2 (the encryption key for connecting with base station #2) (i.e., the information on the encryption key for base station #2 (the encryption key for connecting with base station #2) is repeatedly included).

Similarly, frame #3 group transmissions of 2603-1 and 2603-2 may have the following configurations.

<Method 1-3>

Method 1-3 makes the time interval that frame #3 group transmission occupies longer than a frame of a video or still image by including a plurality of frames 2300-3 (frame #3) illustrated in FIG. 30, in each of frame #3 group transmissions of 2603-1 and 2603-2.

<Method 2-3>

Method 2-3 makes the time interval that frame 2300-3 (frame #3) in FIG. 30 occupies longer than a frame of a video or still image.

For example, symbol 2301-3 related to an SSID in FIG. 30 may include a plurality of items of the information on the SSID for base station #3 (i.e., the information on the SSID for base station #3 is repeatedly included), and symbol 2302-3 related to an encryption key may include a plurality of items of the information on the encryption key for base station #3 (the encryption key for connecting with base station #3) (i.e., the information on the encryption key for base station #3 (the encryption key for connecting with base station #3) is repeatedly included).

Next, the advantageous effects achieved when fifth device 1000 transmits frames like those in FIG. 28 through FIG. 31 will be described.

Figure 32:
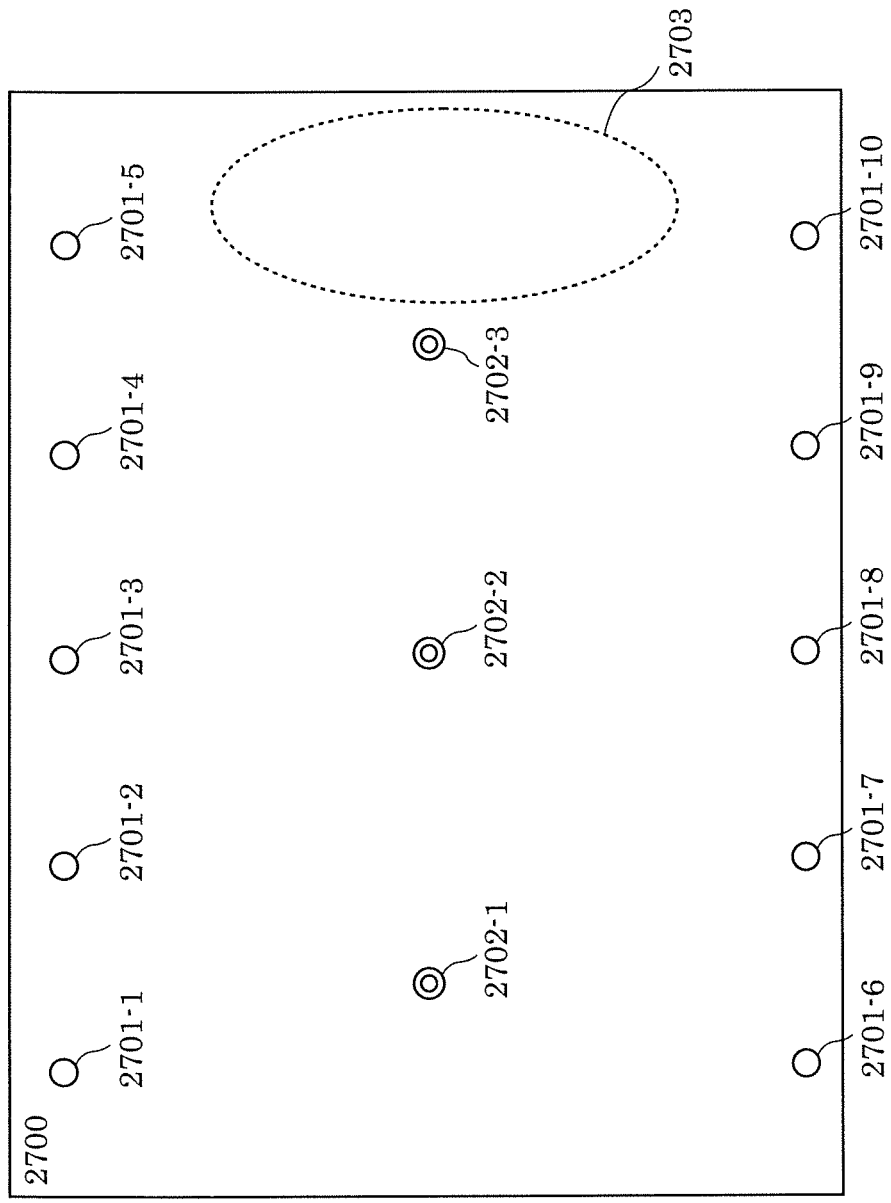
FIG. 32 illustrates one example of a space in which the communication system according to Embodiment 7 is disposed.

As one example, consider area 2700 in FIG. 32. In FIG. 32, fifth devices 1000 are disposed at circles 2701-1, 2701-2, 2701-3, 2701-4, 2701-5, 2701-6, 2701-7, 2701-8, 2701-8, 2701-9, and 2701-10. Moreover, base station 470-1 (base station #1) is disposed at double circle 2702-1, base station 470-2 (base station #2) is disposed at double circle 2702-2, and base station 470-3 (base station #3) is disposed at double circle 2702-3.

For example, 99 terminals having the same configuration as terminal 1050 (hereinafter, each of these terminals is simply referred to as terminal 1050) are present in the area indicated as 2703.

Here, for example, fifth devices 1000 disposed at circles 2701-5 and 2701-10 both transmit information on the SSID of base station 470-3 (base station #3) and information on the encryption key for access to base station 470-3 (base station #3). This is because the base station closest to the positions of circles 2701-5 and 2701-10 is base station 470-3 (base station #3).

In such cases, all 99 of terminals 1050 will access base station 470-3 (base station #3). This means there is a high probability that terminals 1050 will have difficulty accessing base station 470-3 (base station #3) due to congestion.

Taking this point into consideration, by making it so that the 99 terminals 1050 access base station 470-1 (base station #1) (position of double circle 2702-1), base station 470-2 (base station #2) (position of double circle 2702-2), and base station 470-3 (base station #3) (position of double circle 2702-3) as evenly as possible, it is possible to achieve a reduction in terminals 1050 having difficulty accessing a base station 470, as described above.

For example, since the 99 terminals 1050 typically access fifth device 1000 at different timings, when fifth device 1000 transmits a frame, such as those illustrated in FIG. 28 through FIG. 31 in this embodiment, depending on the timing that each of the 99 terminals 1050 accesses fifth device 1000, a single SSID and a single encryption key for one of base stations 470-1, 470-2, or 470-3 are obtained. With this, control is performs such that the 99 terminals 1050 access base stations 470-1, 470-2, or 470-3 as evenly as possible. Accordingly, the above described reduction in terminals 1050 having difficulty accessing a base station 470 can be achieved.

Note that FIG. 31 illustrates an example of a transmission method used when fifth device 1000 transmits frame 2300-1 (frame #1) in FIG. 28, frame 2300-2 (frame #2) in FIG. 29, and frame 2300-3 (frame #3) in FIG. 30. However, the transmission method used when fifth device 1000 transmits frame 2300-1 (frame #1) in FIG. 28, frame 2300-2 (frame #2) in FIG. 29, and frame 2300-3 (frame #3) in FIG. 30 is not limited to this example.

For example, in FIG. 31, the order of frame #1 group transmission, frame #2 group transmission, and frame #3 group transmission by fifth device 1000 is repeated, but the order in which frame #1 group transmission, frame #2 group transmission, and frame #3 group transmission are transmitted is not limited to the example given in FIG. 31. For example, the transmission of frame group 1, the transmission of frame group #2, and the transmission of frame group #3 by fifth device 1000 may be temporally randomized, and, alternatively, the order of the transmission of frame group 1, the transmission of frame group #2, and the transmission of frame group #3 may be a regular order different than the example given in FIG. 31. It is sufficient so long as fifth device 1000 transmits frame #1 group, frame #2 group, and frame #3 group.

Moreover, in FIG. 31, frame #1 group transmission, frame #2 group transmission, and frame #3 group transmission by fifth device 1000 are exemplified as being performed consecutively, but these transmissions do not necessarily need to be performed consecutively. For example, in FIG. 31, there may be a time interval between frame #1 group transmission 2601-1 and frame #2 group transmission 2602-2.

In FIG. 31, the example includes only frame #1 group transmission, frame #2 group transmission, and frame #3 group transmission, but other symbols and/or frames may be included. Furthermore, in FIG. 31 and FIG. 27, there are three base stations 470, but the number of base stations 470 is not limited to this example. Operations in cases in which there are two or more base stations 470 are the same as the example in which there are three base stations 470. Accordingly, for example, when there are N base stations 470 (N is an integer greater than or equal to two), when transmission such as that illustrated in FIG. 31 is performed by fifth device 1000, frame #k group transmission is performed. Note that k is an integer greater than or equal to one and less than or equal to N. Then, in the transmission of frame #k group, there is a symbol related to an SSID (information on the SSID of base station #k) and a symbol related to an encryption key (information on an encryption key for accessing base station #k).

The frame configuration of the modulated signal transmitted by radio device 453 included in terminal 1050 illustrated in FIG. 27 is the same as the frame configuration illustrated in FIG. 17 and described in Embodiment 4. In other words, as illustrated in FIG. 17, radio device 453 included in terminal 1050 and illustrated in FIG. 27 transmits, for example, preamble 1201, and thereafter transmits control information symbol 1202 and information symbol 1203.

Preamble 1201 is a symbol for base stations 470-1, 470-2, and 470-3 that receive the modulated signal transmitted by radio device 453 in terminal 1050 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used in the generation of the modulated signal, information related to the frame configuration, and information related to transmission method. Based on information on control information symbol 1202, base stations 470-1, 470-2, and 470-3 implement, for example, demodulation of the modulated signal.

Information symbol 1203 is a symbol for radio device 453 in terminal 1050 to transmit data.

Note that radio device 453 in terminal 1050 illustrated in FIG. 27 may transmit a frame including symbols other than those illustrated in FIG. 17 (for example, a frame including a pilot symbol (reference symbol) between information symbols 1203). Moreover, the configuration of the frame, including the order in which the symbols are transmitted, is not limited to the configuration illustrated in FIG. 17. In other words, in FIG. 17, a plurality of symbols may be present along the frequency axis, that is, symbols may be present on a plurality of frequencies (a plurality of carriers).

The frame configuration of the modulated signal transmitted by base stations 470-1, 470-2, and 470-3 illustrated in FIG. 27 is the same as the frame configuration illustrated in FIG. 12 and described in Embodiment 3. In other words, as illustrated in FIG. 12, base stations 470-1, 470-2, and 470-3 transmit, for example, preamble 701, and thereafter transmit control information symbol 702 and information symbol 703.

Preamble 701 is a symbol for radio device 453 in terminal 1050 that receives the modulated signal transmitted by base stations 470-1, 470-2, and 470-3 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, radio device 453 in terminal 1050 implements, for example, demodulation of the modulated signal.

Information symbol 703 is a symbol for base stations 470-1, 470-2, and 470-3 to transmit data.

Note that base stations 470-1, 470-2, and 470-3 may transmit a frame including symbols other than the symbols illustrated in FIG. 12. For example, base stations 470-1, 470-2, and 470-3 may transmit a frame including a pilot symbol (reference symbol) between information symbols 703. Moreover, the configuration of the frame, including the order in which the symbols are transmitted, is not limited to the configuration illustrated in FIG. 12. In FIG. 12, a plurality of symbols may be arranged along the frequency axis. In other words, in FIG. 12, symbols may be present on a plurality of frequencies (a plurality of carriers).

Figure 33:
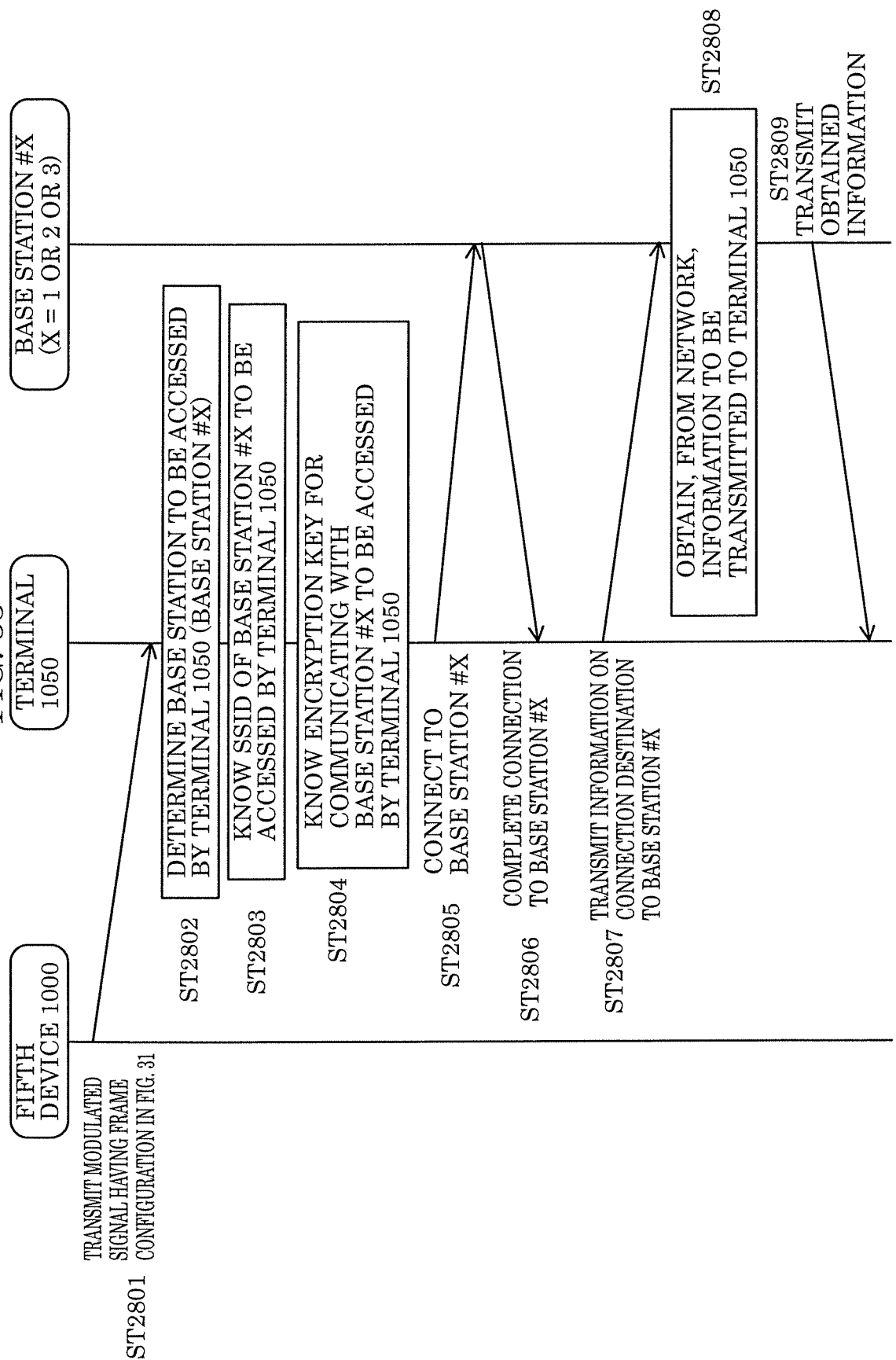
FIG. 33 is a flow chart illustrating an example of processes performed in the communication system according to Embodiment 7.

FIG. 33 is a flow chart illustrating one example of processes implemented by fifth device 1000, terminal 1050, and base station #X. Note that X is equal to 1, 2, or 3.

First, fifth device 1000 transmits a modulated signal having the frame configuration illustrated in FIG. 31 (ST2801).

Terminal 1050 receives the modulated signal transmitted by fifth device 1000, and selects a base station to access from among base station 470-1 (base station #1), base station 470-2 (base station #2), and base station 470-3 (base station #3) in FIG. 27 (ST2802).

Next, this point will be described. Terminal 1050 receives the modulated signal transmitted by fifth device 1000 in order to access any one of base stations 470. Here, terminal 1050 obtains any one of frame #1 group transmission, frame #2 group transmission, and frame #3 group transmission illustrated in FIG. 31, in a single frame of a video or still image. Terminal 1050 then determines which of base station 470-1 (base station #1), base station 470-2 (base station #2), base station 470-3 (base station #3) to access, based on the obtained base station information (for example, an SSID).

Next, terminal 1050 obtains the SSID of base station #X to be accessed by terminal 1050 by receiving the modulated signal transmitted by fifth device 1000 (ST2803).

Terminal 1050 also obtains the encryption key to be used in communication with base station #X to be accessed by terminal 1050 (ST2804).

Terminal 1050 then connects with base station #X over radio waves (ST2805). Terminal 1050 completes the connection with base station #X over radio waves by receiving a response from base station #X (ST2806).

Terminal 1050 then transmits information on the connection destination to base station #X using radio waves (ST2807).

Base station #X obtains information for transmitting to terminal 1050 from the network (ST2808).

Base station #X then transmits the obtained information to terminal 1050 using radio waves, and terminal 1050 obtains the information (ST2809). When necessary, terminal 1050, for example, obtains required information from the network via base station #X.

As described above, based on the information on the SSID and information on the encryption key transmitted from fifth device 1000, terminal 1050 connects with base station 470 and obtains information to securely obtain information from base station 470, whose security has been authenticated. This is because, when information from a visible light modulated signal is obtained, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which fifth device 1000 transmits encryption key information has been described. However, for example, when base station 470 does not perform encrypted communication using an encryption key, fifth device 1000 may transmit only SSID information, without transmitting encryption key information. In such cases, the present disclosure can be implemented in the same manner simply by removing the configuration related to an encryption key from the above configurations.

Moreover, the configuration of the fifth device is not limited to the configuration of fifth device 1000 illustrated in FIG. 27, the configuration of the terminal is not limited to the configuration of terminal 1050 illustrated in FIG. 27, and the connection destination and configuration of base stations #1, #2, and #3 are not limited to the connection destination and configuration of base stations 470-1, 470-2, and 470-3 illustrated in FIG. 27.

Accordingly, with this embodiment, the above described reduction in terminals 1050 having difficulty accessing a base station 470 can be achieved even when a plurality of terminals 1050 are present in a given area.

Note that in FIG. 32, the frame configurations of the modulated signals transmitted by the fifth devices 1000 disposed at circles 2701-1, 2701-2, 2701-3, 2701-4, 2701-5, 2701-6, 2701-7, 2701-8, 2701-8, 2701-9, and 2701-10 may all be the same as illustrated in FIG. 31, the frame configurations of the modulated signals transmitted by fifth devices 1000 may be mutually different, and two or more of the fifth devices 1000 may transmit modulated signals having the same frame configuration.

Embodiment 8

In this embodiment, a case in which a communication method using optical signals is combined with image processing will described as one example of an application of a communication method using optical signals described above. The communication system according to this embodiment is applicable to, for example, communication between two automobiles (intervehicle communication), and communication between an automobile and a communication device disposed on the road or in the vicinity thereof (road-automobile communication).

First, a basic description of the basic structure according to this embodiment will be given. Note that the application of this basic configuration is not limited to an automobile; the basic configuration can be applied to a mobile terminal such as a smartphone or notebook PC, as well as to other electronic devices.

Figure 34:
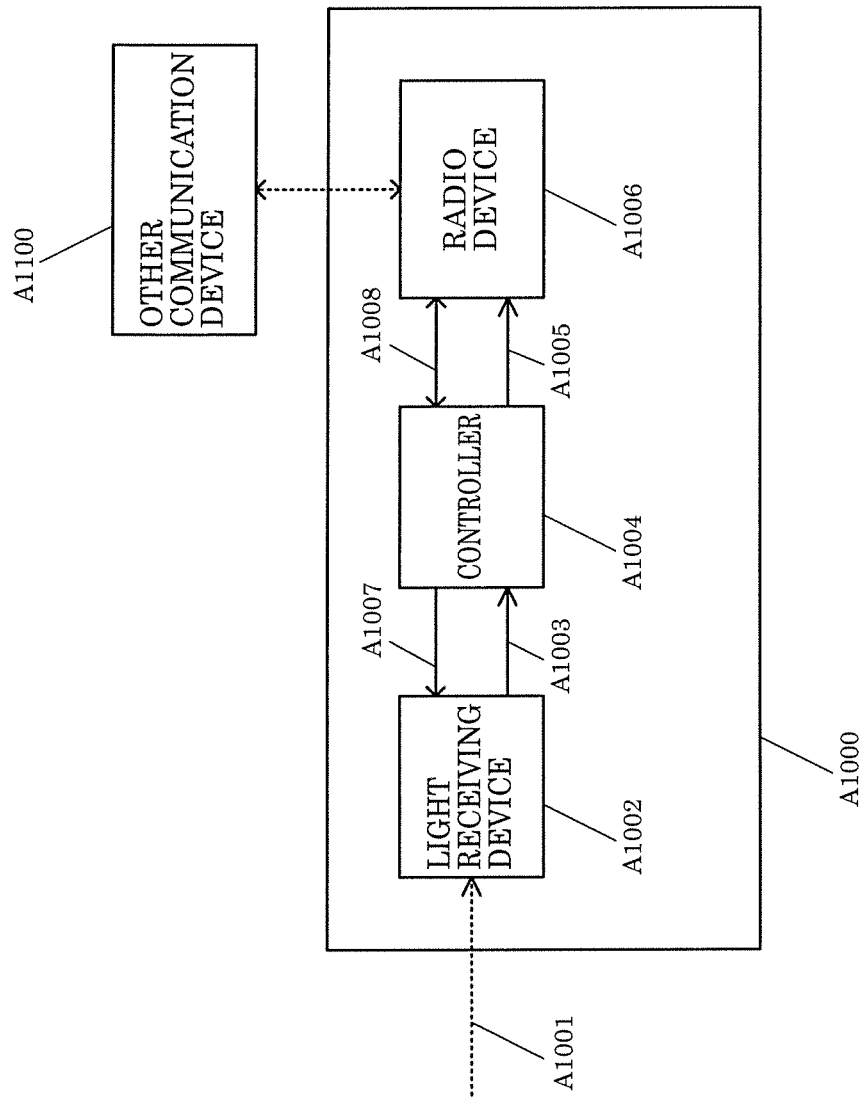
FIG. 34 illustrates a configuration example of a communication device according to Embodiment 8.

FIG. 34 is a block diagram illustrating the configuration of communication device A1000, which is one example of the communication device according to this embodiment. Communication device A1000 includes light receiving device A1002, controller A1004, and radio device A1006.

Light receiving device A1002 receives optical signal A1001 emitted from a transmitter not illustrated in the drawings, and/or captures a sill image or video, and outputs optically received data A1003. Controller A1004, for example, controls other devices included in communication device A1000, and processes optically received data A1003 input from light receiving device A1002 and/or radio reception data input from radio device A1006. Radio device A1006 wirelessly connects to other communication device A1100 based on control signal A1005 from controller A1004 and performs radio communication for the transmission of radio transmission data and the reception of radio reception data. Radio transmission data and radio reception data are transmitted and received between radio device A1006 and controller A1004 as radio communication data A1008. Controller A1004 outputs control signal A1007 for controlling operation of light receiving device A1002, and light receiving device A1002 operates according to control signal A1007.

When optically received data A1003 generated by light receiving device A1002 includes still image data or video data, controller A1004 may perform image processing using the still image data or video data. An example of the image processing performed by controller A1004 will be given in greater detail later on.

Figure 35:
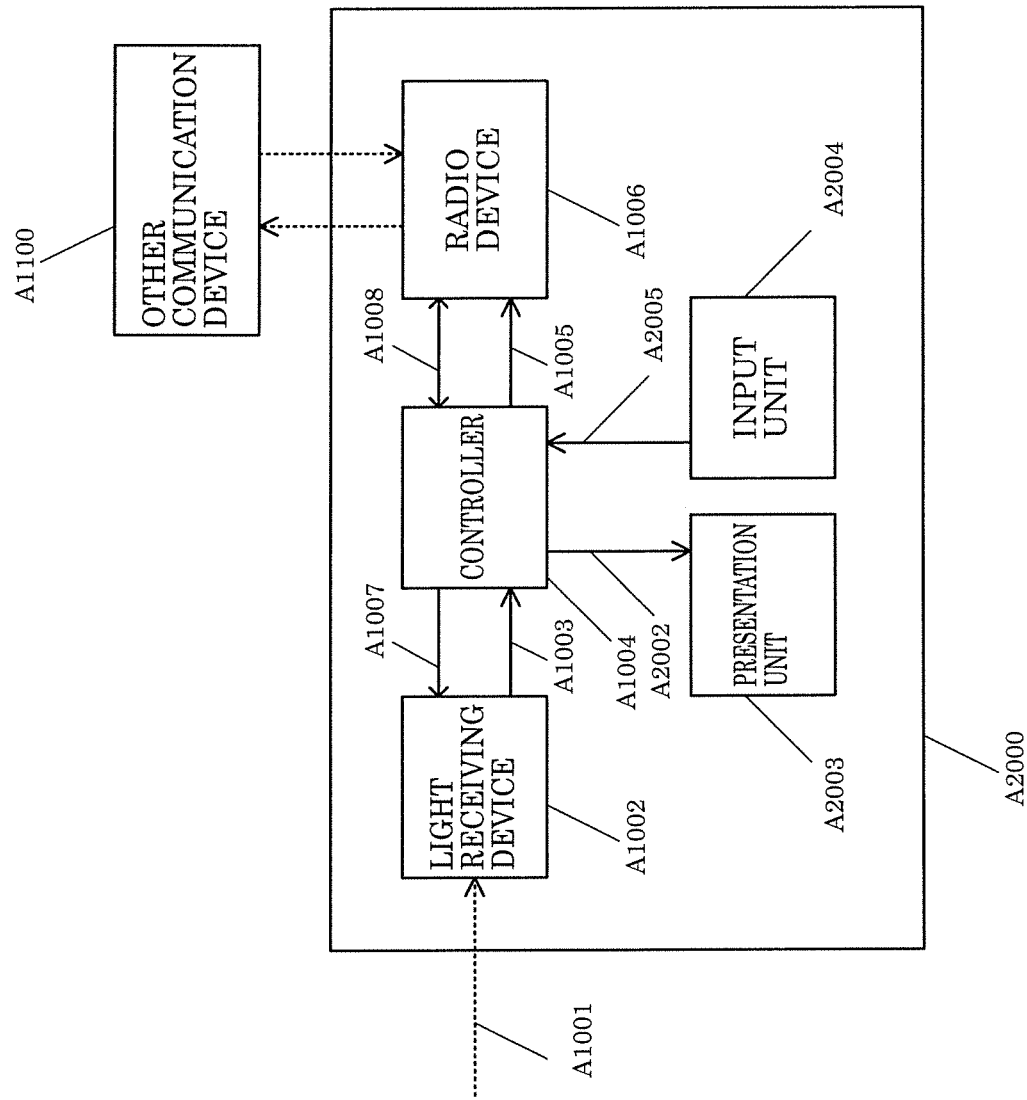
FIG. 35 illustrates another configuration example of the communication device according to Embodiment 8.

FIG. 35 is a block diagram illustrating the configuration of communication device A2000, which is another example of the communication device according to this embodiment. In FIG. 35, elements having the same functions as those in communication device A1000 illustrated in FIG. 34 share like reference signs, and repeated description thereof is omitted. Communication device A2000 differs from communication device A1000 in regard to the inclusion of presentation unit A2003 and input unit A2004.

Controller A1004 generates an image based on, for example, optically received data A1003 and/or radio reception data or some other input information, and information read from memory, and outputs the generated image to presentation unit A2003 as presentation information A2002. For example, presentation information A2002 is, but not limited to, information including image information and/or text information generated based on optically received data A1003 or some other data, and for example, presentation unit A2003 is, but not limited to, a liquid crystal display, plasma display, or organic EL display that displays an image signal generated from the image information and/or text information obtained as the presentation information A2002. For example, presentation information A2002 may be sound information, and presentation unit A2003 may be a speaker that outputs sound in accordance with the sound information. In accordance with an operation made by a user, input unit A2004 outputs, to controller A1004, input information A2005, which is, for example, information indicating the operation performed by the user and/or information indicating text input by the user. For example, input unit A2004 is, but not limited to, a touch panel, physical key(s), floating touch display, and/or motion sensor. For example, input unit A2004 may be a microphone and input information A2005 may be sound information.

Next, the configuration of light receiving device A1002 will be described in greater detail.

Figure 36:
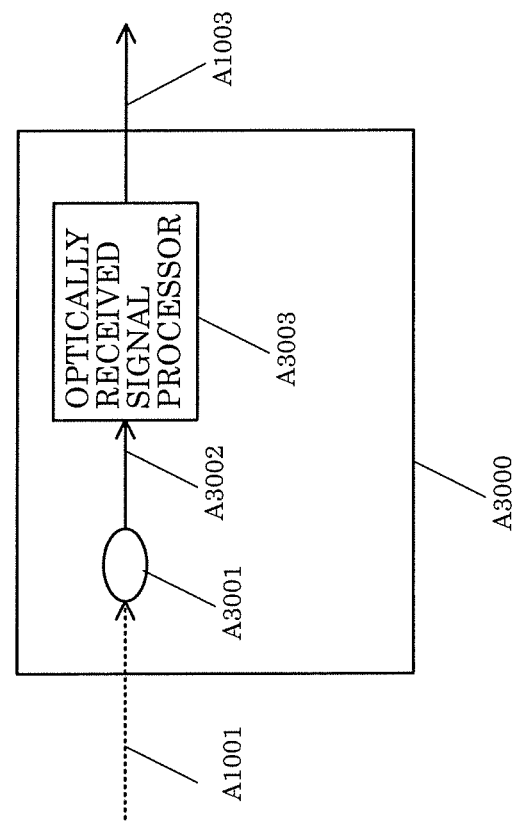
FIG. 36 illustrates a first configuration example of a light receiving device according to Embodiment 8.

FIG. 36 is a block diagram illustrating the configuration of light receiving device A3000, which is a first example of a detailed configuration of light receiving device A1002 according to this embodiment.

Light receiving device A3000 includes light receiver A3001 and optically received signal processor A3003. Light receiver A3001 has, for example, the same configuration as light receiver 151 illustrated in FIG. 6, receives light emitted from an external source, and outputs reception signal A3002. Optically received signal processor A3003 applies predetermined processing to reception signal A3002, and transmits the resulting signal as optically received data A1003.

In one example, the predetermined processing applied to reception signal A3002 by optically received signal processor A3003 includes processing such as demodulating and error correction decoding of components in a modulated signal included in reception signal A3002, and demodulated data A4002 resulting from the demodulation is output as optically received data A1003. In another example, as the predetermined processing, optically received signal processor A3003 generates still image data or video data from reception signal A3002 obtained by light receiver A3001, which is an image sensor such as a CMOS or organic CMOS image sensor, and outputs the generated still image data or video data as optically received data A1003. Here, the still image data or video data may be encoded data encoded using an image compression method or video compression method, and may be uncompressed data. Hereinafter, an example of the configuration of optically received signal processor A3003 will be described in greater detail.

Figure 37:
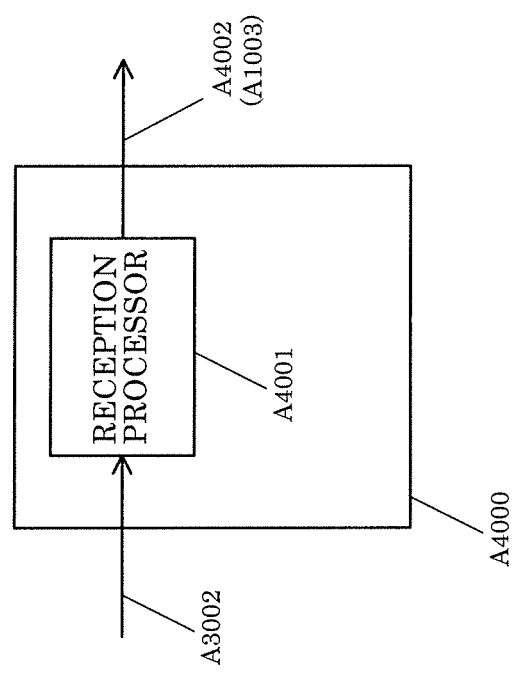
FIG. 37 illustrates a first configuration example of an optically received signal processor according to Embodiment 8.

FIG. 37 illustrates the configuration of optically received signal processor A4000, which is one example of a configuration of optically received signal processor A3003. Optically received signal processor A4000 includes reception processor A4001. Reception processor A4001 implements processing such as demodulation and/or error correction on reception signal A3002, and outputs the resulting demodulated data A4002 as optically received data A1003. Reception signal A3002 inputted into optically received signal processor A4000 may be, for example, in the case of the above-described line scan sampling implementation example, a signal obtained by an image sensor such as a CMOS sensor using a sampling method receiving optical signals such as sampling by frame, and may be a signal sampled at a sampling rate required for reception of optical signals, using an element different from an image sensor that can convert optical signals into electrical signals, such as a photodiode.

Figure 38:
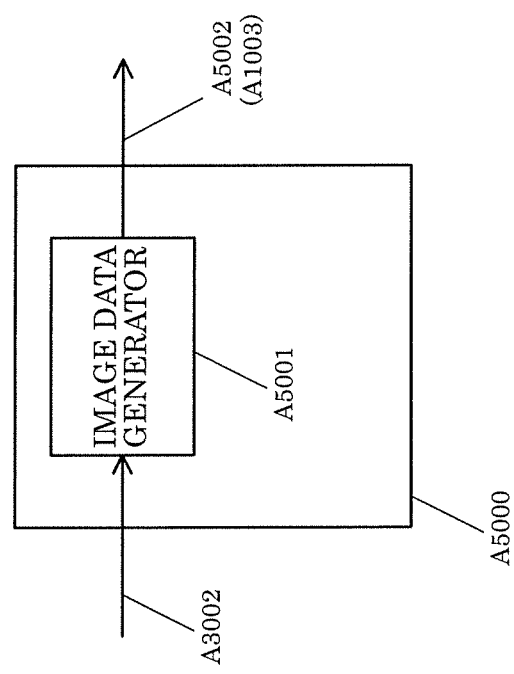
FIG. 38 illustrates a second configuration example of the optically received signal processor according to Embodiment 8.

FIG. 38 illustrates the configuration of optically received signal processor A5000, which is another example of a configuration of optically received signal processor A3003. Optically received signal processor A5000 includes image data generator A5001, and outputs, as optically received data A1003, image data A5002 including optical signal information. In other words, image data generator A5001 generates still image data or video data from reception signal A3002, and outputs image data A5002, which is the generated still image data or video data, as optically received data A1003.

In the following description, for ease of explanation, unless otherwise noted, image data A5002 shall be assumed to be video data. However, it goes without saying that the present disclosure can be implemented in the same manner even if "video data" is rewritten as "still image data" or "a combination of video data and still image data" in the following description.

When light receiving device A1002 includes optically received signal processor A5000, light receiver A3001 is an image sensor such as a CMOS sensor. For example, light receiving device A1002 controls operation of light receiver A3001, obtains reception signal A3002 using a sampling method for receiving optical signals in the first period illustrated in FIG. 39 and obtains reception signal A3002 using an imaging method for capturing video in the second period illustrated in FIG. 39.

Hereinafter, a signal obtained using the sampling method for receiving optical signals will be referred to as an imaging signal for optical communication, and a signal obtained using the imaging method for capturing video will be referred to as an imaging signal for video. Moreover, the data generated by image data generator A5001 based on the imaging signal for optical communication will be referred to as imaging data for optical communication, and data generated by image data generator A5001 based on the imaging signal for video will be referred to as imaging data for video.

Figure 39:
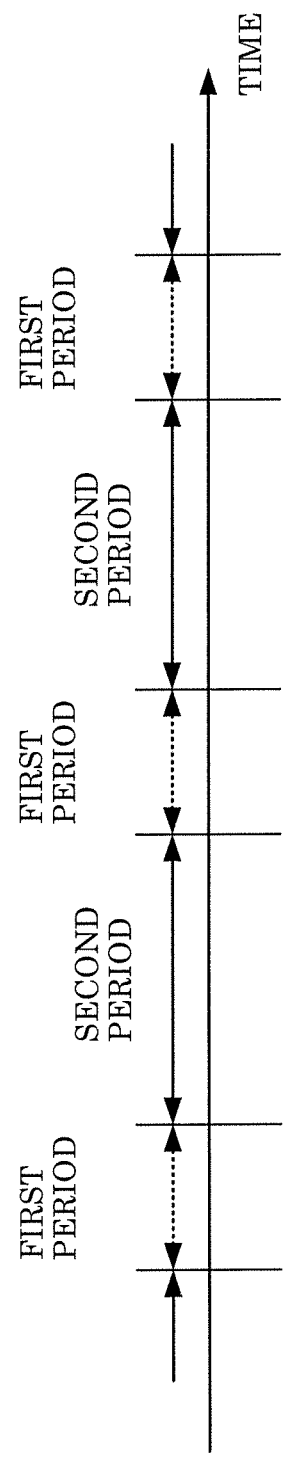
FIG. 39 illustrates an example of control of an image sensor according to Embodiment 8.

FIG. 39 illustrates one example of a control method of an image sensor in a case in which both the imaging signal for optical communication and the imaging signal for video are obtained by a single image sensor using time-division. Light receiving device A1002 obtains an imaging signal for optical communication using a sampling method for receiving optical signals via light receiver A3001 in the first period in FIG. 39, and obtains an imaging signal for video using an imaging method for capturing video via the light receiver A3001 in the second period in FIG. 39.

Here, each of the first period and the second period is a period corresponding to one or more frames in a video. However, light receiving device A1002 may switch between the sampling method for receiving optical signals and the imaging method for capturing video out of sync with the video frames. Light receiving device A1002 may arrange the first periods cyclically or non-cyclically. Moreover, rules for arranging the first periods such as the cycle at which the first periods are arranged may be changed dynamically.

Note that light receiving device A1002 may determine the start and end times of the first periods based on a signal input from an external source. For example, light receiving device A1002 controls operation of light receiver A3001 based on control signal A1007 input from controller A1004. Here, controller A1004 may output a control signal for controlling operation of light receiver A3001 based on a signal received using a communication method such as radio communication, wired communication, or optical communication from a transmission device external to communication device A1000 or A2000, or data obtained from a sensor such as an image sensor included in communication device A1000 or A2000.

Control information for controlling operation of light receiver A3001 may be, for example, a signal specifying a rule for arranging the first periods and second periods, or a signal instructing light receiver A3001, which normally obtains imaging signals for videos using the imaging method for capturing video, to temporarily or continuously obtain imaging signals for optical communication using the sampling method for receiving optical signals. An example of this will be given later in greater detail.

Note that in the above description, the first period and the second period are exemplified as being arranged alternately, but the control method of the image sensor is not limited to this example. For example, a third period may be arranged that operates the CMOS sensor using an imaging method or a sampling method different from the methods employed in the first period and second period, and a transition period for switching operation of the image sensor may be implemented between the first period and the second period.

Depending on the control method of the image sensor, it is possible to use a single image sensor to obtain both imaging signals for optical communication and imaging signals for video using time-division. As a result, it is possible to reduce the number of image sensors included in the communication device.

Note that light receiving device A1002 may operate light receiver A3001 using the sampling method for receiving optical signals at all times to obtain reception signal A3002.

Upon generating video data A5002, image data generator A5001 may implement encoding processing using a video compression method on a video signal configured of frames generated based on reception signal A3002.

For example, when reception signal A3002 includes both an imaging signal for optical communication and an imaging signal for video, image data generator A5001 may implement video compression processing on a frame generated from the imaging signal for video, excluding images (or frames) generated from the imaging signal for optical communication. Here, light receiving device A1002 outputs, as optically received data A1003, the encoded video data, as well as image data generated from the imaging signal for optical communication.

In the above description, the imaging signal for optical communication is exemplified as being output from light receiving device A1002 as image data, but the imaging signal for optical communication may be output from light receiving device A1002 as data in any format so long as the format allows for demodulation of optical signals. For example, the data may be data arranged in order of an average or sum of luminance values of pixels included in each exposure line or an average or sum of luminance values of pixels included in each of regions into which each pixel line is divided.

Note that the video encoding processing that can be implemented by image data generator A5001 when reception signal A3002 includes the imaging signal for optical communication and the imaging signal for video is not limited to the above-described video encoding processing. For example, image data generator A5001 may implement a common video compression processing on a video including frames configured of imaging signals for optical communication and frames configured of imaging signals for video, and light receiving device A1002 may output, as optically received data A1003, encoded video data generated from imaging signals for optical communication and imaging signals for video.

Next, operations performed by controller A1004 in a case in which light receiving device A1002 includes a configuration of optically received signal processor A5000.

When light receiving device A1002 includes a configuration of optically received signal processor A5000, light receiving device A1002 does not perform processing such as demodulation and error correction on imaging data for optical communication. Accordingly, controller A1004 implements processing such as demodulation and error correction on an optical signal using imaging data for optical communication included in optically received data A1003, and obtains data transmitted via the optical signal.

Note that when optically received data A1003 includes imaging data for video in addition to imaging data for optical communication, controller A1004 may perform, in addition to processing such as demodulation and error correction on the optical signal included in imaging data for optical communication, image processing such as pattern recognition on the imaging data for video, and may further control light receiving device A1002 and/or radio device A1006 based on the result of the image processing such as pattern recognition.

Examples of signal processing using imaging data for video include processing of detecting a body part of a person such as the face, processing of distinguishing between people, processing of detecting a target such as a vehicle or drone, processing of distinguishing between targets such as vehicles and drones, processing of detecting movement or displacement of a detected person or target, and processing of tracking a detected person or target. These processes may be performed by extracting, from imaging data for video, feature amounts determined depending on the intended use of the signal processing and using the extracted feature amounts, and may be performed in a model generated by machine learning using a multilayer neural network. Note that when a model generated by machine learning using a multilayer neural network is used, the imaging data for video may first be preprocessed, and then the preprocessed data may be input into the model generated by machine learning using a multilayer neural network.

Note that in the above description, imaging data for video is used in the signal processing performed by controller A1004, but sound data and/or other data obtained from, for example, a sensor may be used in addition to the imaging data for video, and sound data and/or other data obtained from, for example, a sensor may be used instead of the imaging data for video.

Moreover, when light receiving device A1002 includes a configuration of optically received signal processor A5000 and light receiving device A1002 outputs encoded video data as optically received data A1003, controller A1004 may perform, as the above-described signal processing or part of the signal processing, video decoding processing corresponding to the video encoding processing, on the encoded video data included in optically received data A1003.

Next, an example of the configuration of optically received signal processor A3003 will be given.

Figure 40:
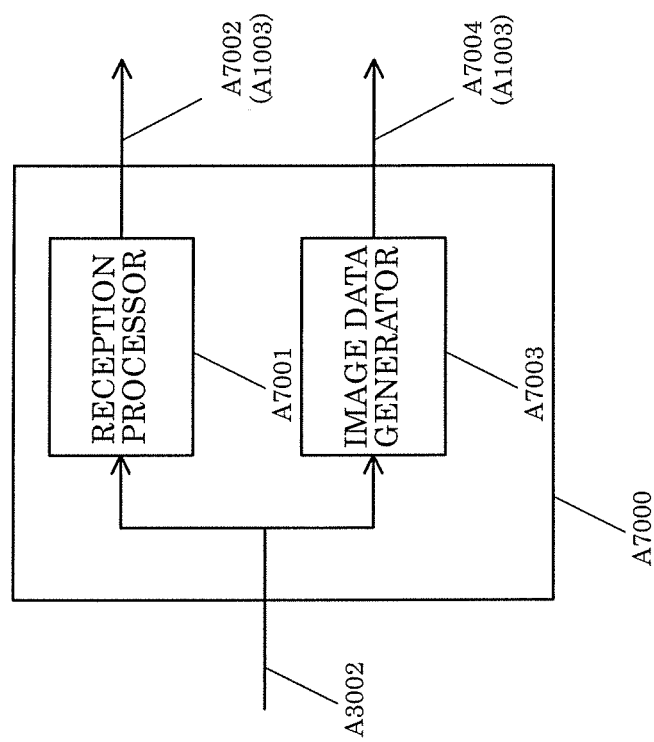
FIG. 40 illustrates a third configuration example of the optically received signal processor according to Embodiment 8.

FIG. 40 illustrates the configuration of optically received signal processor A7000, which is a third example of a configuration of optically received signal processor A3003. Optically received signal processor A7000 includes reception processor A7001 and image data generator A7003.

Reception processor A7001 included in optically received signal processor A7000 includes the same functions as reception processor A4001 included in optically received signal processor A4000 described with reference to FIG. 37.

Image data generator A7003 included in optically received signal processor A7000 includes the same functions as image data generator A5001 included in optically received signal processor A5000 described with reference to FIG. 38.

When light receiving device A1002 includes optically received signal processor A7000, light receiving device A1002 controls light receiver A3001 and obtains an imaging signal for video and an imaging signal for optical communication as reception signal A3002. Optically received signal processor A7000 inputs the imaging signal for video into image data generator A7003, and inputs the imaging signal for optical communication into reception processor A7001. However, it goes without saying that optically received signal processor A7000 may input the imaging signal for optical communication into image data generator A5001.

Optically received signal processor A7000 outputs, as optically received data A1003, demodulated data A7002 and video data A7004.

Here, appended information such as time information indicating the time of reception of modulated signal corresponding to the demodulated data, or metadata, may be appended to demodulated data A7002. Here, time information appended to demodulated data A7002 may be in a format that allows for the relationship between this information and the time information appended to video data A7004 to be distinguished. For example, optically received signal processor A7000 may append the time information for demodulated data A7002 and the time information for video data A7004 based on a common clock signal or time line, and information indicating the relationship between the time information for demodulated data A7002 and the time information for video data A7004, such as information indicating the offset between the time information for demodulated data A7002 and the time information for video data A7004, may be included in the time information for demodulated data A4002 and the time information for video data A5002.

Moreover, demodulated data A7002 may include, as appended information or meta data, position information indicating a position, in an image, of the transmission device or light source that transmitted the modulated signal corresponding to the demodulated data.

The appended information of demodulated data A7002 may include both time information and position information and may include only one of the two. Moreover, other than time information and position information, the appended information of demodulated data A7002 may include relative information related to the demodulated data.

Note that the position information is exemplified as information indicating a position, in an image, of the transmission device or light source, but the position information may be some other type of information. For example, the position information may be information indicating the region in the image used for optical signal detection, or information indicating a position in a three-dimensional space. Position information on a position in a three-dimensional space may be, for example, information indicating a direction in which light receiving device A1002 is capturing an image and a position in the image of the imaging data for video, and may be information indicating a value and region of coordinates in a coordinate system whose origin is the light receiving device or the communication device estimated based on the above data. Moreover, the information may be information indicating a value and region of coordinates in any given coordinate system used for, for example, GPS or three-dimensional mapping, estimated using position information on the communication device or light receiving device. Moreover, when light receiving device A1002 obtains, in addition to imaging data for video, range image data indicating a depth to the captured target, the position in the three-dimensional space may be estimated using the range image data in addition to the imaging data for video.

A range image can be obtained by, for example, using a time-of-flight (TOF) method, a range-finding method that uses stereo disparity, or a laser imaging detection and ranging (LIDER) method.

Demodulated data A7002 and video data A7004 may be transmitted to controller A1004 in communication device A1000 or controller A1004 in communication device A2000 as a plurality of divided data streams or data packet sequences, and may be multiplexed onto a data stream in a format that allows for storing of both demodulated data A7002 and video data A7004 and transmitted to controller A1004 in communication device A1000 or controller A1004 in communication device A2000 in a single data stream or data packet sequence.

Figure 41:
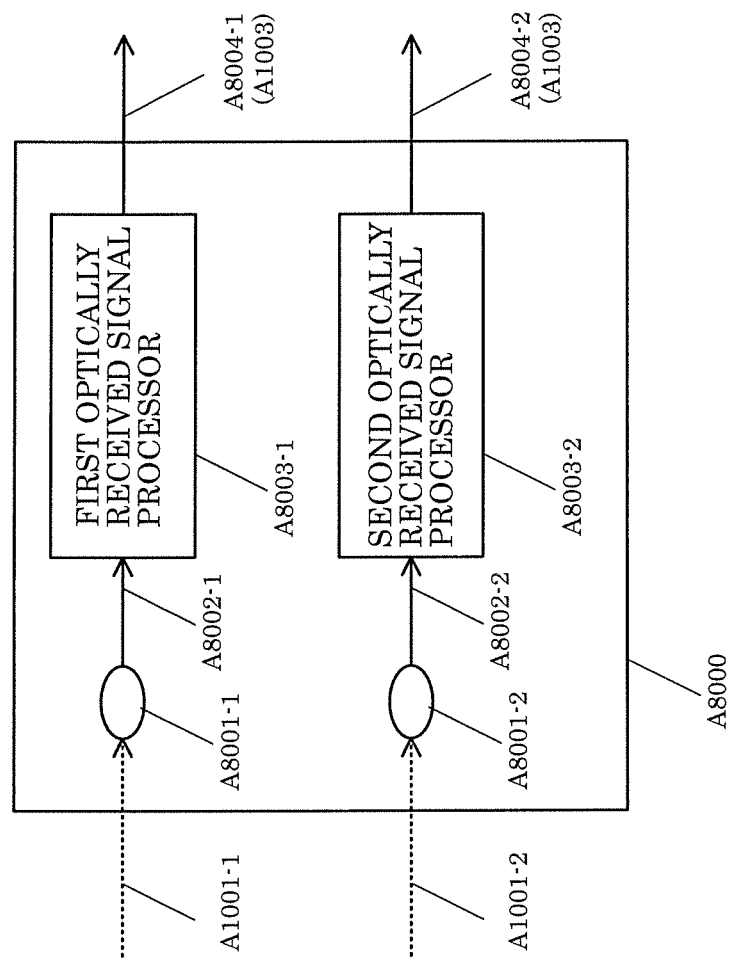
FIG. 41 illustrates a second configuration example of the light receiving device according to Embodiment 8.

FIG. 41 illustrates the configuration of light receiving device A8000, which is a second example of a configuration of light receiving device A1002. Light receiving device A8000 includes first light receiver A8001-1, second light receiver A8001-2, first optically received signal processor A8003-1, and second optically received signal processor A8003-2.

First light receiver A8001-1 is an image sensor such as a CCD, CMOS, or organic CMOS image sensor, second light receiver A8001-2 is an image sensor such as a CCD, CMOS, or organic CMOS image sensor, or a device capable of converting optical signals into electrical signals, such as a photodiode. Light receiving device A8000 operates first light receiver A8001-1 using an imaging method for capturing video, and obtains an imaging signal for video as reception signal A8002-1.

When second light receiver A8001-2 is an image sensor, light receiving device A8000 operates second light receiver A8001-2 using a sampling method for receiving optical signals, and obtains imaging signal for optical communication as reception signal A8002-2. However, when second light receiver A8001-2 is a device capable of converting optical signals into electrical signals, such as a photodiode, light receiving device A8000 obtains reception signal A8002-2 sampled at a sampling rate required for reception of optical signals using second light receiver A8001-2.

First optically received signal processor A8003-1 has the same functions as, for example, optically received signal processor A5000 illustrated in FIG. 38, and outputs image data A8004-1, which is imaging data for video, as optically received data A1003.

Second optically received signal processor A8003-2 has the same functions as, for example, optically received signal processor A4000 illustrated in FIG. 37, and outputs demodulated data A8004-2 as optically received data A1003. Note that second optically received signal processor A8003-2 has the same functions as, for example, optically received signal processor A5000 illustrated in FIG. 38, and outputs image data A8004-2, which is imaging data for optical communication, as optically received data A1003.

With this configuration, since light receiving device A8000 can simultaneously obtain image data A8004-1, which is imaging data for video, and image data A8004-2, which is demodulated data or imaging data for optical communication, light receiving device A8000 can both perform optical communication and capture video, without producing a period in which imaging data for video cannot be obtained.

Note that although light receiving device A8000 is exemplified as including two systems of a combination of a light receiver and an optically received signal processor, light receiving device A8000 may include N (N is an integer greater than or equal to 3) systems of a combination of a light receiver and an optically received signal processor.

Moreover, first light receiver A8001-1 and second light receiver A8001-2 need not be separate components. For example, a portion of the pixels of the image sensor may be used for capturing a video by operating them using the imaging method for capturing video as first light receiver A8001-1, and a different portion of the pixels of the same image sensor may be used for optical communication by operating them using the sampling method for receiving optical signals as second light receiver A8001-2.

Similarly, when light receiving device A8000 includes N or more systems of the light receiver and the optically received signal processor, pixels included in a first region of the image sensor may be used for capturing a video by operating them using the imaging method for capturing video, and pixels included in the second through N-th regions of the image sensor may be used for optical communication by operating them using the sampling method for receiving optical signals. Note that when it is not necessary to perform video capturing and light communication concurrently, without operating any of the pixels of the image sensor using the imaging method for capturing video, the pixels of the image sensor may be divided into a plurality of regions, and the pixels in respective regions may be operated using the sampling method for receiving optical signals to perform a plurality of instances of optical communication in parallel.

Note that when video capturing or optical communication is performed using an image sensor, there is no need to always operate all of the pixels; there may be pixels that are temporarily or continuously not operated, that is to say, elements that do not readout accumulated electric loads resulting from receiving light.

Next, one example of control of the image sensor in a case in which a plurality of optical signals are concurrently received using the image sensor will be given with reference to FIG. 42.

Figure 42:
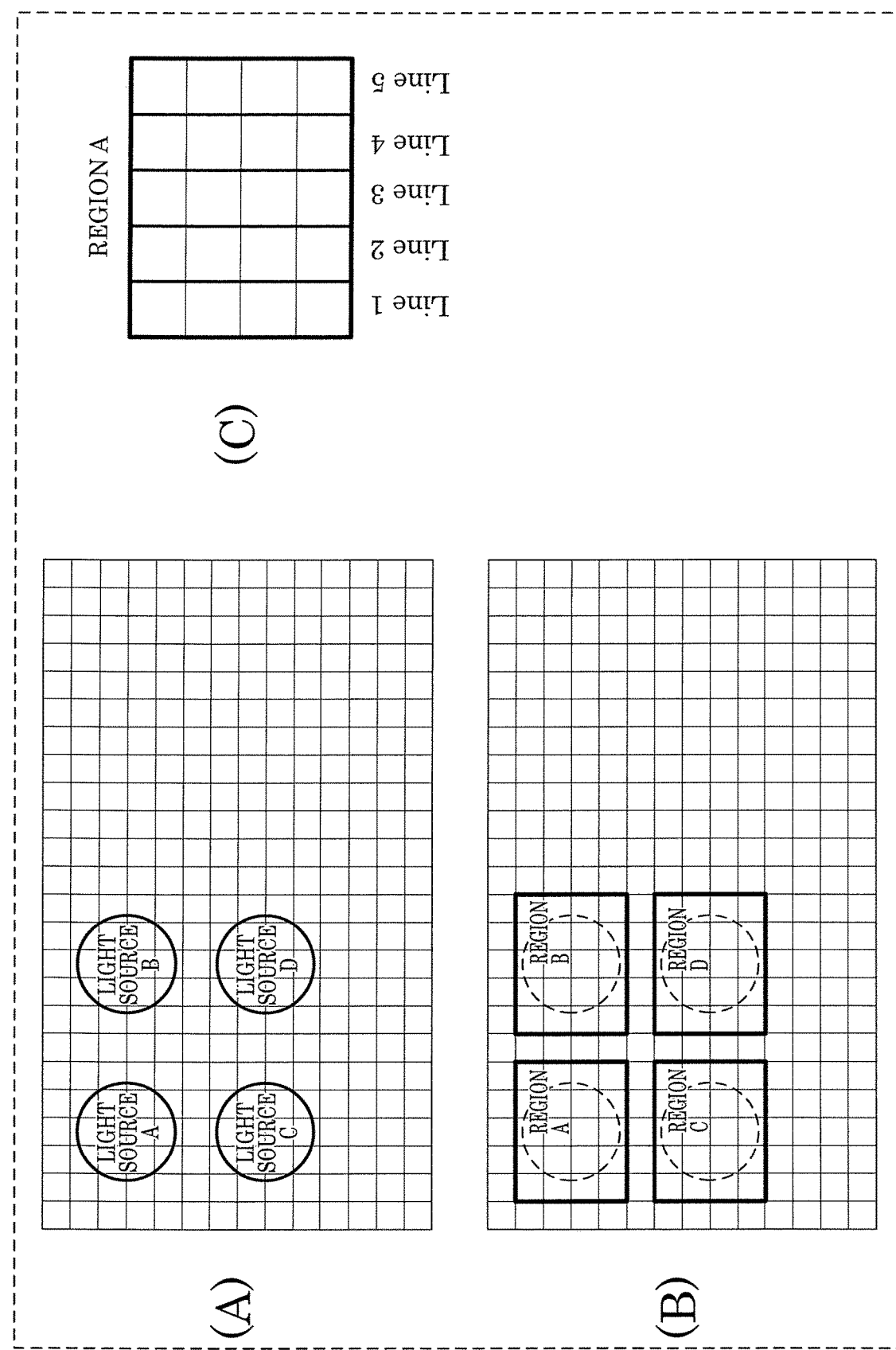
FIG. 42 illustrates an example of performing line scan sampling on a plurality of regions in parallel.

In FIG. 42, (A) illustrates a state in which four light sources A through D that transmit mutually different optical signals are present in a capture region, which is a region that is capturable when the imaging method for capturing video is used. Each of the square regions in the capture region illustrated in (A) in FIG. 42 corresponds to a pixel.

Here, for example, light receiving device A8000 discerns regions A through D including the light sources A through D, as illustrated in (B) in FIG. 42, and for each of the regions A through D, operates the pixels in that region using the sampling method for receiving optical signals to obtain the optical signals.

As one example of a configuration for performing sampling for reception of optical signals for each region, a sampling method in an image sensor having a shutter function for each pixel will be given.

(Example of Line Scan Sampling for Each Region)

An example in which line scan sampling is performed when, as illustrated in (C) in FIG. 42, in region A, a single line is configured of four pixels aligned in the vertical direction (column direction). In this example, region A includes 5 lines. The light receiving device exposes the lines by shifting the exposure period on a line-by-line basis for the five lines in region A to obtain changes in luminance or color of the modulated optical signals. However, note that the size of each of the regions, that is to say, the number of pixels included in the rows and the number of pixels included in the columns in each of the regions is not limited to the example illustrated in FIG. 42; the number of pixels is not limited. Moreover, the size of the regions in which sampling for optical communication is performed may be changed in accordance with the size, position, mutual positional relationship, etc., in the screen of each of the light sources. In the example illustrated in (C) in FIG. 42, although a single line is exemplified as including four pixels aligned in the column direction, for example, a single line may be five pixels aligned in the row direction, whereby there would be considered to be four row direction lines in the case of (C) in FIG. 42.

After the light receiving device reads out the signal from Line 1 in region A of (C) in FIG. 42, which is the left-most line in region A, light receiving device reads out the signals corresponding to the remaining lines one by one, from left to right. When the light receiving device is finished reading out the signal from Line 5, which is the right-most line in region A, the light receiving device returns to Line 1, which is the left-most line, and repeats the process of reading out the signals line by line.

In each of regions B through D in (B) in FIG. 42 as well, the light receiving device also performs line scan sampling by obtaining signals using the same process as in region A. Here, the light receiving device may expose the left-most line in every region at the same time or at different times. Moreover, the light receiving device may expose lines in the same column in regions A and C on the image sensor for the same exposure period, and expose lines in the same column in regions B and D on the image sensor for the same exposure period. However, regions A through D include lines that are exposed for the same exposure period.

Here, an example was given in which a plurality of pixels aligned in the vertical direction (column direction) are exposed for the same period as a single line and signals are read out line by line, but line scan sampling in which a plurality of pixels aligned in the horizontal direction (row direction) are treated as a single line may be performed.

In the above description, at least one pixel in the image sensor is used for both video capturing and optical communication, and switching is performed for switching between whether to obtain a signal corresponding to that pixel or pixels using the imaging method for capturing video or the sampling method for optical communication, but the configuration of the light receiving device including the image sensor is not limited to this example. For example, the image sensor may include pixels used for optical communication aside from the pixels that are used for video capturing.

When the image sensor includes pixels used for optical communication aside from the pixels that are used for video capturing, the shape and/or size of the pixels used for optical communication may be different from the shape and/or size of the pixels used for video capturing.

Moreover, the capturing of video using the pixels for video capturing and the sampling for optical communication using the pixels for optical communication may be controlled independently, and in circumstances in which one of the processing is unnecessary, one of the processing may be stopped, and the supply of power to the circuit for obtaining the signal required in the processing may be stored partially or entirely so as to reduce power consumption.

By performing line scan sampling as described above, as illustrated in (A) in FIG. 42, since it is possible to receive the mutually different modulated signals from the plurality of light sources in parallel, it is possible to achieve the advantageous effect whereby data transmission speeds are increased.

Next, one example of the configuration of controller A1004 included in communication device A1000 or communication device A2000 will be given.

Figure 43:
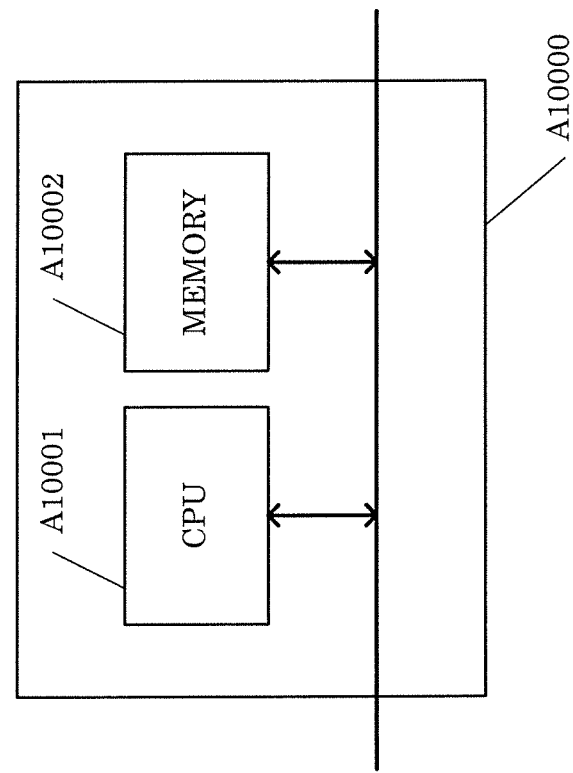
FIG. 43 illustrates a physical configuration example of a controller according to Embodiment 8.

FIG. 43 illustrates controller A10000, which is one example of a physical configuration of controller A1004. Controller A10000 includes central processing unit (CPU) A10001 and memory A10002. Memory A10002 stores, for example, data required for, for example, a program implemented by controller A1004 or processing performed by the controller. CPU A10001 performs processing based on a program read from memory A10002 and achieves the functions of controller A1004. Moreover, for example, memory A10002 stores data such as image data obtained by the reception device and reads out the stored data.

Note that here, the elements that configure controller A10000 are exemplified as a CPU and memory, but controller A10000 may include other elements. For example, controller A10000 may include a graphics processing unit (GPU) in addition to and separate from the CPU, and may include a circuit for performing video encoding processing, video decoding processing, and image processing such as pattern recognition on the imaging data for video. Moreover, controller A10000 may include, for example, an input/output (I/O) for controlling the transferring of data between devices connected to controller A10000 included in, for example, radio device A1006.

Figure 44:
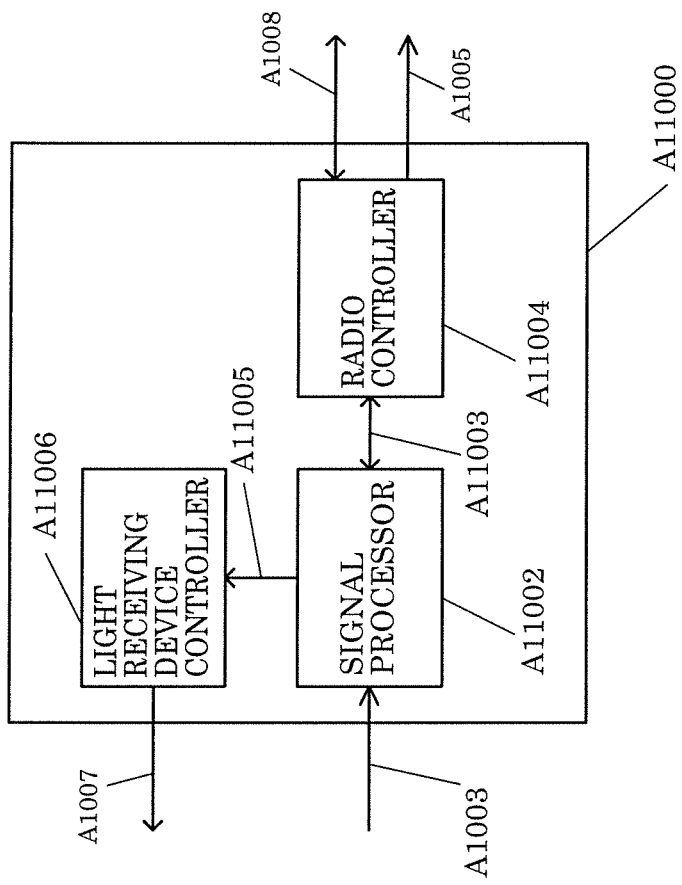
FIG. 44 illustrates a configuration example of the controller according to Embodiment 8.

FIG. 44 illustrates the configuration of controller A11000, which is a first example of the configuration of controller A1004. Controller A11000 includes signal processor A11002, radio controller A11004, and light receiving device controller A11006.

Signal processor A11002 obtains, as optically received data A1003 from light receiving device A1002, image data including imaging data for optical communication, or demodulated data on which demodulation and error correction as been performed, as an optical signal. When optically received data A1003 is image data including imaging data for optical communication, signal processor A11002 obtains a reception signal corresponding to the modulated signal from imaging data for optical communication, and performs demodulation processing and error correction processing on the reception signal to receive demodulated data.

Radio controller A11004 outputs control signal A1005 for controlling operation of radio device A1006 to radio device A1006. Radio controller A11004 transfers the radio reception data received via radio device A1006 to signal processor A11002, and transfers the radio transmission data to be transmitted to other communication devices via radio device A1006 to radio device A1006 from signal processor A11002.

Signal processor A11002 performs signal processing using arbitrary data, such as demodulated data for optical communication, video imaging data, radio reception data obtained via light receiving device A1002 and radio device A1006. For example, signal processor A11002 instructs control of radio device A1006 by radio controller A11004 and instructs control of light receiving device by light receiving device controller A11006, based on the result of the above-described signal processing (A11005).

Light receiving device controller A11006 controls light receiving device A1002 based on the instruction from signal processor A11002. Examples of the control of light receiving device A1002 include controlling whether to obtain a signal using the imaging method for capturing video or the sampling method for receiving optical signals via light receivers A3001, A8001-1, and A8001-2, and the setting of the region of pixels to use the sampling method for receiving optical signals in cases in which a signal is obtained using the sampling method for receiving optical signals using a portion of the pixels included in the image sensor. However, the control of light receiving device A1002 is not limited to these examples. For example, the control of light receiving device A1002 may include the switching of the power of light receiving device A1002 ON and OFF, and the switching of signal processing performed on optically received signals performed in light receiving device A1002. Moreover, some of the control described here may be performed automatically based on the result of the signal processing performed on the optically received signals in light receiving device A1002.

Figure 45:
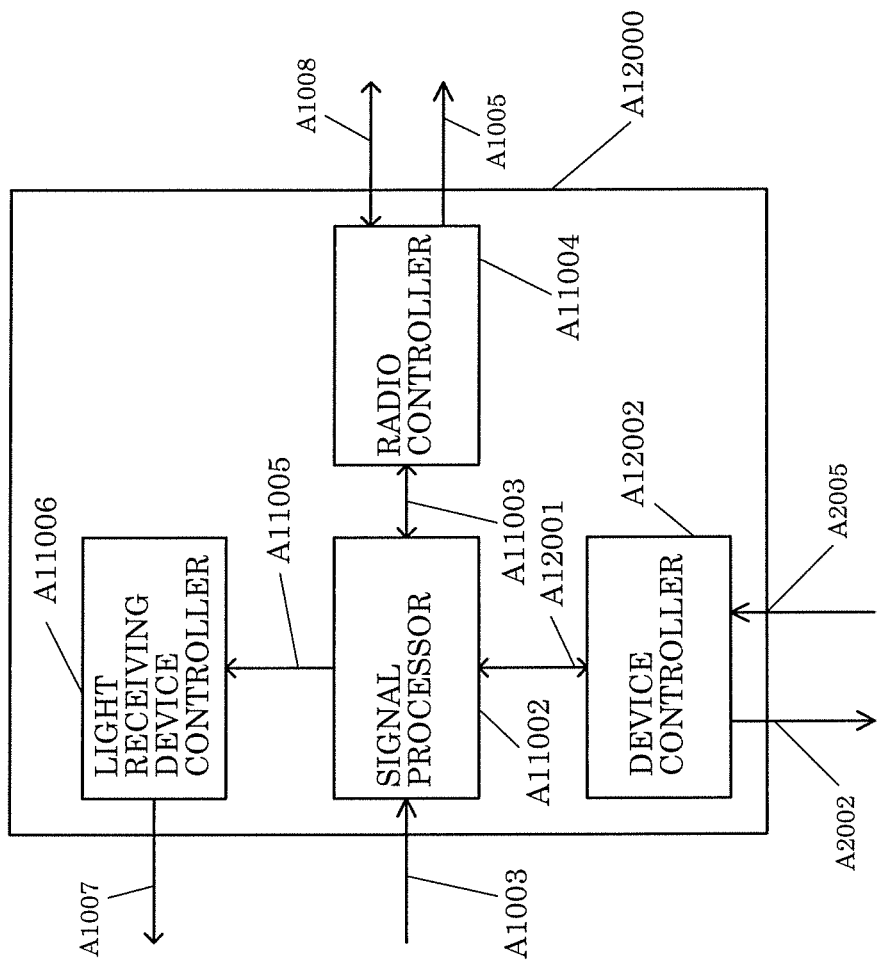
FIG. 45 illustrates another configuration example of the controller according to Embodiment 8.

FIG. 45 illustrates the configuration of controller A12000, which is a second example of the configuration of controller A1004. Controller A12000 differs from controller A11000 in regard to the inclusion of device controller A12002.

Device controller A12002 receives inputs of video imaging data obtained by signal processor A11002 and/or the processing result of signal processor A11002 (A12001), generates an image to be displayed on presentation unit A2003, and outputs the generated image signal to presentation unit A2003 as presentation information A2002. Device controller A12002 obtains input information A2005 obtained by input unit A2004 in accordance with the user operation of input unit A2004, and transfers input information A2005 to signal processor A11002.

With this configuration, signal processor A11002 can perform signal processing based on input information A2005 obtained in accordance with a user operation, in addition to the demodulated data for optical communication, video imaging data, and radio reception data obtained via light receiving device A1002 and radio device A1006. For example, signal processor A11002 instructs control of radio device A1006 by radio controller A11004 and instructs control of light receiving device by light receiving device controller A11006, based on the result of the above-described signal processing (A11005), and instructs the changing of the image displayed on presentation unit A2003.

Hereinafter, as one example of processes performed by controller A1004, a communication control method of controlling radio device A1006 based on demodulated data obtained by receiving an optical signal and the result of image processing such as pattern recognition implemented on the imaging data for video, will be described.

Signal processor A11002 obtains imaging data for video as optically received data A1003 from light receiving device A1002, and implements image processing such as pattern recognition on the imaging data for video. Radio controller A11004 controls radio device A1006 based on the result of image processing in signal processor A11002.

With the communication control method described in this embodiment, demodulated data obtained by receiving an optical signal is associated with appended information such as position information indicating the position, in the image, of the transmitter that transmitted the optical signal or the light source used in the transmission of the optical signal, and the demodulated data appended with the appended information is used. In this embodiment, the information transmitted using optical communication may be any kind of information, and is not limited to a specific kind of information, but in the following description related to the communication control method, as one example, the information transmitted in the optical signal is exemplified as connection information including information required for connection or communication with another radio communication device, such as the base station SSID described in Embodiments 3 through 7, for example.

Signal processor A11002 performs processing using demodulated data appended with appended information obtained in light receiving device A1002 or signal processor A11002. Here, the demodulated data is connection information corresponding to another radio communication device. When there are a plurality of items of the obtained connection information, signal processor A11002 controls communication processing implemented by radio device A1006 using the appended information corresponding to each of the items of connection information and the result of image processing such as pattern recognition.

Next, a first example of communication control based on the image processing result will be given.

Figure 46:
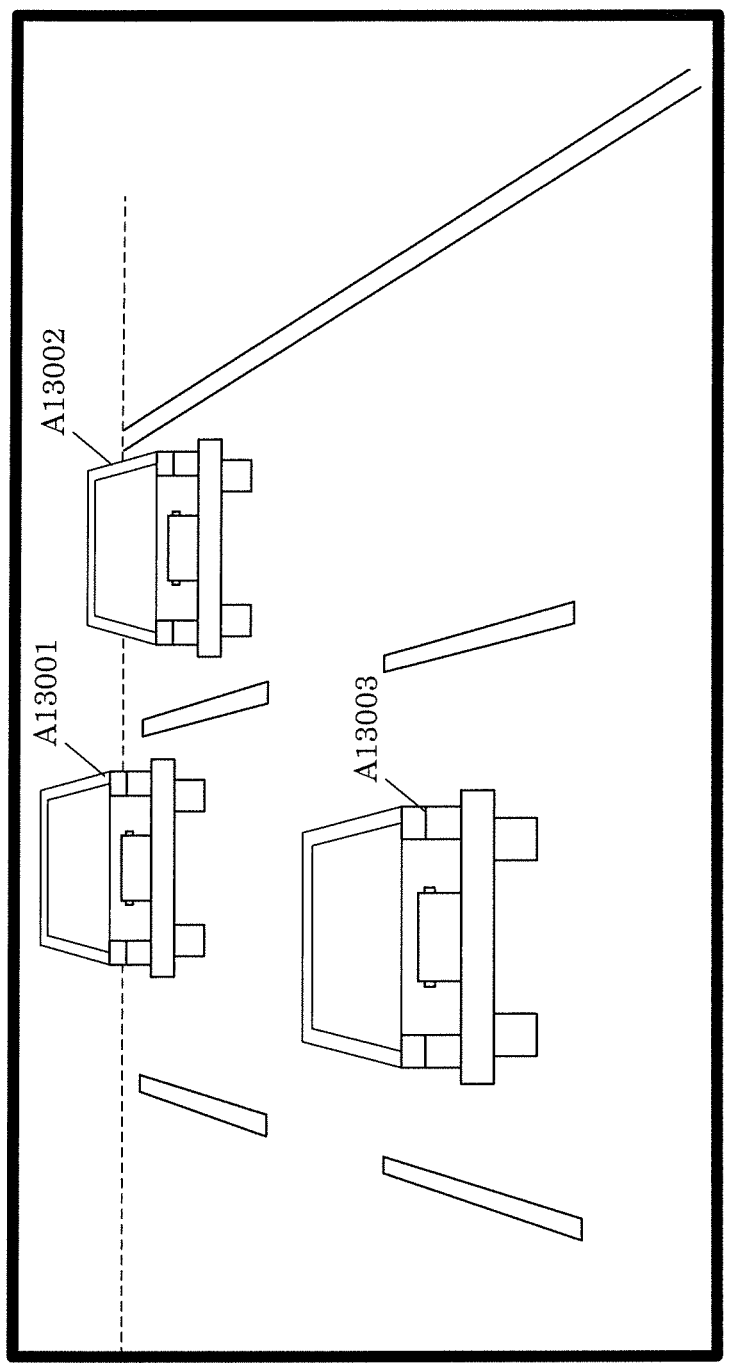
FIG. 46 is a first drawing for illustrating communication control based on an obtained image according to Embodiment 8.

In the first example of the communication control based on the image processing result, communication device A1000, A2000 is implemented as a vehicle or a device provided in a vehicle, and a camera provided in the vehicle is used as light receiving device A1002. FIG. 46 schematically illustrates one example of an image captured by a camera that captures a view in front of the vehicle. In FIG. 46, three vehicles A13001, A13002, and A13003 driving in front of the vehicle corresponding to communication device A1000, A2000 are captured.

Note that in the example given in this embodiment, a camera which captures a view in front of the vehicle is used, but it goes without saying that this embodiment can be implemented in the same manner even when the camera captures a view behind the vehicle or a view to a side of the vehicle.

Here, vehicles A13001, A13002, and A13003 each include a light source such as an LED, and transmission unit 102 that transmits an optical signal using the light source. Examples of light sources that can be used for optical communication include any given light source that is included in the vehicle such as a headlight or tail light, and which light source among the light sources included in the vehicle is to be used for transmitting optical signals may be selected arbitrarily depending on how the optical communication will be used. Moreover, when a plurality of light sources included in the vehicle are used for transmitting optical signals, the vehicle may include a transmission unit for optical communication use for each of the plurality of light sources, and, alternatively, may include a single transmission unit to transmit the optical signals using the plurality of light sources. Note that the vehicle may include a light source for optical communication use apart from the headlight and/or tail light.

Vehicles A13001, A13002, and A13003 include, in addition to the transmission unit and light source for optical communication, a communication device for radio communication that corresponds to other communication device A1100 described with reference to FIG. 34 and/or FIG. 35. Note that when the host vehicle and vehicles A13001, A13002, and A13003 include functions for the transmission and reception of optical signals and radio communication, communication device A1000, A2000 included in each of the vehicles has a configuration including transmission unit 102 and light source 104 for optical communication. In such cases, controller A1004 may control the data transmitted by transmission unit 102.

In the first example of communication control based on the image processing result, vehicles A13001, A13002, and A13003 transmit connection information which is information that can be used to connect with the communication device included in another vehicle via optical communication. Hereinafter, the connection information will be exemplified as including information indicating the SSID and the frequency channel used in the communication, in cases in which the communication device included in each of the vehicles operates as a base station.

Note that in the example in the above description, an SSID is notified as the identifier included in the connection information for determining the communication partner, but the identifier information included in the connection information is not limited to an SSID. For example, the identifier may be a physical address such as the media access control (MAC) address of the other communication device, and may be a logical address such as the internet protocol (IP) address of the other communication device. Note that when the identifier information is used to select a resource to be accessed via a network such as the internet, rather than the identifier information being used in the selection of the other communication device to perform direct communication with by the communication device, the identifier information may be the address of the server that performs communication via a network such as the internet or the uniform resource locator (URL), uniform resource name (URN), or uniform resource identifier (URI) used to identify a resource on the internet. So long as the identifier information included in the connection information is information that can identify another communication terminal acting as the access destination or a resource on the internet, any information may be used.

Note that in the above description, the connection information is exemplified as notifying information on the frequency channel used, but the connection information need not include information on the frequency channel used, and may include other information. Examples of other information that can be used as connection information include information related to an encryption key, types of compatible physical layer transmission standard, compatible data formats and/or communication protocols, etc.

Figure 47:
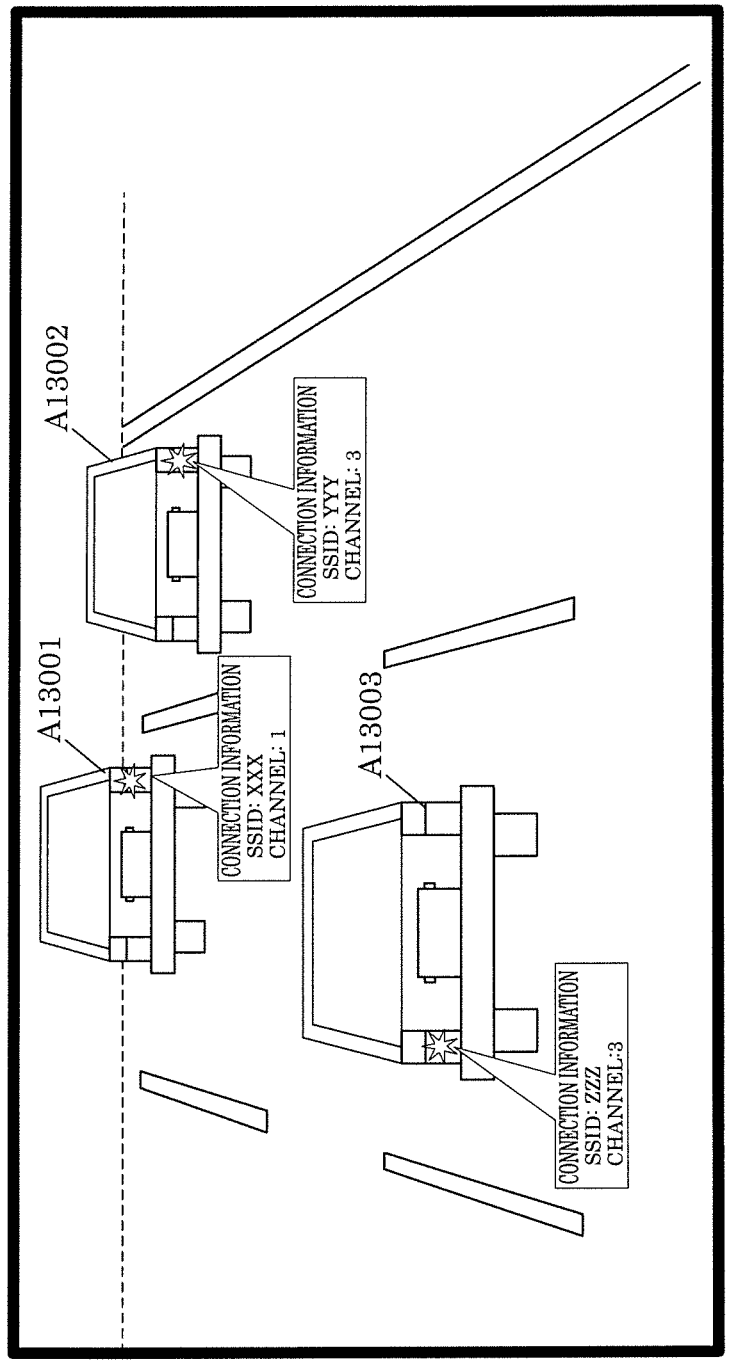
FIG. 47 is a second drawing for illustrating communication control based on an obtained image according to Embodiment 8.

FIG. 47 schematically illustrates connection information obtained, in light receiving device A1002 or controller A1004 of communication device A1000, A2000, by demodulating optical signals transmitted using light sources by the transmission units included in vehicles A13001, A13002, and A13003. Communication device A1000, A2000 obtains connection information from the optical signal transmitted by vehicle A13001 indicating that the SSID is "XXX" and the frequency channel used is 1, obtains connection information from the optical signal transmitted by vehicle A13002 indicating that the SSID is "YYY" and the frequency channel used is 3, and obtains connection information from the optical signal transmitted by vehicle A13003 indicating that the SSID is "ZZZ" and the frequency channel used is 3.

These items of connection information may be substituted with information that can be obtained by radio device A1006 in communication device A1000, A2000 performing carrier sense over a given period, and receiving a signal transmitted from each of a plurality of communication devices. However, it is difficult for communication device A1000, A2000 to determine which of the plurality of other communication devices in the surrounding area transmitted the signal, and there is a possibility that communication device A1000, A2000 will connect and communicate with a communication device that is not the communication device that communication device A1000, A2000 actually wants to communicate with.

Thus, in the first example of communication control based on an image processing result, controller A1004 in communication device A1000, A2000 implements image processing on imaging data for video captured by light receiving device A1002, and detects vehicles A13001, A13002, and A13003 from, for example, the image illustrated in FIG. 46. Here, based on the positions of the light sources of the three optically received signals, controller A1004 associates the three vehicles A13001, A13002, and A13003 detected from the image with the three items of connection information received via optical communication. This makes it possible to identify connection information to use when radio communication is performed between the three vehicles detected from the images.

Next, controller A1004 determines the reciprocal positional relationship between vehicles A13001, A13002, and A13003 from the image and the positional relationships between each of these vehicles and the host vehicle, and then selects a target to perform radio communication with. Controller A1004 may select the vehicle closest to the host vehicle, which is vehicle A13003, as the communication target. Controller A1004 may determine which lanes each of the vehicles is driving in and select, as the communication partner, a vehicle that is driving in the same lane as the host vehicle and is positioned frontmost in the image, which is vehicle A13001.

With this configuration, it is possible to perform association with an object detected using signal processing such as pattern recognition based on (i) information difficult to be associated with a device in a real space with radio communication alone, like an identifier used in radio communication such as an SSID or address, and (ii) sensing data obtained from a sensor such as the image obtained by the image sensor. As a result, for example, when information such as the surrounding environment and the movement of surrounding vehicles is obtained for the purpose of controlling automated driving including assisted driving, this makes it easier to connect to a communication partner that is appropriate for obtaining such information.

Next, a second example of communication control based on the image processing result will be given.

In the second example of communication control based on the image processing result, the configuration of communication device A1000, A2000 or the configuration of the host vehicle provided with communication device A1000, A2000, and the configuration of other vehicles A13001, A13002 are the same as described in example 1 of the communication control based on the image processing result. The second example of communication control based on the image processing result differs from the first example of communication control based on the image processing result in that vehicle A13003 is replaced by vehicle A15003 that is not equipped with a function of transmitting optical signals.

Figure 48:
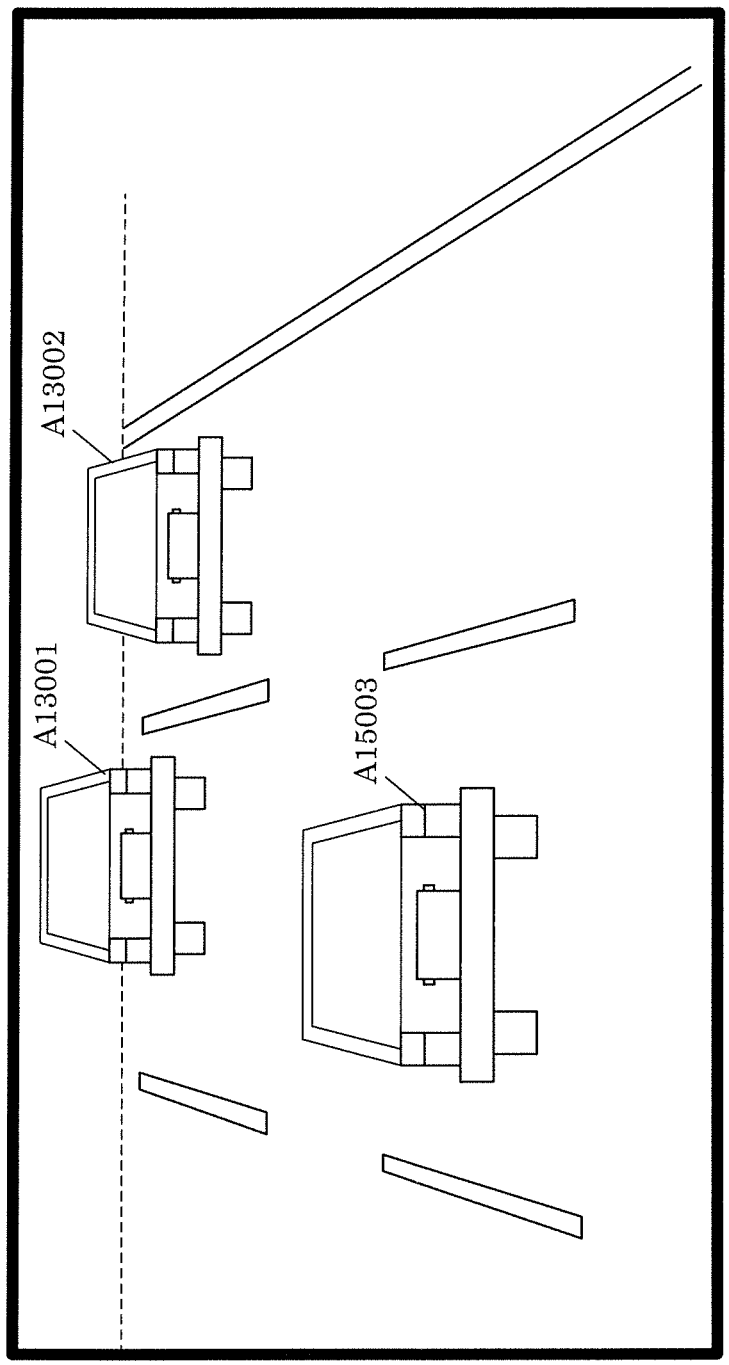
FIG. 48 is a third drawing for illustrating communication control based on an obtained image according to Embodiment 8.

FIG. 48 schematically illustrates one example of an image captured by a camera that captures a view in front of the vehicle, according to the second example of communication control based on the image processing result. In FIG. 48, three vehicles A13001, A13002, and A15003 driving in front of the vehicle corresponding to communication device A1000, A2000 are captured.

Figure 49:
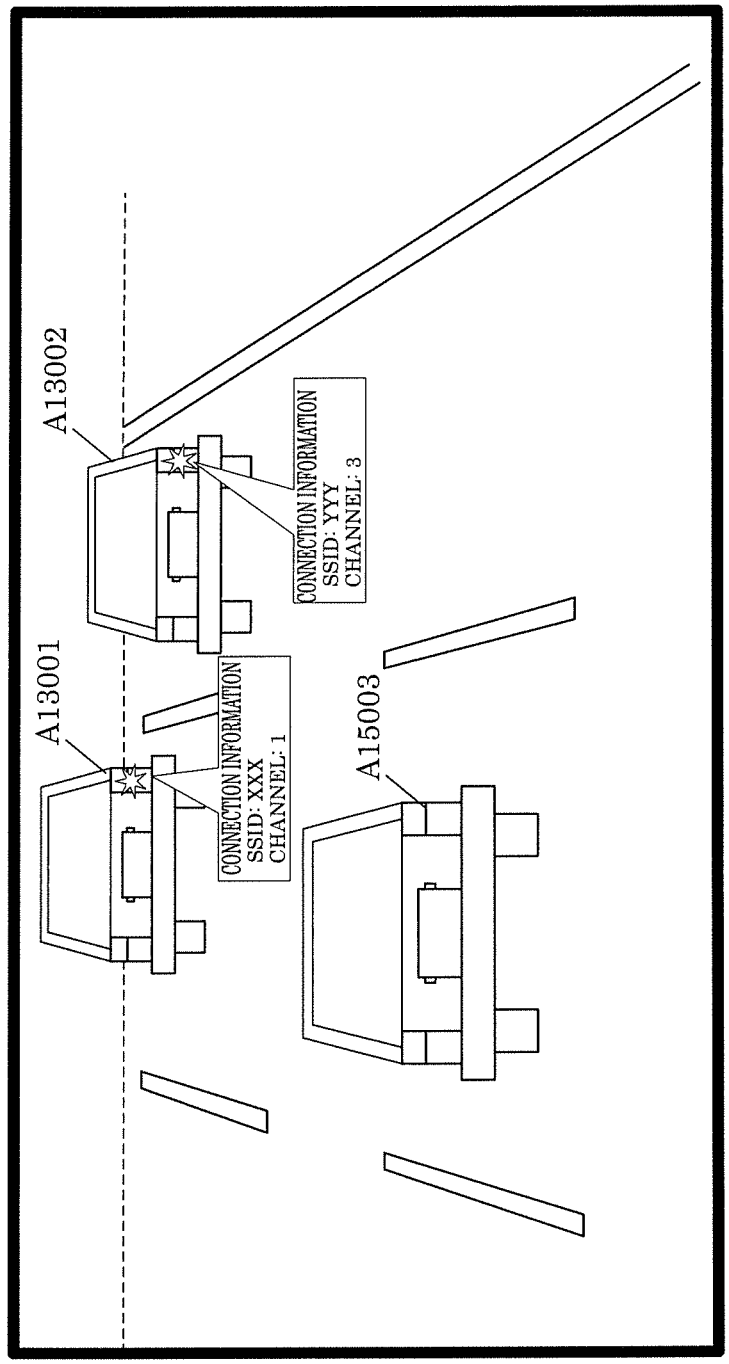
FIG. 49 is a fourth drawing for illustrating communication control based on an obtained image according to Embodiment 8.

FIG. 49 schematically illustrates connection information obtained, in light receiving device A1002 or controller A1004 of communication device A1000, A2000, by demodulating optical signals transmitted using light sources by the transmission units included in vehicles A13001 and A13002. Communication device A1000, A2000 obtains connection information from the optical signal transmitted by vehicle A13001 indicating that the SSID is "XXX" and the frequency channel used is 1, and obtains connection information from the optical signal transmitted by vehicle A13002 indicating that the SSID is "YYY" and the frequency channel used is 3. Here, since vehicle A15003 is not equipped with a function of transmitting optical signals, communication device A1000, A2000 does not obtain connection information relating to A15003.

In the second example of communication control based on an image processing result, controller A1004 in communication device A1000, A2000 implements image processing on imaging data for video captured by light receiving device A1002, and detects vehicles A13001, A13002, and A15003 from, for example, the image illustrated in FIG. 48. Here, based on the positions of the light sources of the two optically received signals, controller A1004 associates, from among vehicles A13001, A13002, and A15003, the two vehicles A13001 and A13002 detected from the image with the two items of connection information received via optical communication. With this, it is possible to identify connection information to be used when performing radio communication with vehicles A13001 and A13002 detected from the image, as well as identify that the base station or communication device whose SSID is XXX or YYY is not the SSID to be used to communicate with vehicle A15003.

First, an example in which vehicle A15003 does not have a function of transmitting optical signals but has a function of performing radio communication using the SSID "PPP" will be given.

In such cases, radio device A1006 detects the three SSIDs of XXX, YYY, and PPP as the SSIDs of other communication devices provided in vehicles within a range in which communication is possible, via carrier sense, and controller A1004 determines that PPP is the SSID to be used for communication with A15003, which differs from the SSIDs of XXX and YYY included in the connection information received as optical signals, and thus associates the SSID "PPP" with vehicle A15003.

Controller A1004 determines the reciprocal positional relationship between vehicles A13001, A13002, and A15003 from the image and the positional relationships between each of these vehicles and the host vehicle, and then selects a target to perform radio communication with. For example, controller A1004 may select the vehicle closest to the host vehicle, which is vehicle A15003, as the communication target. Controller A1004 may determine which lanes each of the vehicles is driving in and select, as the communication partner, a vehicle that is driving in the same lane as the host vehicle and is positioned frontmost in the image, which is vehicle A13001.

With this configuration, it is possible to perform association with an object detected using signal processing such as pattern recognition based on (i) information difficult to be associated with a device in a real space with radio communication alone, like an identifier used in radio communication such as an SSID or address, and (ii) sensing data obtained from a sensor such as the image obtained by the image sensor. As a result, for example, when information such as the surrounding environment and the movement of surrounding vehicles is obtained for the purpose of controlling automated driving including assisted driving, this makes it easier to connect to a communication partner that is appropriate for obtaining such information.

Next, an example in which vehicle A15003 has neither a function of transmitting optical signals nor a function of performing radio communication will be given.

Here, radio device A1006 detects the two SSIDs of XXX and YYY as the SSIDs of other communication devices provided in vehicles within a range in which communication is possible, via carrier sense. Since controller A1004 does not detect an SSID other than XXX and YYY, which are the SSIDs included in the connection information received as optical signals, as the SSID of another communication device provided in a vehicle, controller A1004 determines that vehicle A15003 does not have a function of performing radio communication or is not a participant that can perform radio communication.

Controller A1004 determines the reciprocal positional relationship between vehicles A13001, A13002, and A15003 from the image and the positional relationships between each of these vehicles and the host vehicle, and then selects either vehicle A13001 or vehicle A13002 as a target to perform radio communication with. For example, controller A1004 may select the vehicle that is both closest to the host vehicle and capable of communication, which is vehicle A13002, as the communication target. Controller A1004 may determine which lanes each of the vehicles is driving in and select, as the communication partner, a vehicle that is driving in the same lane as the host vehicle and is positioned frontmost in the image, which is vehicle A13001.

With this configuration, it is possible to perform association with an object detected using signal processing such as pattern recognition based on (i) information difficult to be associated with a device in a real space with radio communication alone, like an identifier used in radio communication such as an SSID or address, and (ii) sensing data obtained from a sensor such as the image obtained by the image sensor. As a result, for example, it is possible to determine that information cannot be obtained from communication with vehicle A15003 driving directly in front of the host vehicle, and, for example, when control of automated driving including assisted driving is performed, it is possible to prevent misrecognition of vehicle A13001 or A13002, which the host vehicle is capable of communicating with, for vehicle A15003, which facilitates the provision of appropriate automated driving control.

Next, a third example of communication control based on the image processing result will be given.

In the third example of communication control based on the image processing result, the configuration of communication device A1000, A2000 or the configuration of the host vehicle provided with communication device A1000, A2000, and the configuration of other vehicles A13002 and A13003 are the same as described in example 1 of the communication control based on the image processing result. The third example of communication control based on the image processing result differs from the first example of communication control based on the image processing result in that vehicle A13001 is replaced by police vehicle A17001. Police vehicle A17001 differs from vehicle A13001 in that it is a police vehicle, but has the same configuration as vehicle A13001, and is equipped with functions of transmitting optical signals and performing radio communication.

Figure 50:
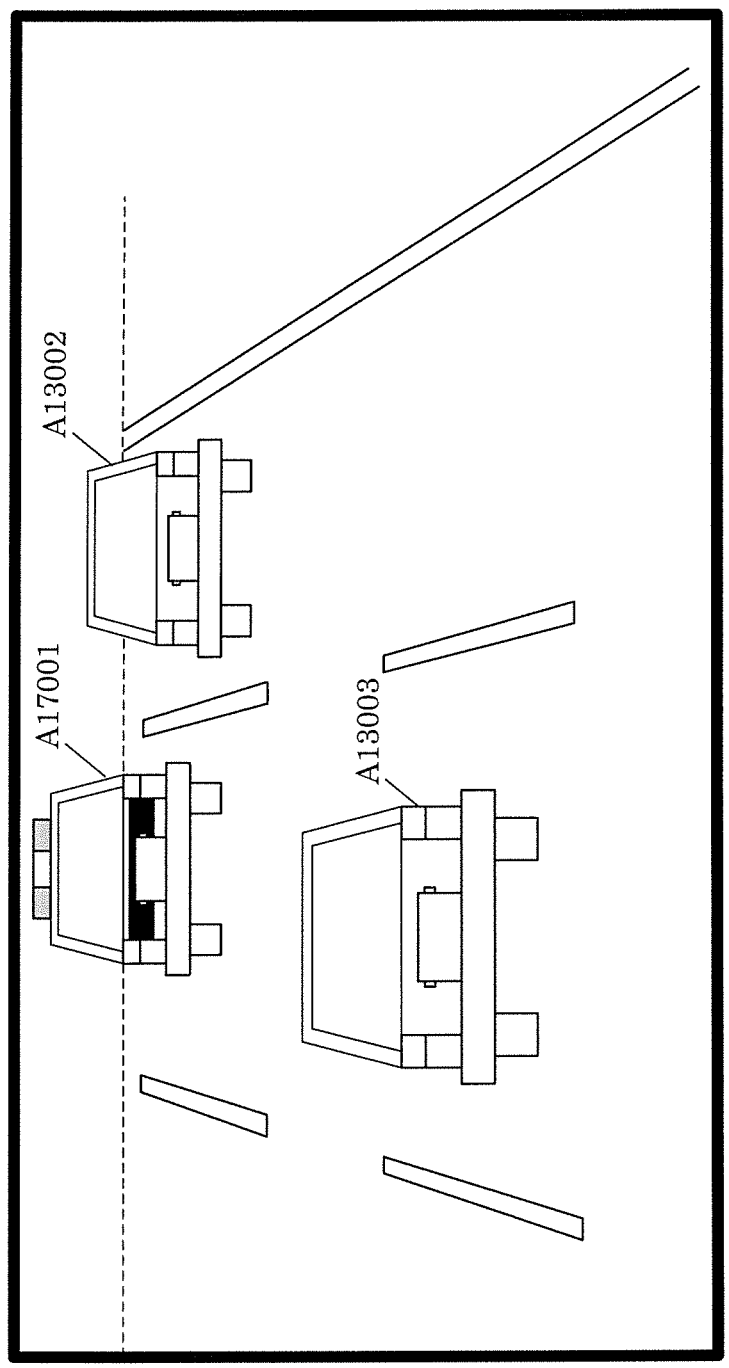
FIG. 50 is a fifth drawing for illustrating communication control based on an obtained image according to Embodiment 8.

FIG. 50 schematically illustrates one example of an image captured by a camera that captures a view in front of the vehicle, according to the third example of communication control based on the image processing result. In FIG. 50, vehicles A13002 and A13003 and police vehicle A17001 driving in front of the vehicle corresponding to communication device A1000, A2000 are captured.

Figure 51:
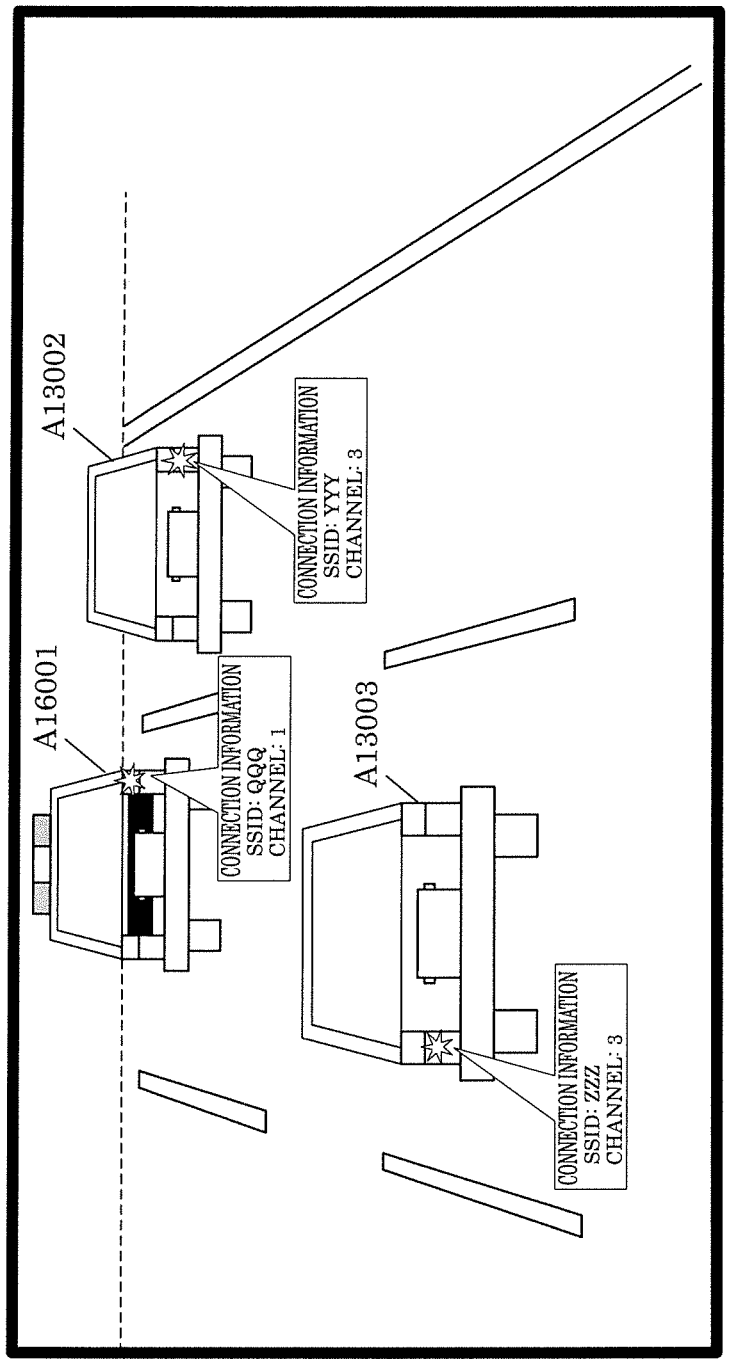
FIG. 51 is a sixth drawing for illustrating communication control based on an obtained image according to Embodiment 8.

FIG. 51 schematically illustrates connection information obtained, in light receiving device A1002 or controller A1004 of communication device A1000, A2000, by demodulating optical signals transmitted using light sources by the transmission units included in vehicles A17001, A13002, and A13003. Communication device A1000, A2000 obtains connection information from the optical signal transmitted by police vehicle A17001 indicating that the SSID is "QQQ" and the frequency channel used is 1, obtains connection information from the optical signal transmitted by vehicle A13002 indicating that the SSID is "YYY" and the frequency channel used is 3, and obtains connection information from the optical signal transmitted by vehicle A13003 indicating that the SSID is "ZZZ" and the frequency channel used is 3.

In the third example of communication control based on an image processing result, controller A1004 in communication device A1000, A2000 implements image processing on imaging data for video captured by light receiving device A1002, and detects police vehicle A17001 and vehicles A13002 and A13003 from, for example, the image illustrated in FIG. 50. Here, based on the positions of the light sources of the three optically received signals, controller A1004 associates police vehicle A17001 and vehicles A13002 and A13003 detected from the image with the three items of connection information received via optical communication. This makes it possible to identify connection information to use when radio communication is performed with each of police vehicle A17001 and vehicles A13002 and A13002 detected from the images.

Regarding the three vehicles recognized via the image processing, controller A1004 performs detailed classification including determining whether a vehicle is a police vehicle or not using information on, for example, the appearance of the vehicle, and recognizes that vehicle A17001 is a police vehicle. Controller A1004 selects, as a target to perform radio communication with, police vehicle A17001, which is the vehicle from which the obtainment of information takes priority from among police vehicle A17001 and vehicles A13002 and A13003.

With this configuration, upon recognizing a target object through signal processing such as pattern recognition from sensing data obtained via a sensor such as an image obtained from an image sensor, further detailed classification of the recognized target object is performed, and communication control can be performed based on this classification.

Note that the above-described example of control processing of selecting the police vehicle as a communication partner from which the obtainment of information takes priority is merely one non-limiting example; other control may be performed when a police vehicle is recognized. For example, police vehicle A17001 may include in the transmitted optical signal an identifier for identifying itself as a police vehicle, and controller A1004 may specify the identifier received from the optical signal from police vehicle A17001 to vehicle A13002 or A13003 and obtain information on police vehicle A17001, rather than directly wirelessly connecting to the police vehicle.

Moreover, when a police vehicle is detected through image processing, rather than always performing the same communication control, communication control may be performed that prioritizes the collection of information relating to the police vehicle when, for example, the emergency lights on the recognized police vehicle are recognized to be flashing, or when communication device A1000, A2000 includes a microphone in addition to the image sensor and controller A1004 detects the sound of a siren by implementing pattern recognition signal processing on the sound data obtained via the microphone.

Note that when detecting sound generated by another device using the sound data obtained by the microphone, a modulated signal generated based on transmission data such as an identifier of the device may be transmitted at the same time.

With this configuration, it is possible to associate a device that generates sound recognized through signal processing such as pattern recognition with transmission data such as an identifier transmitted as the sound signal. As a result, it may be possible to easily identify the device that generated the detected sound in an environment including a plurality of devices whose identifiers are known.

Note that a sound signal may be used instead of the optical signal, and in such cases, light receiving device A1002 in communication device A1000, A2000 is replaced with a sound detection device such as a microphone. By using a device that can identify the direction of arrival of sound, such as an array microphone, as the sound detection device, it is possible to more accurately associate the device that generates the sound to be detected with the sound signal.

Note that communication device A1000, A2000 according to this embodiment may include a plurality of radio devices. For example, communication device A1000, A2000 may include a plurality of radio devices that support communication schemes stipulated by mutually different standards, and may include a plurality of radio devices that support the same communication scheme.

Moreover, when communication device A1000, A2000 according to this embodiment is embodied as a vehicle or a communication device provided in a vehicle, light receiving device A1002 may be a camera such as a camera included in a drive recorder, a vehicle backup camera, a camera for checking the surroundings of the vehicle, or a camera used to project an image on a monitor in place of the side view mirrors. In this way, by receiving optical signals using a camera provided for purposes other than optical communication, it is possible to achieve the communication control disclosed in this embodiment without having to add a new camera, which reduces costs and encourages the broad usage of the function of receiving optical signals. Moreover, since this camera is installed such that a region from which information required by the driver, that is to say, information important in operating the vehicle, is captured, by collecting more information by combining signal processing such as image recognition with radio communication, it is possible to facilitate the provision of appropriate automated driving control and the provision of information to the driver.

The present disclosure describes an aspect of a method and device that use sensing data obtained from a sensor such as an image sensor or microphone to demodulate a transmission signal transmitted using a communication scheme that enables reception by such a sensor.

In the above aspect, by further including an aspect of performing signal processing including pattern recognition such as image recognition on the sensing data obtained by the sensor, it is possible to determine correspondence between a target object in a real space detected or recognized from the sensing data and the transmission source of the transmission signal.

In the above aspect, by further including an aspect of transmitting information such as the SSID, address, or an identifier to be used in processing over a network including communication, it is possible to easily associate the information to be used in processing over a network including communication with a target object in a real space. In other words, conventionally, information to be used in processing over a network in which association with a target object in a real space was difficult can be used based on sensing data obtained from the real space.

In the above aspect, by further including an aspect of using an image sensor as a sensor and transmitting, in an optical signal, information to be used in processing over a network including communication, it is possible to improve the reliability of the association between a visible target object and the information to be used in processing over a network including communication.

In the above aspect, by further including an aspect of transmitting an identifier to be used in transmission such as an SSID or address in an optical signal and selecting an identifier of a target to connect to via communication based on the result of image recognition signal processing, it is possible to perform communication control based the positional relationship of the target object in the real space and based on attributes of the target object, possible to perform communication by specifying the target object desired to be connected to, and possible to obtain information and make control instructions. As a result, for example, it is possible to provide a means for realizing communication with an appropriate communication partner in an environment in which an unspecified number of devices are within communication range, and encourages the creation and broad usage of new communication-based services.

This concludes the description of Embodiment 8 according to the present disclosure.

Figure 52:
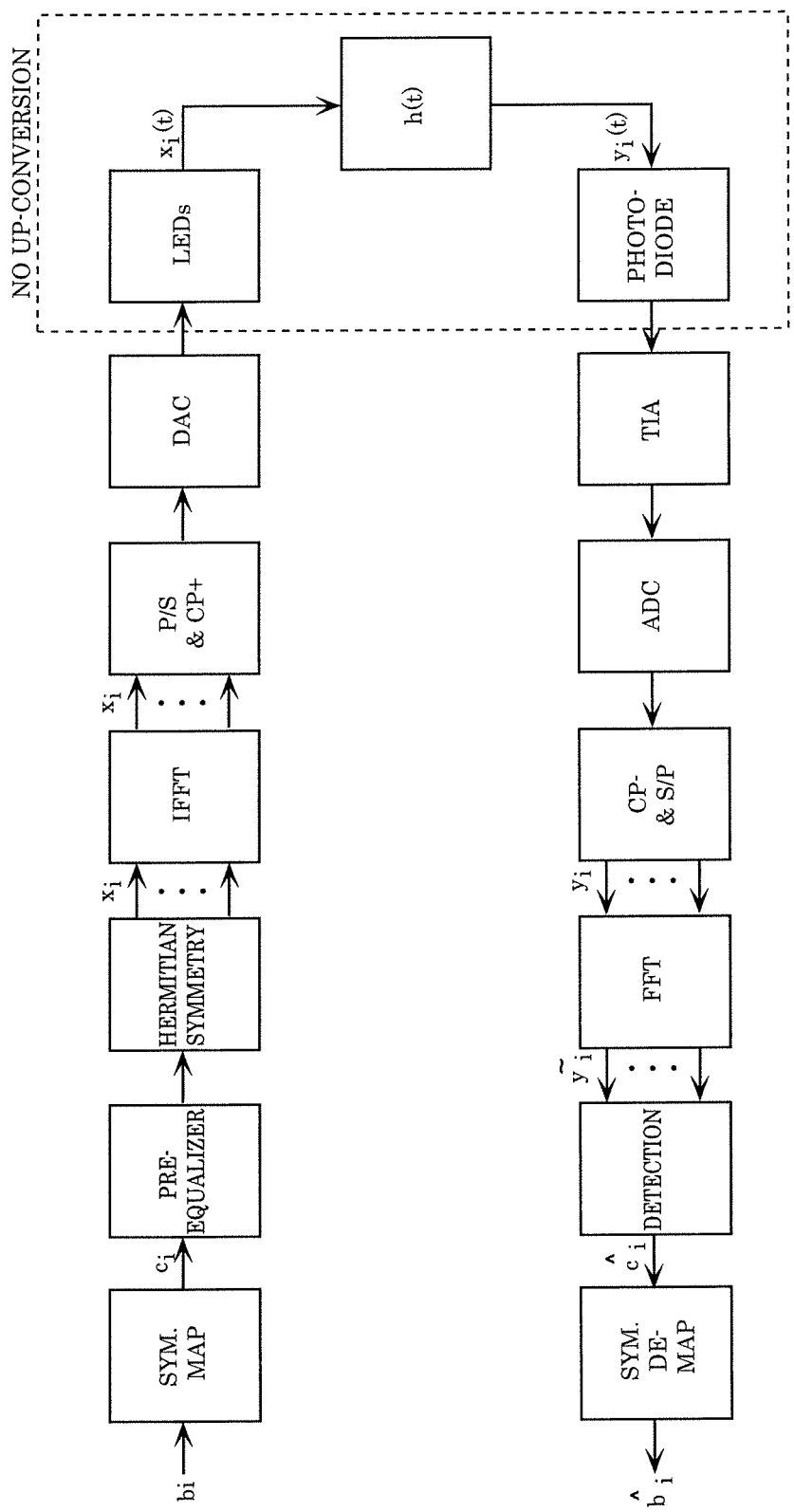
FIG. 52 illustrates a configuration example of another communication system that performs optical communication.

Note that the configuration illustrated in FIG. 5 was presented as one example of a communication system that performs visible light communication, but the configuration of the communication system that performs visible light communication is not limited to the configuration illustrated in FIG. 5. For example, a configuration like that illustrated in FIG. 52 (see, for example, "IEEE 802.11-16/1499r1") is acceptable. In FIG. 52, the transmission signal is transmitted as an optical signal in a baseband bandwidth without being up-converted. In other words, a device that transmits the optical signal according to this embodiment (i.e., a device including a light source) may have the configuration illustrated on the transmission-side in FIG. 52, and a terminal that receives the optical signal according to this embodiment may have the configuration illustrated on the reception-side in FIG. 52.

Embodiment 9

In this embodiment, additional information pertaining to FIG. 52 will be given.

FIG. 52 will be described in more detail. The symbol mapper receives an input of transmission data, performs mapping based on a modulation scheme, and outputs a symbol sequence (ci).

The pre-equalizer receives an input of the symbol sequence, performs pre-equalizing processing on the symbol sequence to reduce the equalizing processes on the reception-side, and outputs a pre-equalized symbol sequence.

The Hermitian symmetry processor receives an input of the pre-equalized symbol sequence, allocates sub-carriers to the pre-equalized symbol sequence to secure Hermitian symmetry, and outputs parallel signals.

The inverse (fast) Fourier transformer receives inputs of the parallel signals, applies an inverse (fast) Fourier transform to the parallel signals, and outputs inverse (fast) Fourier transformed signals.

The parallel serial and cyclic prefix adder receives an input of the inverse (fast) Fourier transformed signals, performs parallel conversion and adds cyclic prefix, and outputs the signal-processed signal.

The digital-to-analog converter receives an input of the signal-processed signal, performs digital-to-analog conversion, outputs an analog signal, and the analog signal is emitted as light from, for example, one or more LEDs.

Note that the pre-equalizer and the Hermitian symmetry processor need not be included. In other words, there may be instances in which the pre-equalizer and the Hermitian symmetry processor do not perform their respective signal processing.

The photodiode receives an input of light, and obtains a reception signal via a transimpedance amplifier (TIA).

The analog-to-digital converter performs an analog-to-digital conversion on the reception signal, and outputs a digital signal.

The cyclic prefix subtractor and serial parallel converter receives an input of the digital signal, subtracts the cyclic prefix, and then performs serial parallel conversion, and receives an input of parallel signals.

The (fast) Fourier transformer receives inputs of the parallel signals, applies a (fast) Fourier transform to the parallel signals, and outputs (fast) Fourier transformed signals.

The detector receives inputs of the (fast) Fourier transformed signals, performs detection, and outputs a series of reception symbols.

The symbol demapper receives an input of the series of reception symbols, performs demapping, and obtains a series of reception data.

In this way, even when such a transmission device that transmits the modulated optical signals and such a reception device that receives the modulated optical signals are applied to the amendments according to the present specification, the embodiments can be implemented in the same manner.

Embodiment 10

In Embodiment 8, an example in which the transmission device transmits a plurality of modulated optical signals and the reception device receives the plurality of modulated optical signals was given with reference to FIG. 42. In this embodiment, an implementation example in such a case will be given.

Figure 53:
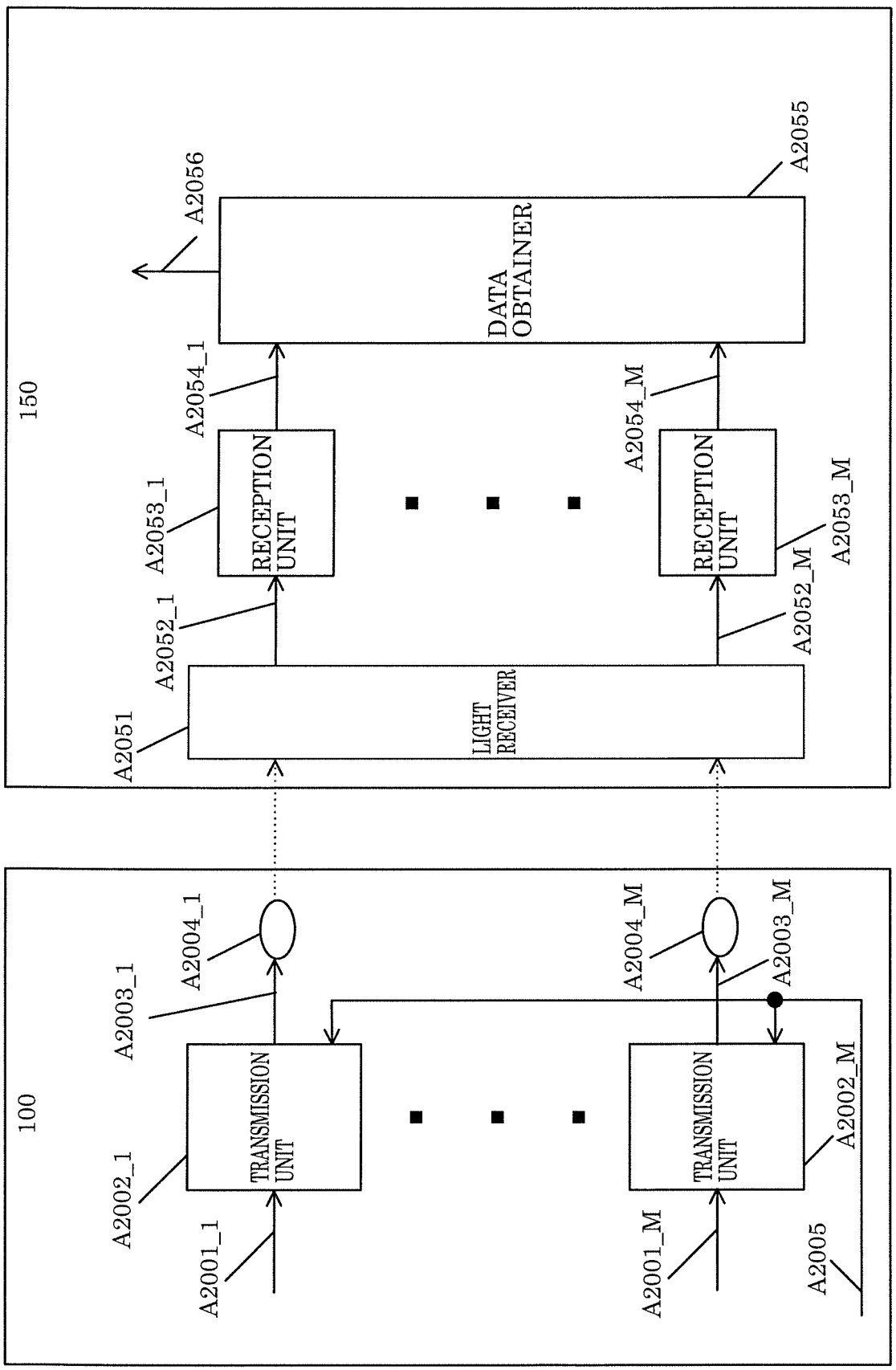
FIG. 53 illustrates configuration examples of a transmission device and a reception device according to Embodiment 10.

FIG. 53 illustrates an example of configurations of a transmission device and a reception device according to this embodiment. In FIG. 53, transmission device 100 transmits a plurality of modulated optical signals, and reception device 150 receives a plurality of modulated optical signals to receive reception data. Note that in FIG. 53, configurations that operate in the same manner as FIG. 6 share like reference signs.

The transmission device in FIG. 53 transmits M modulated optical signals. Note that M is an integer greater than or equal to two.

Transmission unit A2002_i receives inputs of data A2001_i and control signal A2005, and based on information related to the error correction encoding method and information related to the transmission method included in control signal A2005, implements error correction encoding and implements signal processing based on the transmission method to generate and output modulated optical signal A2003_i. Note that i is an integer greater than or equal to one and less than or equal to M.

Modulated optical signal A2003_i is then transmitted from light source A2004_i.

Light receiver A2051, one example of which is an image sensor, receives light corresponding to modulated optical signal A2003_i. Here, light receiver A2051 receives light corresponding to the M modulated optical signals. The method of receiving the plurality of optical reception signals used in light receiver A2051 is, for example, as described in Embodiment 8.

Light receiver A2051 outputs optical reception signal A2052_i corresponding to modulated optical signal 2003_i. Note that i is an integer greater than or equal to one and less than or equal to M.

Reception unit A2053_i receives an input of optical reception signal A2052_i corresponding to modulated optical signal A2003_i, performs processing such as demodulation and error correction decoding, and outputs reception data A2054_i corresponding to data A2001_i.

Data obtainer A2055 receives inputs of data A2054_1, data A2054_2, . . . , and data A2054_M, and generates and outputs data A2056.

Figure 54:
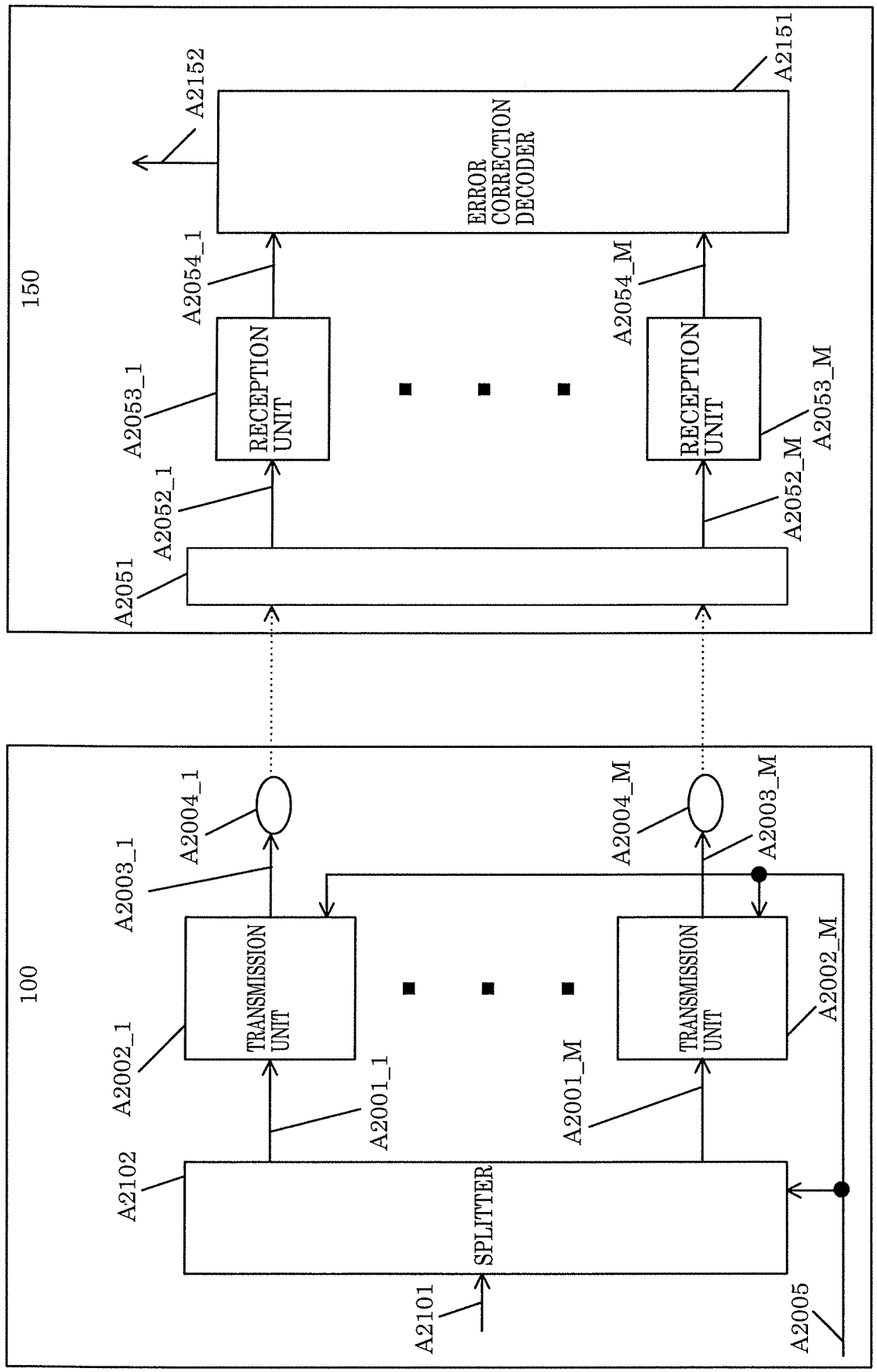
FIG. 54 illustrates configuration examples of the transmission device and the reception device according to Embodiment 10.

FIG. 54 illustrates an example of configurations of a transmission device and a reception device according to this embodiment, which differ from FIG. 53. Note that in FIG. 54, configurations that operate in the same manner as FIG. 53 share like reference signs.

Splitter A2102 receives inputs of information A2101 and control signal A2005, and based on information related to the error correction encoding method included in control signal A2005, performs error correction encoding on information A2101 to generate error correction encoded data. Splitter A2102 then splits the error correction encoded data and outputs error correction encoded data A2001_i.

Note that the splitting of the data into M items of error correction encoded data A2001_i may be performed using any method. For example, the error correction encoded data may be split into M items and a data sequence of the split M items of data may be allocated as the M items of error correction encoded data A2001_i. Moreover, M data sequences configured of the same data may be generated based on the error correction encoded data, and the data sequences may be allocated as the items of error correction encoded data A2001_i. The method of allocating the error correction encoded data A2001_i is not limited to these examples, any method may be used so long as M data sequences are generated from the error correction encoded data, and the data sequences are allocated as the items of error correction encoded data A2001_j.

Transmission unit A2002_i receives inputs of data A2001_i and control signal A2005, and based on information related to the transmission method included in control signal A2005, implements signal processing based on the transmission method to generate and output modulated optical signal A2003_i. Note that i is an integer greater than or equal to one and less than or equal to M.

Modulated optical signal A2003_i is then transmitted from light source A2004_i.

Light receiver A2051, one example of which is an image sensor, receives light corresponding to modulated optical signal A2003_i. Here, light receiver A2051 receives light corresponding to the M modulated optical signals. The method of receiving the plurality of light reception signals used in light receiver A2051 is, for example, as described in Embodiment 8.

Light receiver A2051 outputs optical reception signal A2052_i corresponding to modulated optical signal 2003_i. Note that i is an integer greater than or equal to one and less than or equal to M.

Reception unit A2053_i receives an input of optical reception signal A2052_i corresponding to modulated optical signal A2003_i, performs processing such as demodulation, and outputs (the log-likelihood ratio of) reception data 2054_i corresponding to data A2001_i.

Error correction decoder A2151 receives inputs of (the log-likelihood ratio of) reception data 2054_1, (the log-likelihood ratio of) reception data 2054_2, . . . , and (the log-likelihood ratio of) reception data 2054_M, performs error correction decoding, and outputs reception data A2152.

FIG. 55 illustrates one example of a frame configuration of a modulated optical signal transmitted by transmission device 100 illustrated in FIG. 53 and FIG. 54.

Frame configuration A2201_1 in FIG. 55 is one example of the frame configuration of modulated optical signal A2003_1 illustrated in FIG. 53 and FIG. 54. Note that in frame configuration A2201_1, time is represented on the horizontal axis.

Accordingly, frame configuration A2201_i in FIG. 55 is one example of the frame configuration of modulated optical signal A2003_i illustrated in FIG. 53 and FIG. 54. Note that in frame configuration A2201_i, time is represented on the horizontal axis. Note that i is an integer greater than or equal to one and less than or equal to M (in other words, in FIG. 55, M frame configurations are shown).

As illustrated in frame configuration A2201_i, transmission device 100 illustrated in FIG. 53 and FIG. 54 transmits, in modulated optical signal A2003_i, preamble A2210_i, control information symbol A2211_i, and data symbol A2212_i.

Figure 56:
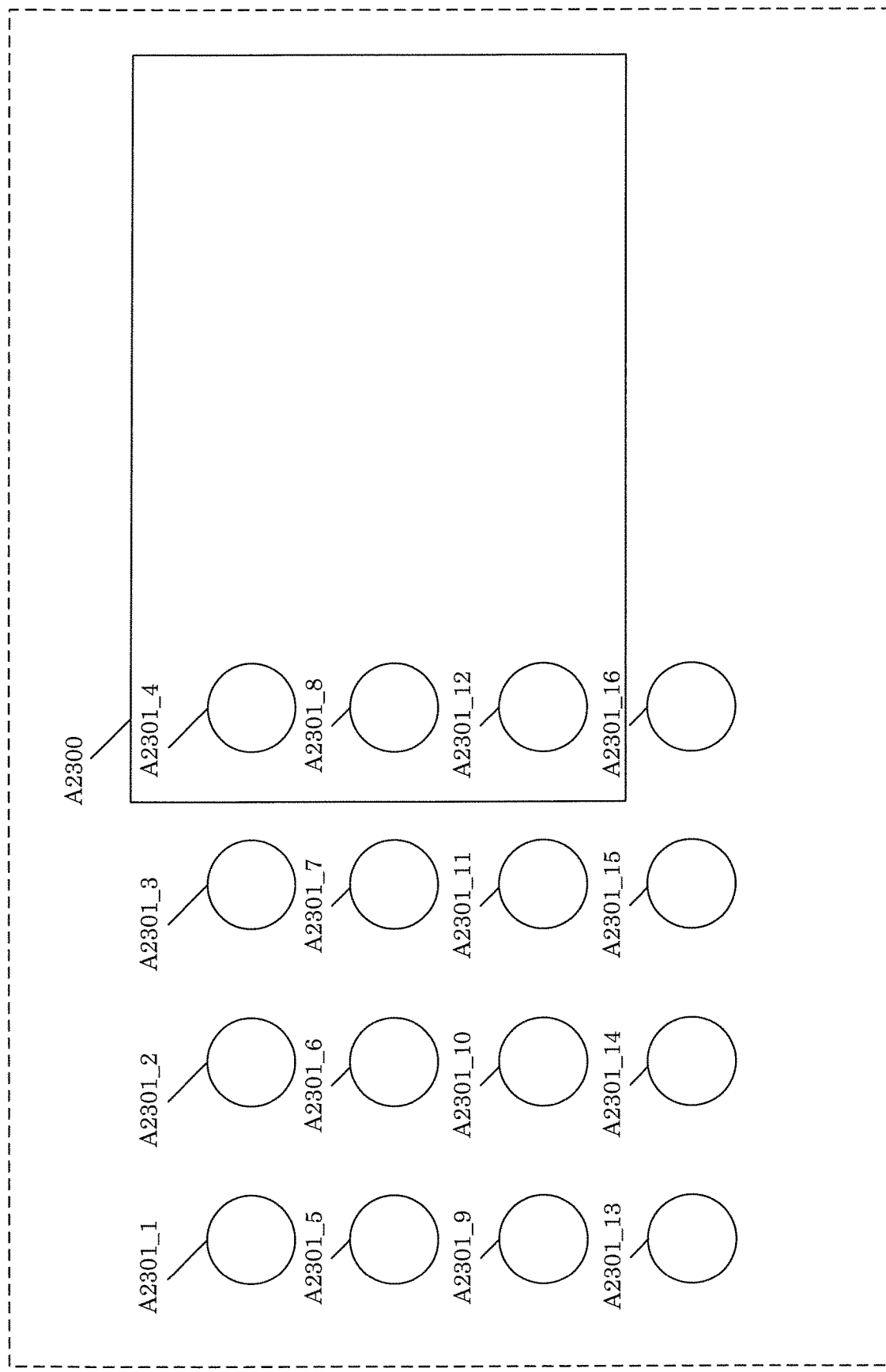
FIG. 56 illustrates one example of a reception state in the reception device according to Embodiment 10.

FIG. 56 illustrates one example of a reception state in reception device 150. Note that in the following example, transmission device 100 illustrated in FIG. 53 and FIG. 54 includes 16 (M=16) light sources.

In FIG. 56, A2300 indicates an image sensor, which is one example of the light receiver, A2301_1 indicates light emitted by a first light source, and this light includes a first modulated optical signal. Note that the first modulated optical signal corresponds to A2201_1 in FIG. 55.

Accordingly, in FIG. 56, A2301_i indicates light emitted by an i-th light source, and this light includes an i-th modulated optical signal. Note that the i-th modulated optical signal corresponds to A2201_i in FIG. 55. Note that i is an integer greater than or equal to one and less than or equal to 16.

In the example of the reception state in reception device 150 illustrated in FIG. 56, the light receiver in reception device 150 receives light from a fourth light source that includes a fourth modulated optical signal, receives light from an eighth light source that includes an eighth modulated optical signal, and receives light from a twelfth light source that includes a twelfth modulated optical signal.

For example, assuming transmission device 100 illustrated in FIG. 53 and/or FIG. 54 transmits 16 modulated optical signals from the 16 light sources, in the state illustrated in FIG. 56, since reception device 150 illustrated in FIG. 53 and/or FIG. 54 cannot receive all 16 of the modulated optical signals, it is difficult to obtain correct reception data in this state. A method for overcoming this problem will be described hereinafter.

Figure 57:
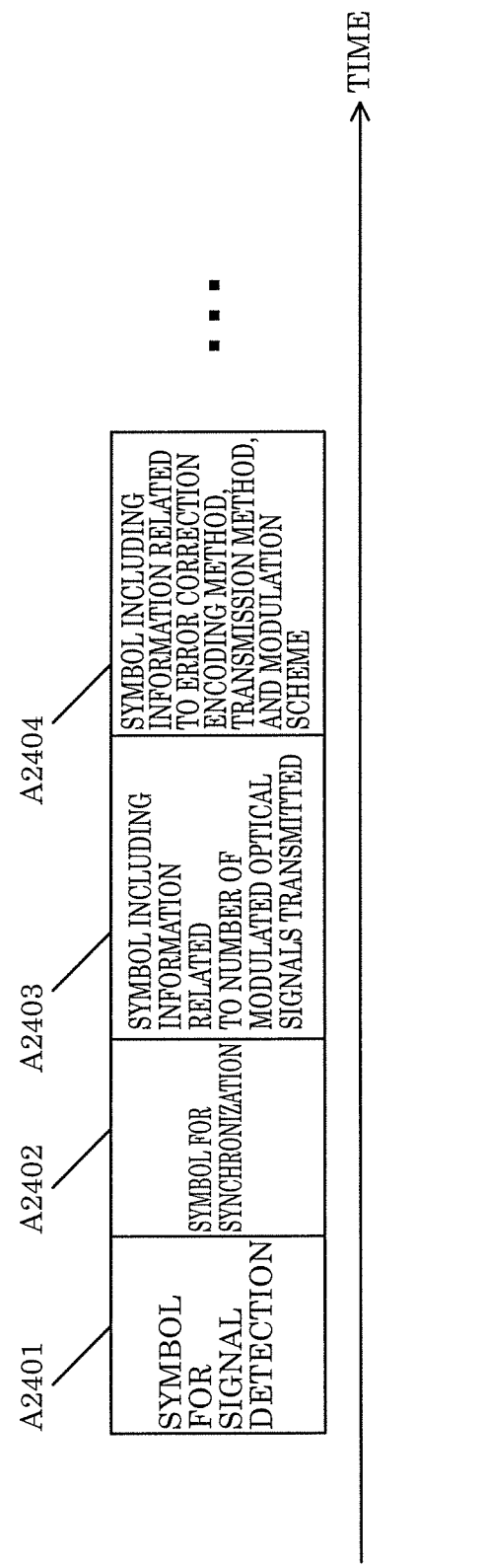
FIG. 57 illustrates one example of a configuration of symbols according to Embodiment 10.

FIG. 57 illustrates one example of a configuration of information included in preamble A2210_i and control information symbol A2211_i in frame configuration A2201_i of modulated optical signal A2003_i illustrated in FIG. 55, and the symbol configuration thereof. Note that i is an integer greater than or equal to one and less than or equal to M (M=16).

Preamble A2210_i and control information symbol A2211_i in frame configuration A2201_i include, as illustrated in FIG. 57, symbol A2401 for signal detection, symbol A2402 for synchronization, symbol A2403 including information related to the number of modulated optical signals transmitted, symbol A2404 including information related to the error correction encoding method, transmission method, and modulation scheme.

Symbol A2401 for signal detection is a symbol for notifying reception device 150 of the existence of the modulated optical signal, and by detecting this symbol, reception device 150 knows that the modulated optical signal exists.

Symbol A2402 for synchronization is a symbol for reception device 150 to perform time synchronization (may include frequency synchronization), and by using this symbol, reception device 150 can perform time synchronization and accurately demodulate the symbols.

Symbol A2403 including information related to the number of modulated optical signals transmitted is a symbol for notifying of the number of modulated optical signals transmitted by transmission device 100, and in the state illustrated in FIG. 56, symbol A2403 including information related to the number of modulated optical signals transmitted transmits information indicating "16".

In the reception state illustrated in FIG. 56, reception device 150 receives symbol A2403 including information related to the number of modulated optical signals transmitted, and thus knows that the number of modulated optical signals transmitted by transmission device 100 is 16. Note that in the case of the reception state illustrated in FIG. 56, reception device 150 knows that it has only received three of the 16 modulated optical signals.

Symbol A2404 including information related to the error correction encoding method, transmission method, and modulation scheme is, for example, a symbol including information on the error correction encoding method, transmission method, and modulation scheme used in the data symbol (symbol for transmitting data) in modulated optical signal A2003_i, and by receiving this symbol, reception device 150 can know the error correction encoding method, transmission method, and modulation scheme used in modulated optical signal A2003_i.

In the case of the frame configuration illustrated in FIG. 55, in modulated optical signal A2003_1 through modulated optical signal A2003_16, the symbols in FIG. 57 are transmitted by transmission device 100. As a result, even when reception device 150 cannot receive all of the modulated optical signals, like illustrated in FIG. 56, it is possible to know the number of modulated optical signals transmitted by transmission device 100, and thus reception device 150 can know whether all modulated optical signals have been received or not. When not all of the modulated optical signals have been received, signal processing can be cancelled midway, which achieves the advantageous effect that unnecessary power consumption can be reduced.

Figure 58:
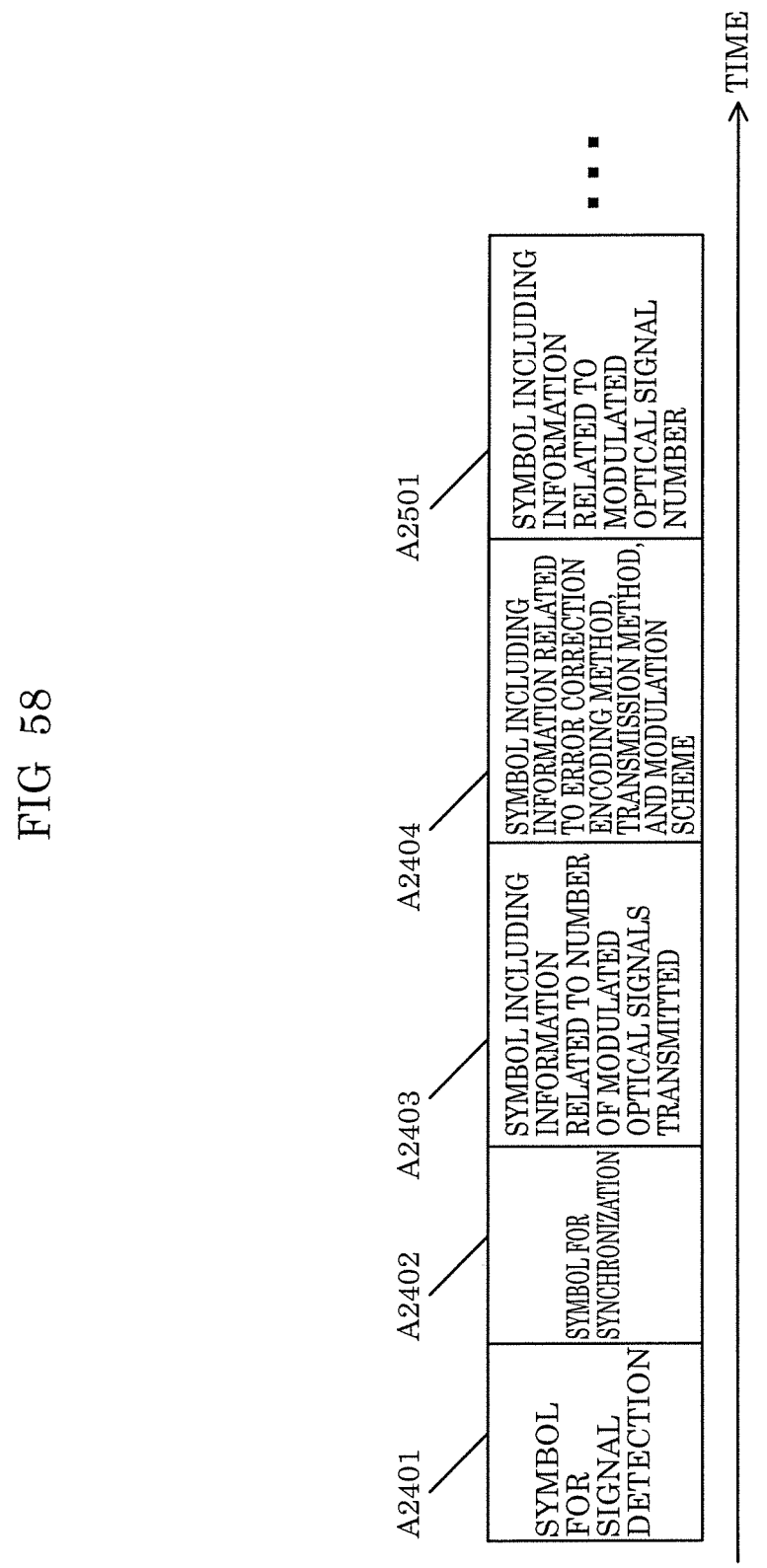
FIG. 58 illustrates another example of a configuration of symbols according to Embodiment 10.

FIG. 58 illustrates one example, which differs from the example illustrated in FIG. 57, of a configuration of information included in preamble A2210_i and control information symbol A2211_i in frame configuration A2201_i of modulated optical signal A2003_i illustrated in FIG. 55, and the symbol configuration thereof. Note that i is an integer greater than or equal to one and less than or equal to M (=16), and in FIG. 58, configurations that operate in the same manner as FIG. 57 share like reference signs. Accordingly, since those configurations have already been described, repeated description thereof will be omitted.

FIG. 58 differs from FIG. 57 in that symbol A2501 including information related to modulated optical signal number has been added to the symbols that transmission device 100 transmits.

Since FIG. 58 illustrates frame configuration A2201_i of modulated optical signal A2003_i in FIG. 55, that is to say, the frame configuration of the i-th modulated optical signal, symbol A2501 including information related to modulated optical signal number includes information indicating "i".

For example, symbol A2501 including information related to modulated optical signal number transmitted in the first modulated optical signal by transmission device 100 includes information indicating "1".

In the reception state illustrated in FIG. 56, reception device 150 receives symbol A2403 including information related to the number of modulated optical signals transmitted, and thus knows that the number of modulated optical signals transmitted by transmission device 100 is 16. Then, since reception device 150 receives symbol A2501 including information related to modulated optical signal number included in the fourth modulated optical signal, symbol A2501A including information related to modulated optical signal number included in the eighth modulated signal, and symbol A2501A including information related to modulated optical signal number included in the twelfth modulated signal, reception device 150 knows that the fourth modulated optical signal, the eighth modulated optical signal and the twelfth modulated optical signal have been received. As a result of knowing this situation, reception device 150 implements operations for improving the reception condition, and thus improves data reception quality. Note that these operations will be described in greater detail later.

Figure 59:
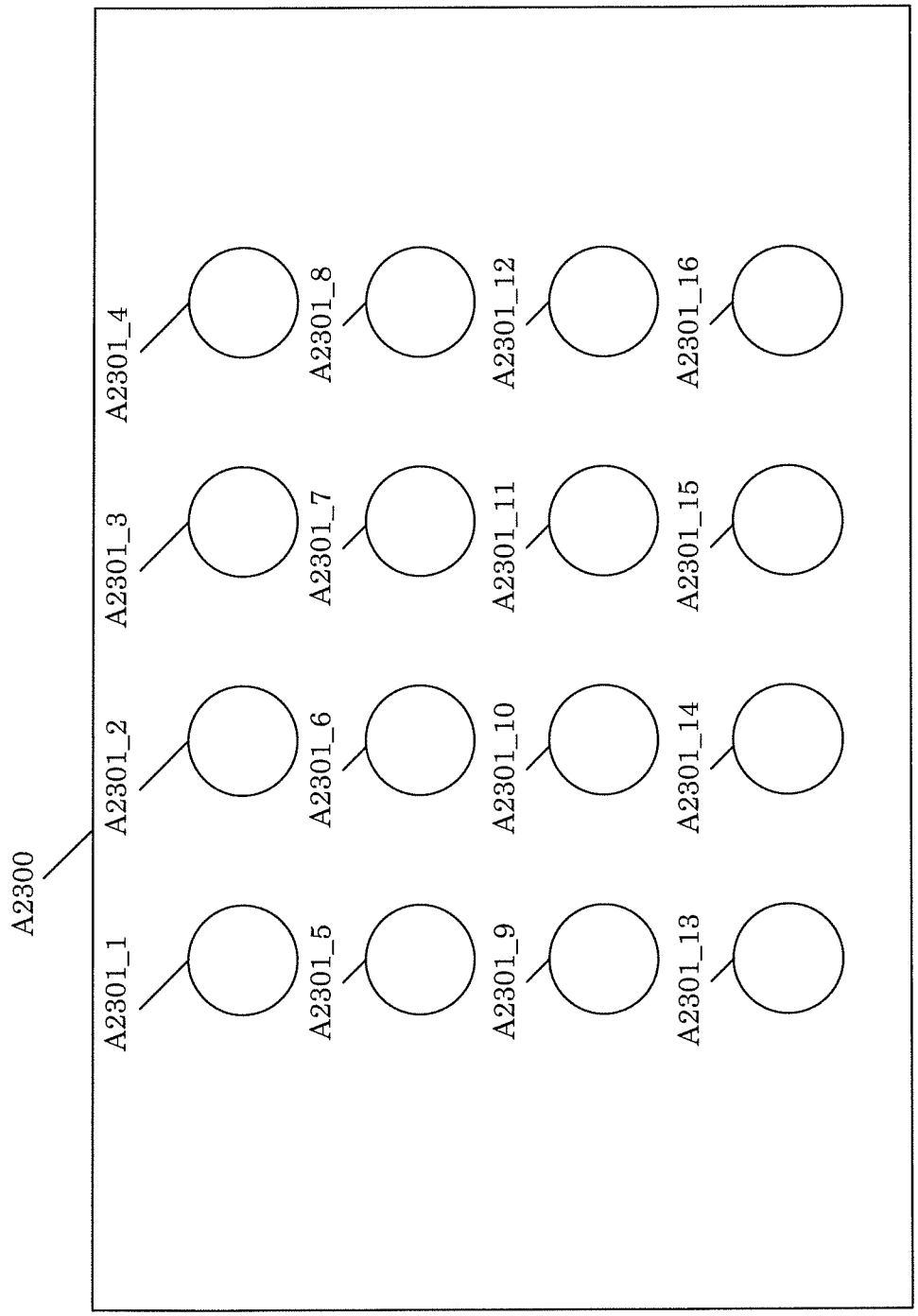
FIG. 59 illustrates another example of a reception state in the reception device according to Embodiment 10.
Figure 60:
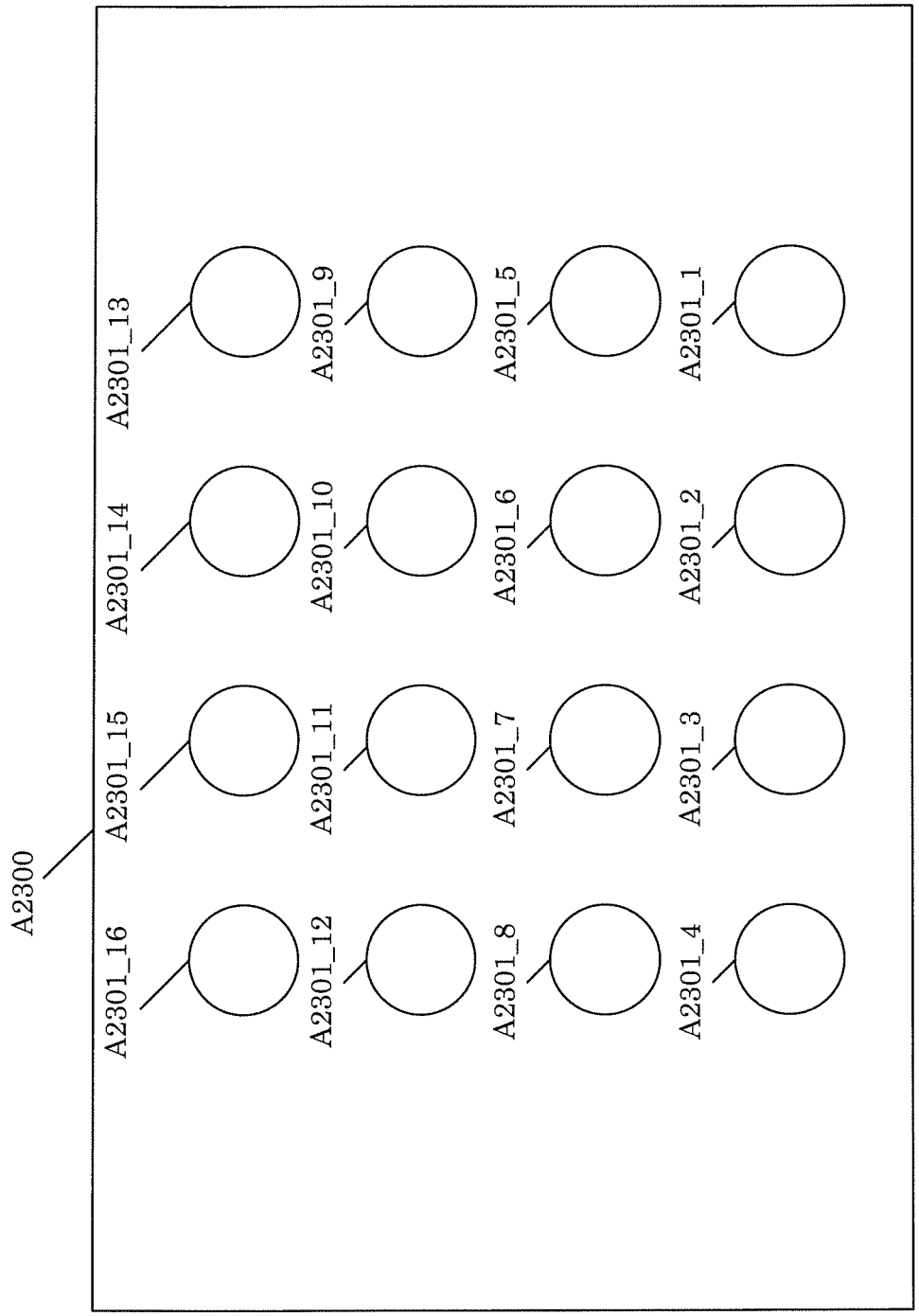
FIG. 60 illustrates another example of a reception state in the reception device according to Embodiment 10.

Other examples of reception states in reception device 150 are illustrated in FIG. 59 and FIG. 60. Note that in FIG. 59 and FIG. 60, configurations that operate in the same manner as FIG. 56 share like reference signs. Accordingly, since those configurations have already been described, repeated description thereof will be omitted.

In the example of the reception state in reception device 150 illustrated in FIG. 59, light receiver A2300 in reception device 150 receives light from a first light source that includes a first modulated optical signal through light from a sixteenth light source that includes a sixteenth modulated optical signal, that is to say, 16 modulated optical signals. In the example illustrated in FIG. 59, for example, the first modulated optical signal is received at the upper-left region of light receiver A2300.

In the example of the reception state in reception device 150 illustrated in FIG. 60, light receiver A2300 in reception device 150 receives light from a first light source that includes a first modulated optical signal through light from a sixteenth light source that includes a sixteenth modulated optical signal, that is to say, 16 modulated optical signals. In the example illustrated in FIG. 60, for example, the first modulated optical signal is received at the bottom-right region of light receiver A2300, which differs from the example in FIG. 59.

The reception states in FIG. 59 and FIG. 60 are merely examples; the situation in which reception device 150 receives the first modulated optical signal through sixteenth modulated optical signal differs depending on the environment. Taking this into consideration, since each modulated optical signal includes symbol A2501 including information related to modulated optical signal number, like in FIG. 58, reception device 150 can know which part of the light receiver will receive which modulated optical signal. Then, reception device 150 receives the i-th reception data obtained from the reception signal of the i-th modulated optical signal, and when the first through sixteenth reception data needs to be rearranged, since the reception data indicates which modulated optical signal it corresponds to, it is possible to distinguish this from symbol A2501 including information related to modulated optical signal number, whereby the reception data can be correctly rearranged, which improves data reception quality.

Next, a configuration method of a frame different from the example above will be described.

FIG. 55 illustrates one example of a frame configuration of a modulated optical signal transmitted by transmission device 100 illustrated in FIG. 53 and FIG. 54, and since this has already been described above, repeated description will be omitted.

Figure 61:
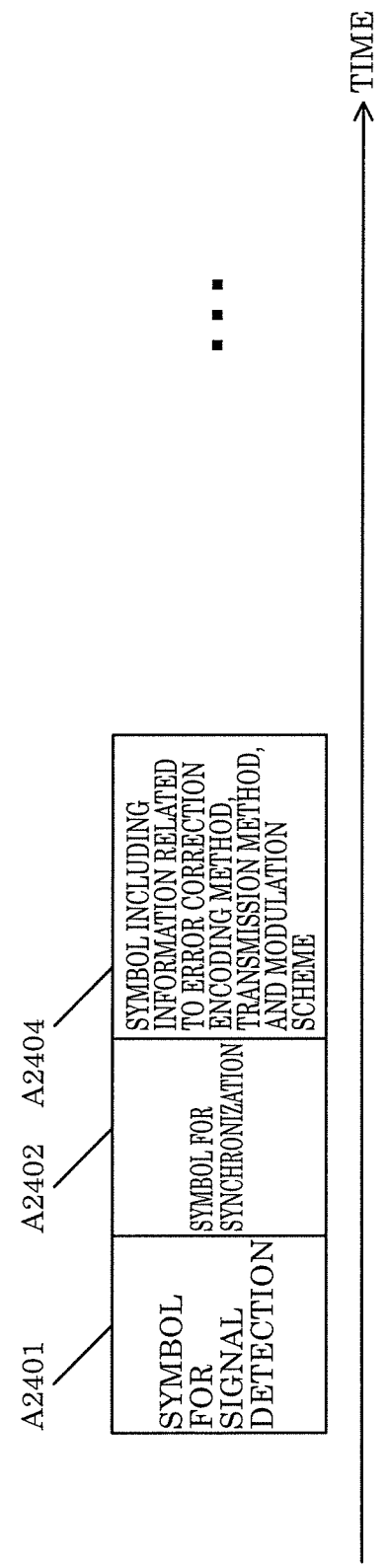
FIG. 61 illustrates another example of a configuration of symbols according to Embodiment 10.

For example, assume the configuration of the preamble and the control information symbol in frame configuration A2201_1 in modulated optical signal A2003_1 in FIG. 55 is as illustrated in FIG. 57, and the configuration of the preamble and the control information symbol in frame configuration A2201_2 in modulated optical signal A2003_2 through frame configuration A2201_16 in modulated optical signal A2003_16 is as illustrated in FIG. 61. Note that in FIG. 61, configurations that operate in the same manner as FIG. 57 share like reference signs. The characterizing feature of FIG. 61 is that symbol A2403 including information related to the number of modulated optical signals transmitted is not included. In other words, the characterizing feature is that transmission device 100 only transmits symbol A2403 including information related to the number of modulated optical signals transmitted in modulated optical signal A2003_1.

Here, when the reception state in reception device 150 is the state illustrated in FIG. 56, reception device 150 does not receive symbol A2403 including information related to the number of modulated optical signals transmitted, so reception device 150 cannot know the number of modulated optical signals transmitted by transmission device 100. Thus, reception device 150 determines that correctly receiving the data is difficult, stops the signal processing in the reception operations, and thus can reduce unnecessary power consumption.

Note that in the description of this example, transmission device 100 is described as transmitting symbol A2403 including information related to the number of modulated optical signals transmitted only in modulated optical signal A2003_1, but this example is not limiting. So long as transmission device 100 transmits symbol A2403 including information related to the number of modulated optical signals transmitted in one or more of the modulated optical signals from among modulated optical signals A2003_1 through A2003_16, the same advantageous effects as described above can be achieved.

Next, yet another example will be given.

FIG. 55 illustrates one example of a frame configuration of a modulated optical signal transmitted by transmission device 100 illustrated in FIG. 53 and FIG. 54, and since this has already been described above, repeated description will be omitted.

Figure 62:
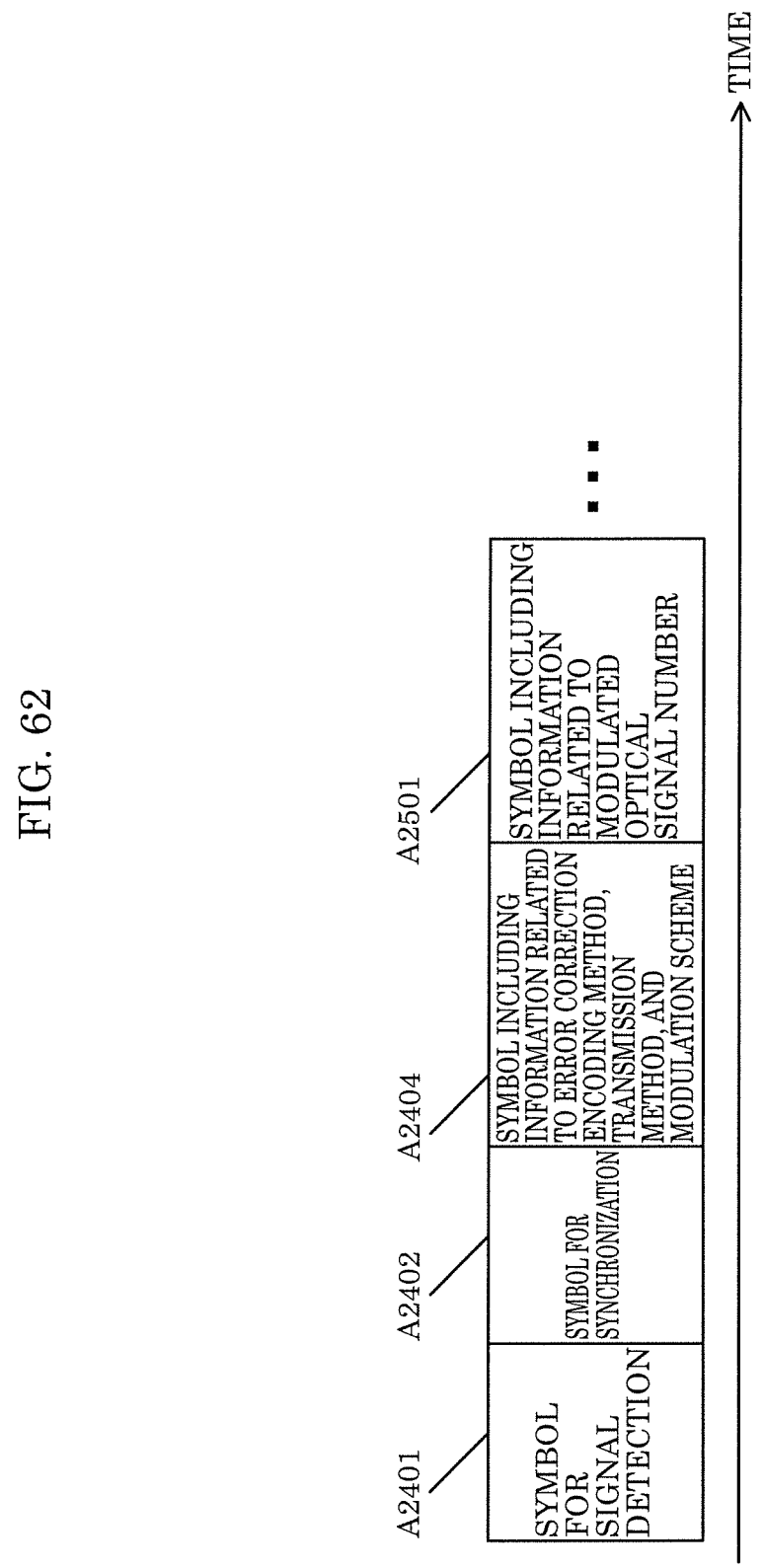
FIG. 62 illustrates another example of a configuration of symbols according to Embodiment 10.

For example, assume the configuration of the preamble and the control information symbol in frame configuration A2201_1 in modulated optical signal A2003_1 in FIG. 55 is as illustrated in FIG. 58, and the configuration of the preamble and the control information symbol in frame configuration A2201_2 in modulated optical signal A2003_2 through frame configuration A2201_16 in modulated optical signal A2003_16 is as illustrated in FIG. 62. Note that in FIG. 62, configurations that operate in the same manner as FIG. 57 and FIG. 58 share like reference signs. The characterizing feature of FIG. 62 is that symbol A2403 including information related to the number of modulated optical signals transmitted is not included. In other words, the characterizing feature is that transmission device 100 only transmits symbol A2403 including information related to the number of modulated optical signals transmitted in modulated optical signal A2003_1.

Here, when the reception state in reception device 150 is the state illustrated in FIG. 56, reception device 150 does not receive symbol A2403 including information related to the number of modulated optical signals transmitted, so reception device 150 cannot know the number of modulated optical signals transmitted by transmission device 100. Thus, reception device 150 determines that correctly receiving the data is difficult, stops the signal processing in the reception operations, and thus can reduce unnecessary power consumption.

Note that in the description of this example, transmission device 100 is described as transmitting symbol A2403 including information related to the number of modulated optical signals transmitted only in modulated optical signal A2003_1, but this example is not limiting. So long as transmission device 100 transmits symbol A2403 including information related to the number of modulated optical signals transmitted in one or more of the modulated optical signals from among modulated optical signals A2003_1 through A2003_16, the same advantageous effects as described above can be achieved.

In yet another example, transmission device 100 may transmit the preamble and the control information symbol in one or more of the modulated optical signals from among modulated optical signals A2003_1 through A2003_16.

As described above, when the transmission device transmits a plurality of modulated optical signals, as described in this embodiment, as a result of transmitting the modulated optical signals, advantageous effects whereby the reception device can achieve high data reception quality and can reduce power consumption can be achieved.

Note that in this embodiment, the number of modulated optical signals that the transmission device transmits is exemplified as, but not limited to, 16. For example, when the transmission device has a configuration like that of 100 illustrated in FIG. 53, the number of modulated optical signals transmitted may be changed depending on the time of transmission. For example, at a first time, 16 modulated optical signals may be transmitted, at a second time, eight modulated optical signals may be transmitted, and at a third time, one modulated optical signal may be transmitted. Moreover, in the case of this example, at the first time, information indicating 16 is transmitted in symbol A2404 including information related to the number of modulated optical signals transmitted, at the second time, information indicating eight is transmitted in symbol A2404 including information related to the number of modulated optical signals transmitted, and at the third time, information indicating one is transmitted in symbol A2404 including information related to the number of modulated optical signals transmitted.

Then, in this embodiment, the frame configuration was exemplified as the frame configuration illustrated in FIG. 55, but the frame configuration is not limited to this example; other symbols may be present in the frame. Moreover, the order in which the symbols are transmitted is not limited to the order illustrated in FIG. 55.

Furthermore, the configurations of the preamble and the control information symbol were exemplified as those illustrated in FIG. 57, FIG. 58, FIG. 61, and FIG. 62, but in each of these figures, one or more symbols may be omitted, or other symbols may be present. Operations can be performed in the same manner with such configurations. In other words, the configurations of the preamble and the control information symbol are not limited to the examples in FIG. 57, FIG. 58, FIG. 61, and FIG. 62. Moreover, the order in which symbols included in the preamble and the control information symbol is not limited to the examples in FIG. 57, FIG. 58, FIG. 61, and FIG. 62.

Embodiment 11

In this embodiment, an implementation method for improving data reception quality by reception device 150 when, for example, the reception state of reception device 150 is like the situation illustrated in FIG. 56 will be described.

Figure 63:
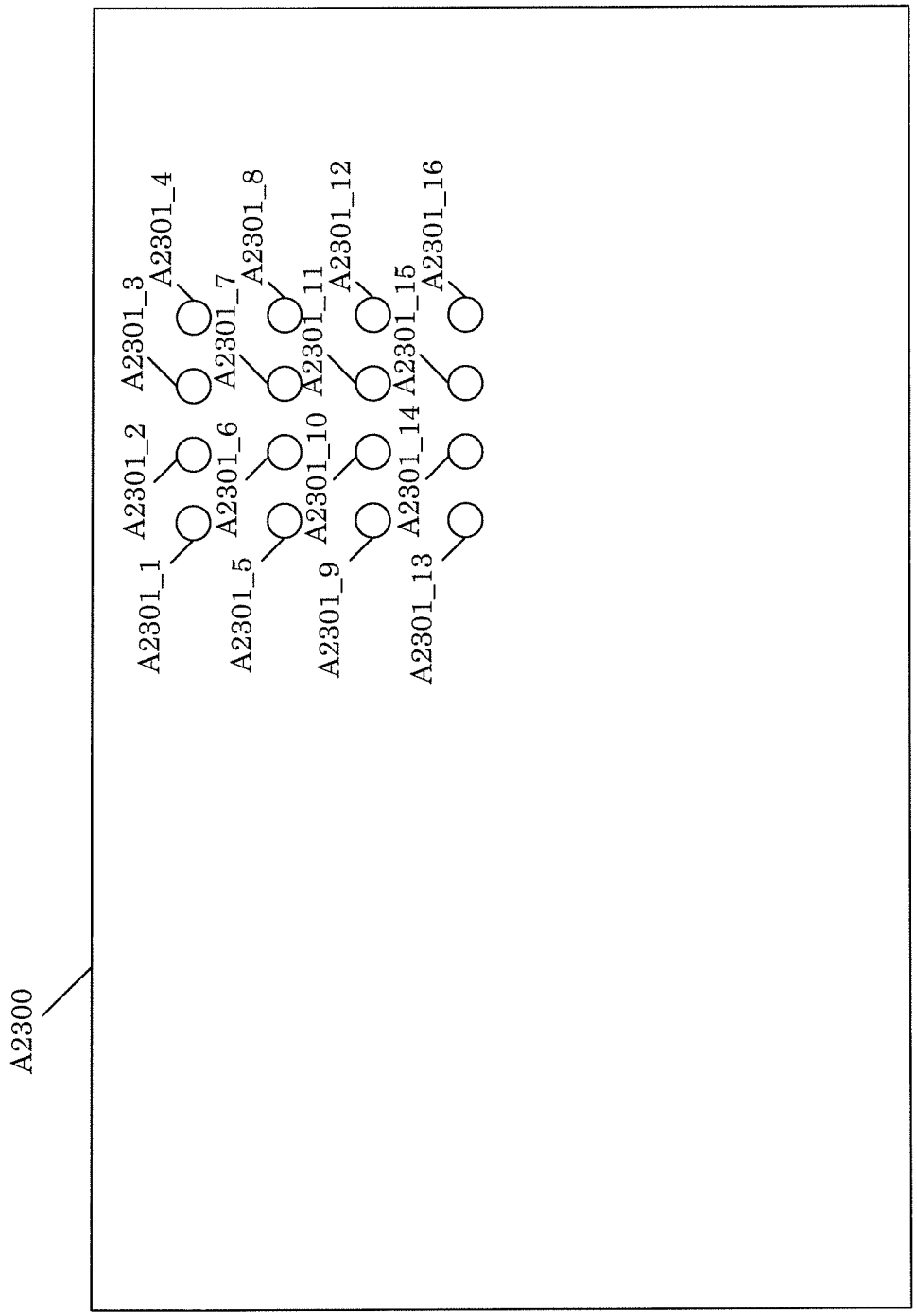
FIG. 63 illustrates another example of a configuration of symbols according to Embodiment 11.

As described in Embodiment 10, it is difficult for reception device 150 to correctly obtain reception data in a situation like that illustrated in FIG. 56, for example. Moreover, there are instances in which the reception state of reception device 150 is like that illustrated in FIG. 63. In FIG. 63, configurations that operate in the same manner as FIG. 56 share like reference signs.

In FIG. 63, since the surface area of the light emitted by each light source in the light receiver such as the image sensor is small, there is a problem that the data reception quality in reception device 150 decreases. Moreover, when line scanning is performed or line scan sampling is performed per region, reception device 150 may experience a significant reduction in data reception quality.

In this embodiment, an example of a configuration of reception device 150 that overcomes this problem will be given.

Transmission device 100 in FIG. 53 is one example of a configuration of the transmission device that transmits data. Note that since FIG. 53 has already been described, repeated description thereof will be omitted.

Figure 64:
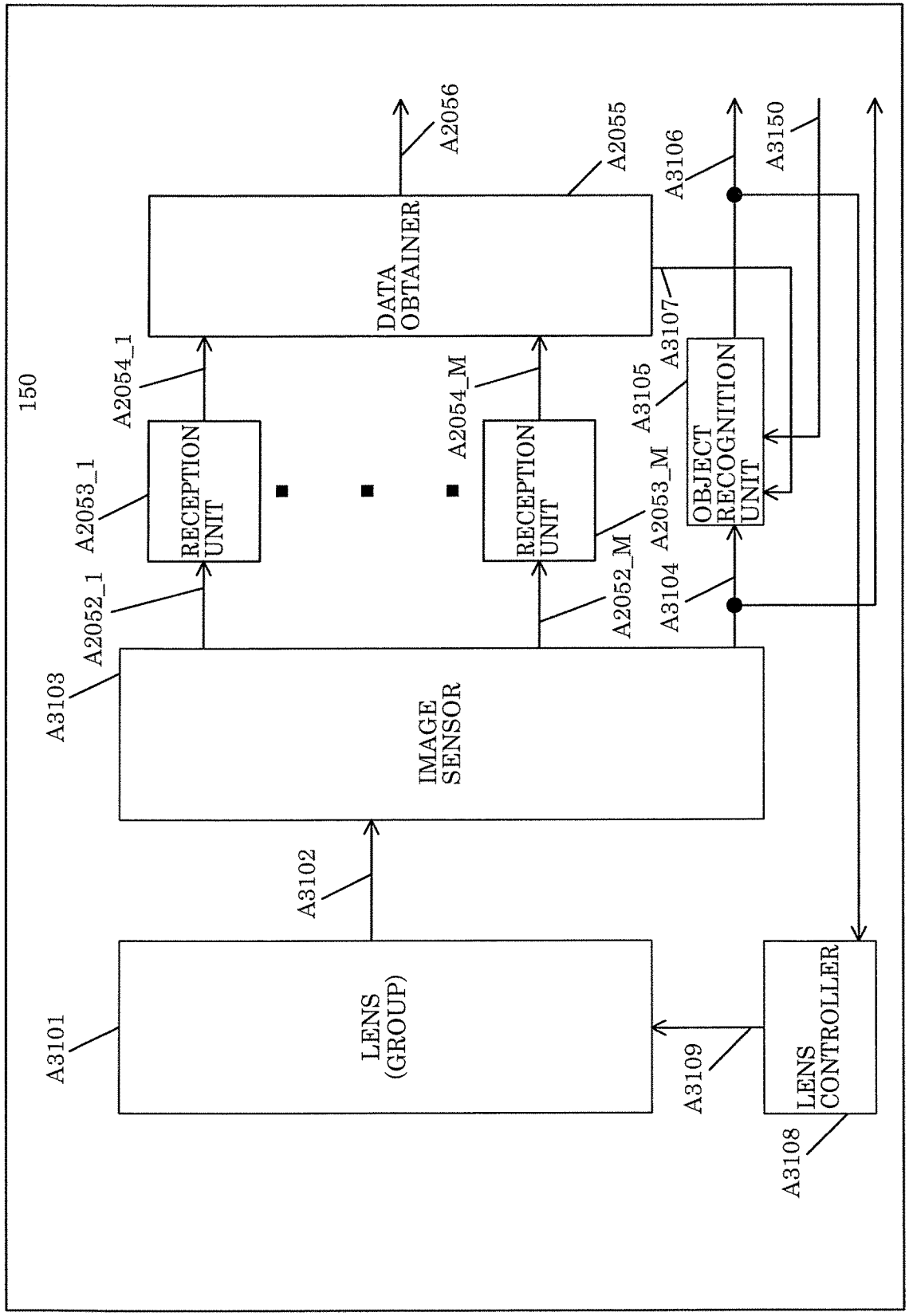
FIG. 64 illustrates one example of a configuration of a reception device according to Embodiment 11.

The configuration of reception device 150 that receives the modulated optical signal transmitted by transmission device 100 in FIG. 53 is illustrated in FIG. 64.

Another example of a configuration of the transmission device that transmits data that is different from the example of FIG. 53 is transmission device 100 illustrated in FIG. 54. Note that since FIG. 54 has already been described, repeated description thereof will be omitted.

Figure 65:
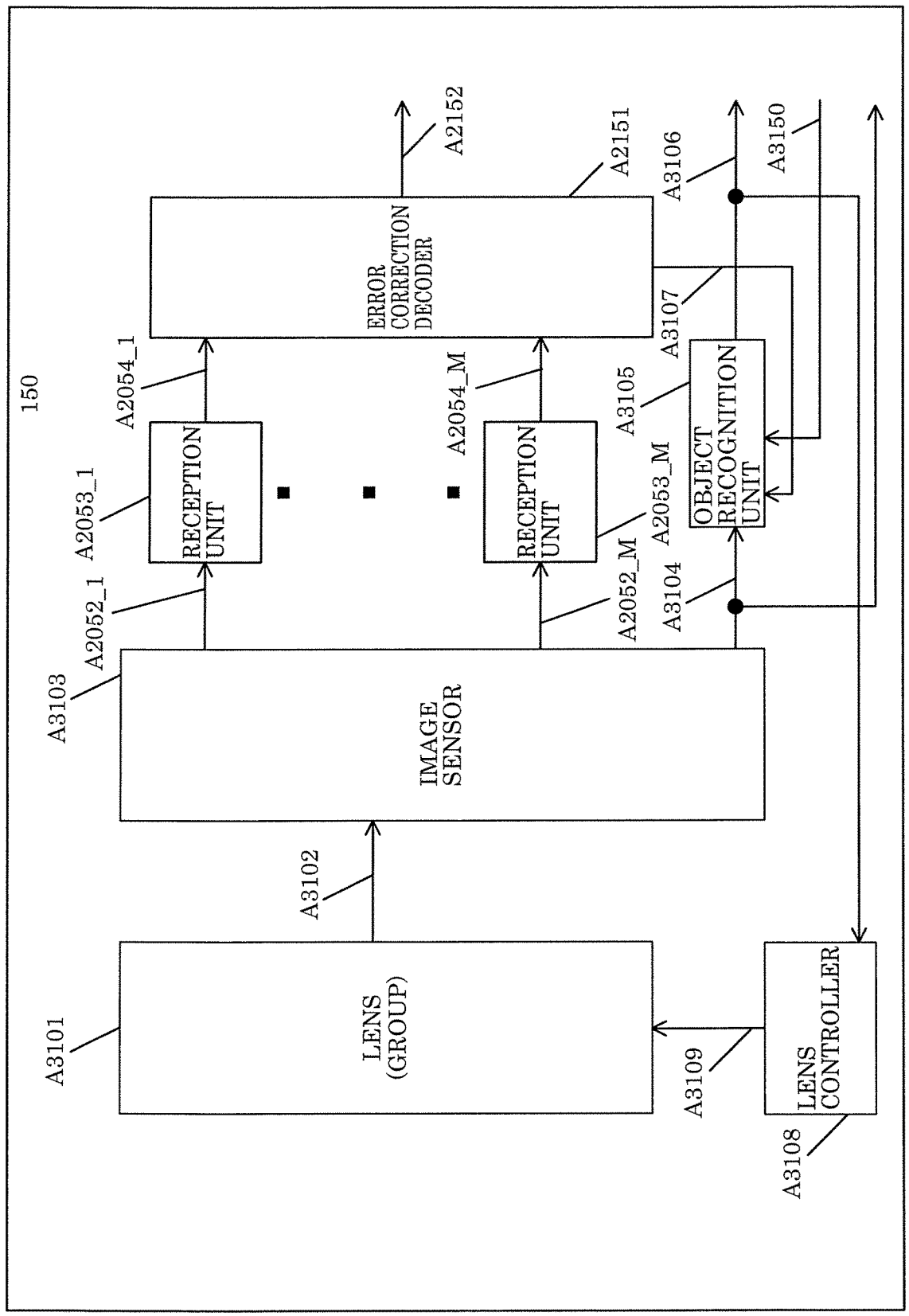
FIG. 65 illustrates another example of a configuration of the reception device according to Embodiment 11.

The configuration of reception device 150 that receives the modulated optical signal transmitted by transmission device 100 in FIG. 54 is illustrated in FIG. 65.

Hereinafter, reception device 150 illustrated in FIG. 64 and FIG. 65 will be described.

FIG. 64 illustrates one example of a configuration of reception device 150 that receives the modulated optical signal transmitted by transmission device 100 illustrated in FIG. 53, and configurations that operate the same as FIG. 53 share like reference signs.

Lens (group) A3101 receives an input of lens control signal A3109, and performs control such as focal length, aperture, and focus control.

Image sensor (light receiver) A3103 receives and input of light A3102 that has passed through the lens, and outputs optical reception signals A2052_1 through A2502_M and image signal A3104. Note that image signal A3104 may subsequently be subjected to signal processing and displayed as an image on an internal display, and may be displayed as an image on an external display via an interface.

Data obtainer A2055 receives inputs of reception data A2054_1 through A2054_M, and outputs data A2056 and reception state information A3107.

Reception state information A3107 may be, for example, the information related to the number of modulated optical signals transmitted obtained from symbol A2403 including information related to the number of modulated optical signals transmitted, which is transmitted by transmission device 100 described in Embodiment 10, or the information related to modulated optical signal number obtained from symbol A2501 including information related to modulated optical signal number transmitted by transmission device 100 described in Embodiment 10. Moreover, reception state information A3107 may be information indicating a reception state, generated from the information related to the number of modulated optical signals transmitted and/or the information related to modulated optical signal number. Note that these examples are not limiting.

Object recognition unit A3105 receives inputs of image signal A3104, reception state information A3107 and instruction signal A3150, and performs object recognition based on instruction signal A3150. For example, when instruction signal A3150 indicates "perform communication", object recognition unit A3105 starts modulated optical signal recognition. Here, object recognition unit A3105 receives inputs of image signal A3104 and reception state information A3107, and outputs object recognition signal A3106. These operations will be described in greater detail later.

Lens controller A3108 receives an input of object recognition signal A3106, recognizes a reception state, examples of which are illustrated in FIG. 56, FIG. 63, etc., and outputs control signal A3109 corresponding to control such as determining whether to perform lens control, and when performing lens control, determines the set value for focal length, the set value for aperture, and the setting for focus. In FIG. 64, lens controller A3108 is exemplified as receiving an input of object recognition signal A3106, but may receive inputs of other signals.

FIG. 65 illustrates one example of a configuration of reception device 150 that receives the modulated optical signal transmitted by transmission device 100 illustrated in FIG. 54, and configurations that operate the same as FIG. 53 and FIG. 54 share like reference signs. Note that since operations performed by lens (group) A3101, image sensor A3103, object recognition unit A3105, and lens controller A3108 have already been described, repeated description is omitted.

Error correction decoder A2155 receives inputs of reception data A2054_1 through A2054_M, and outputs data A2056 and reception state information A3107.

Next, a detailed example of a control method of lens (group) A3101 in FIG. 64 and FIG. 65 will be given.

As described in Embodiment 10, for example, when the reception state of reception device 150 is the state illustrated in FIG. 56, since the light receiver is not receiving light emitted by some of the light sources, it is difficult for reception device 150 to correctly receive the data. Moreover, as described above, when the reception state of reception device 150 is the state illustrated in FIG. 63, a problem arises in that the data reception quality of reception device 150 is poor.

However, when the reception state of reception device 150 is a state like one of those illustrated in FIG. 59 and FIG. 60, data reception quality is high.

From the above, when reception device 150 controls lens (group) A3101 so as to achieve a state like one of those illustrated in FIG. 59 and FIG. 60, data reception quality improves. The configurations of reception device 150 illustrated in FIG. 64 and FIG. 65 are examples of configurations for realizing this.

A detailed example of control of reception device 150 illustrated in FIG. 64 and FIG. 65 will be given.

Assume the reception state of reception device 150 is the state illustrated in, for example, FIG. 56. Here, since reception state information A3107 in FIG. 64 and FIG. 65 is information generated based on the information related to the number of modulated optical signals transmitted and the information related to modulated optical signal number, as described above, object recognition unit A3105 in FIG. 64 and FIG. 65 recognizes that three of the 16 modulated optical signals have been received.

Furthermore, object recognition unit A3105 recognizes, from image signal A3104, the reception state of the modulated optical signals, for example, which positions on the image sensor the three modulated optical signals are received at. In other words, object recognition unit A3105 performs object recognition as depicted in FIG. 56. Accordingly, object recognition unit A3105 recognizes the reception state of the modulated optical signals and that the 16 modulated optical signals have not been received. Furthermore in the case of this example, based on these recognition results, object recognition unit A3105 determines to perform lens control, and determines a suitable set value for focal length, a suitable set value for aperture, and a suitable setting for focus for realizing suitable communication, and outputs object recognition signal A3106 including this information. Note that it is sufficient if object recognition signal A3106 includes at least the suitable set value for focal length; object recognition signal A3106 need not include the suitable set value for aperture and the suitable setting for focus.

Lens controller A3108 receives an input of object recognition signal A3106, and based on, for example, the suitable set value for focal length, the suitable set value for aperture, and the suitable setting for focus included in object recognition signal A3106, outputs lens control signal A3109 for controlling lens (group) A3101.

By implementing this sequence of operations, reception device 150 illustrated in FIG. 64 and FIG. 65 can achieve a reception state such as those illustrated in FIG. 59 and FIG. 60, and thus achieve the advantageous effect that high data reception quality can be achieved.

Although the above example pertains to controlling the reception state of reception device 150 from the state illustrated in FIG. 56 to a state like one of those illustrated in FIG. 59 and FIG. 60, this example is not limiting. For example, the reception state of reception device 150 may be controlled from the state illustrated in FIG. 63 to a state like one of those illustrated in FIG. 59 and FIG. 60. However, these examples are not limiting.

Next, an example of control of reception device 150 illustrated in FIG. 66 and FIG. 67 that differs from FIG. 64 and FIG. 65 will be given.

Figure 66:
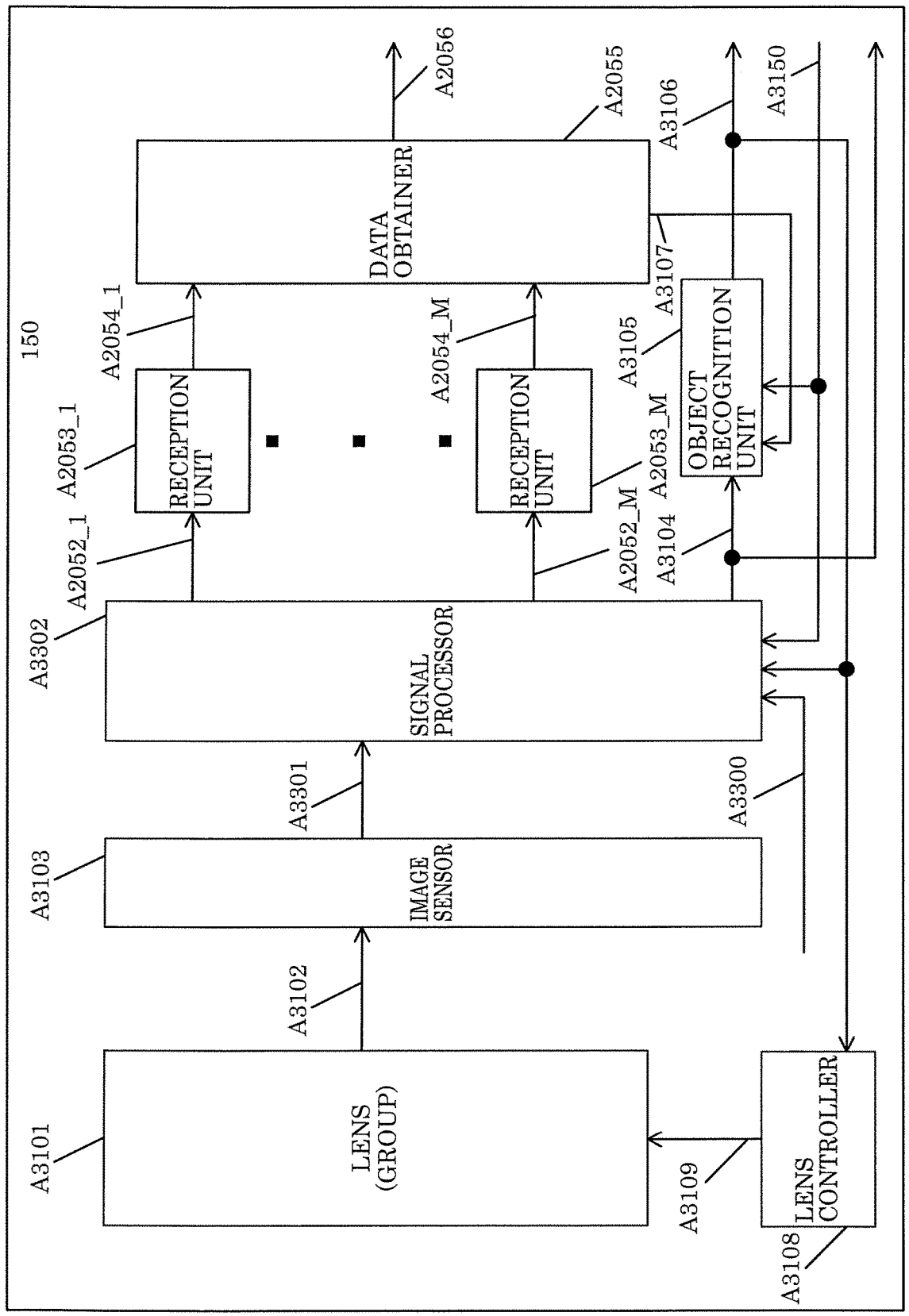
FIG. 66 illustrates another example of a configuration of the reception device according to Embodiment 11.

FIG. 66 illustrates one example of a configuration of reception device 150 that receives the modulated optical signal transmitted by transmission device 100 illustrated in FIG. 53, and configurations that operate the same as FIG. 64 share like reference signs. Repeated description of configurations that have already been described will be omitted.

Reception device 150 in FIG. 66 differs from reception device 150 in FIG. 64 in regard to the inclusion of signal processor A3302 disposed after image sensor A3103.

Here, assume signal processor A3302 includes at least a function for processing zoom (enlarging (and/or shrinking) an image).

Accordingly, signal processor A3302 receives inputs of image signal A3301, zoom signal A3300, object recognition signal A3106, and instruction signal A3150, and when instruction signal A3150 indicates "capturing mode (perform image capturing)", signal processor A3302 performs signal processing for zooming on image signal A3301 based on the zoom information (enlarging (and/or shrinking) an image) included in zoom signal A3300, and outputs signal-processed image signal A3104.

When instruction signal A3150 indicates "communication mode (perform communication)", signal processor A3302 performs signal processing for zooming on image signal A3301 based on the information included in object recognition signal A3106, such as the suitable set value for focal length, the suitable set value for aperture, and the suitable setting for focus, and outputs signal-processed image signal A3104 and signal-processed optical reception signals 2052_1 through A2052_M. With this, as described above, since the reception state is improved, the advantageous effect that data reception quality is improved can be achieved.

Note that since the method for improving the reception state used in lens controller A3108 has already been described, repeated description thereof will be omitted.

By implementing the above, reception device 150 can achieve the advantageous affect of an improvement in data reception quality since the reception state improves. In FIG. 66, when lens (group) A3101 does not include a function for changing the focal length, changing of the focal length to improve reception is not performed.

Figure 67:
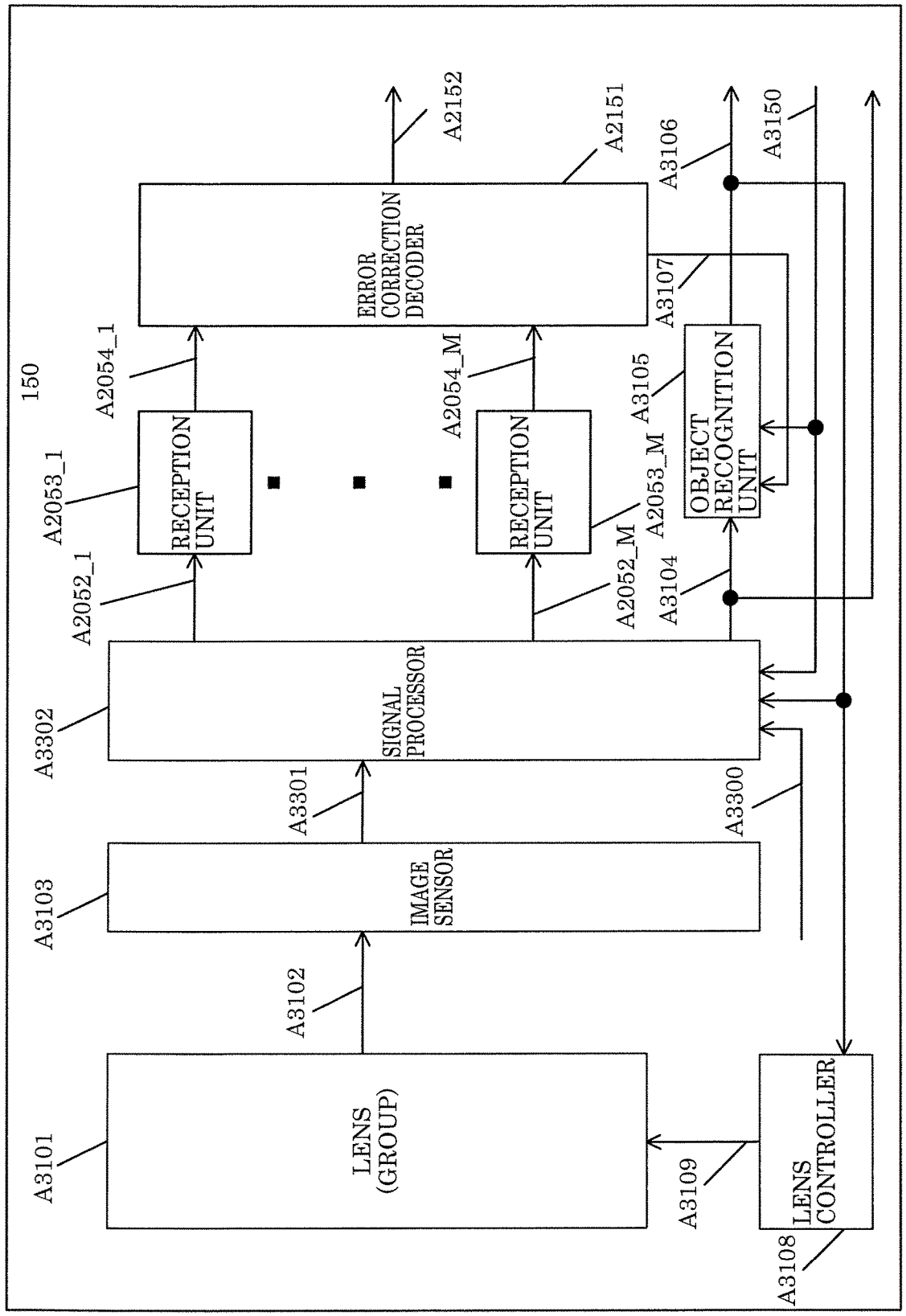
FIG. 67 illustrates another example of a configuration of the reception device according to Embodiment 11.

FIG. 67 illustrates one example of a configuration of reception device 150 that receives the modulated optical signal transmitted by transmission device 100 illustrated in FIG. 54, and configurations that operate the same as FIG. 65 share like reference signs. Repeated description of configurations that have already been described will be omitted.

Reception device 150 in FIG. 67 differs from reception device 150 in FIG. 65 in regard to the inclusion of signal processor A3302 disposed after image sensor A3103, like in FIG. 66.

Note that since operations performed by signal processor A3302 have already been described in detail, repeated description thereof will be omitted. Moreover, as already described, the advantageous affect of an improvement in data reception quality can be achieved since the reception state improves.

Note that since the method for improving the reception state used in lens controller A3108 has already been described, repeated description thereof will be omitted.

By implementing the above, reception device 150 can achieve the advantageous affect of an improvement in data reception quality since the reception state improves. In FIG.

67, when lens (group) A3101 does not include a function for changing the focal length, changing of the focal length to improve reception is not performed.

Note that in reception device 150 illustrated in FIG. 64, FIG. 65, FIG. 66, and FIG. 67, lens (group) A3101 can be set with a plurality of focal length values. For example, conceivable methods include that the focal length can be set in a range of from 12 mm to 35 mm, inclusive, and that the focal length can be set to 12 mm and 25 mm. The following description will be based on this example.

As a first example, consider a case in which a plurality of discrete focal length values are supported.

When reception device 150 in FIG. 64, FIG. 65, FIG. 66, and FIG. 67 is set to communication mode via instruction signal A3150, reception device 150 begins performing communication, and at this time, the focal length of lens (group) A3101 shall be set to, for example, the widest angle of 12 mm. Note that when the focal length is set to the widest angle, as in FIG. 56, it is highly probable that the reception state in which reception of a portion of the modulated optical signals is difficult can be avoided. With this, the advantageous effect that data reception quality can be improved can be achieved. However, in order to further improve data reception quality, the focal length, for example, may be controlled to a suitable value.

Note that in this example, focal lengths of 12 mm and 25 mm are supported, but even when two or more focal lengths are supported, setting, for example, the focal length to the widest angle upon starting communication is an effective method for improving data reception quality.

As a second example, consider a case in which a focal length can be consecutively (or minutely) set.

When reception device 150 in FIG. 64, FIG. 65, FIG. 66, and FIG. 67 is set to communication mode via instruction signal A3150, reception device 150 begins performing communication, and at this time, the focal length of lens (group) A3101 shall be set to, for example, the widest angle of 12 mm. Note that when the focal length is set to the widest angle, as in FIG. 56, it is highly probable that the reception state in which reception of a portion of the modulated optical signals is difficult can be avoided. With this, the advantageous effect that data reception quality can be improved can be achieved. However, in this example, since it is possible to minutely set the focal length, for example, even when the focal length is set to 14 mm, there is a high probability that the same advantageous effect can be achieved. However, in order to further improve data reception quality, the focal length, for example, may be controlled to a suitable value.

In reception device 150 in FIG. 66 and FIG. 67, assume signal processor A3302 includes a function for processing zoom (enlarging (and/or shrinking) an image). In this example, assume an image enlargement of 1X (image is not enlarged), and image enlargement of 2X, and an image enlargement of 4X are supported.

When reception device 150 in FIG. 66, and FIG. 67 is set to communication mode via instruction signal A3150, reception device 150 begins performing communication, and at this time, the zoom (enlarging (and/or shrinking) an image) in signal processor A3302 shall be set to, for example, "an image enlargement of 1X (image is not enlarged)", which results in the widest angle. Note that when the focal length is set to the widest angle, it is highly probable that the reception state in which reception of a portion of the modulated optical signals is difficult can be avoided. With this, the advantageous effect that data reception quality can be improved can be achieved. However, in order to further improve data reception quality, the zoom value, for example, may be controlled to a suitable value.

(Supplemental Information 1)

It goes without saying that the embodiments described in the present specification may be combined with other aspects.

Moreover, the embodiments are merely examples. For example, while a modulation scheme, an error correction coding method (error correction code, code length, encode rate, etc., to be used), control information, etc., are exemplified, it is possible to carry out the present disclosure with the same configuration even when other types of a modulation scheme, an error correction coding method (error correction code, code length, encode rate, etc., to be used), control information, etc., are applied.

Regarding the modulation scheme, even when a modulation scheme other than the modulation schemes described herein is used, it is possible to carry out the embodiments and the other subject matter described herein. For example, amplitude phase shift keying (APSK) (such as 16APSK, 64APSK, 128APSK, 256APSK, 1024APSK and 4096APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4QAM, 8QAM, 16QAM, 64QAM, 128QAM, 256QAM, 1024QAM and 4096QAM) may be applied, or in each modulation scheme, uniform mapping or non-uniform mapping may be performed. Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described herein.

In the present specification, conceivable devices that include the radio device described in the present specification include a communications and broadcast apparatus, such as a broadcast station, a base station, an access point, a terminal or a mobile phone, or a communication apparatus such as a television, a radio, a terminal, a personal computer, a mobile phone, an access point, or a base station. Moreover, the radio device described in the present specification is conceivably a device having communication functions that is connectable via some interface to a device for executing an application in, for example, a television, a radio, a personal computer or a mobile phone.

In the present specification, conceivable devices that include the receiver described in the present specification include a communications and broadcast apparatus, such as a broadcast station, a base station, an access point, a terminal or a mobile phone, or a communication apparatus such as a television, a radio, a terminal, a personal computer, a mobile phone, an access point, or a base station.

Moreover, in the radio communication via radio waves according to this embodiment, symbols other than data symbols, such as pilot symbols (preamble, unique word, post-amble, reference symbol, etc.) or symbols for control information, may be arranged in any way in a frame. Here, the terms "pilot symbol" and "control information symbol" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being periodic), and the receiver detects, for example, frequency synchronization, time synchronization, and a channel estimation (channel state information (CSI)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the modulation scheme, error correction encoding scheme, or encode rate of the error correction encoding scheme used in the communication, or settings information in an upper layer).

(Supplemental Information 2)

Methods based on specifications stipulated by Moving Picture Experts Group (MPEG) 2, H.264/Advanced Video Coding (AVC), H.265/High. Efficiency Video Coding (HEVC), VC-1, VP8, and VP9, etc., may be used as the video encoding method described in the above embodiments. However, a video encoding method different from the above examples may be used as the video encoding method described in the above embodiments.

Note that the present disclosure is not limited to the above embodiments; various modifications can be applied to them. For example, the above embodiments are implemented as a communication device, but this example is not limiting; the embodiments may be realized as a communication method implemented as software, hardware, or software paired with hardware.

Note that a program for executing the above-described communication method, transmission method, or reception method may be stored in read only memory (ROM) in advance to cause a central processing unit (CPU) to operate this program.

Moreover, the program for executing the communication method, transmission method, or reception method may be stored in a computer-readable storage medium, the program stored in the recording medium may be recorded in random access memory (RAM) in a computer, and the computer may be caused to operate according to this program.

Each functional block of each of the above-described embodiments, etc., may be partially or entirely realized as a large scale integration (LSI) circuit, which is an integrated circuit. Each process described in each of the above embodiments may be controlled partially or entirely by one LSI circuit or a combination of LSI circuits. These LSI circuits may be formed as separate chips, or may be formed as one chip so as to include the entire configuration or part of the functional block. The LSI circuit may include a data input and a data output. The term "LSI circuit" is used here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used. The present disclosure may be implemented as digital processing or analog processing. Furthermore, if an integrated circuit technology that replaces LSI emerges as semiconductor technology advances or when a derivative technology is established, it goes without saying that the functional blocks may be integrated by using such technology. Implementation of biotechnology, for example, is a possibility.

(Supplemental Information 3)

Note that at least one of the field programmable gate array (FPGA) and central processing unit (CPU) may be configured to be able to download all or part of software required for implementing the communication method, transmission method, or reception method described in the present disclosure via wireless or wired communication, and moreover may be configured to be able to download all or part of software for receiving updates via wireless or wired communication. The downloaded software may be stored in storage, and the digital signal processing described in the present disclosure may be implemented by operating at least one of the FPGA and CPU based on the stored software.

Here, a device including at least one of the FPGA and CPU may connect to a communications modem over a wired or wireless connection, and the device and communications modem may implement the communications method, transmission method, or reception method described in the present disclosure.

For example, a communication device (transmission device or reception device) such as the base station, AP, and terminal described in the present specification may include at least one of the FPGA and the CPU, and include an interface for obtaining, from an external source, software for operating at least one of the FPGA and the CPU. Furthermore, the communication device may include storage for storing software obtained from an external source, and may implement the signal processing described in the present disclosure by operating the FPGA and/or CPU based on the stored software.

The transmission device described in the present specification may be included in a first automobile or vehicle, and the reception device described in the present specification may be included in a second automobile or vehicle, and the transmission and receiving of data may be implemented under such a configuration.

The transmission device or part of the functions of the transmission device described in the present specification may be connected to the first automobile or vehicle via an interface, and the reception device or part of the functions of the reception device described in the present specification may be connected to the second automobile or vehicle via an interface, and the transmission of data may be implemented via transmission and reception thereby.

The transmission device described in the present specification may be included in a first automobile or vehicle, and the transmission and receiving of data between this transmission device and the reception device described in the present specification may be implemented under such a configuration.

The reception device described in the present specification may be included in a second automobile or vehicle, and the transmission and receiving of data between this reception device and the transmission device described in the present specification may be implemented under such a configuration.

Furthermore, the transmission device or part of the functions of the transmission device described in the present specification may be connected to the first automobile or vehicle via an interface, and the transmission and receiving of data between this string of transmission devices and the reception device described in the present specification may be implemented under such a configuration.

The reception device or part of the functions of the reception device described in the present specification may be connected to the second automobile or vehicle via an interface, and the transmission and receiving of data between this string of reception devices and the transmission device described in the present specification may be implemented under such a configuration.

When the automobile or vehicle includes the transmission device or part of the transmission device described in the present specification, or when the automobile or vehicle and the transmission device described in the present specification or part of the functions of the transmission device described in the present specification are connected via an interface, the light source included in the transmission device described in the present specification may be a light source included in the automobile or vehicle.

Figure 68:
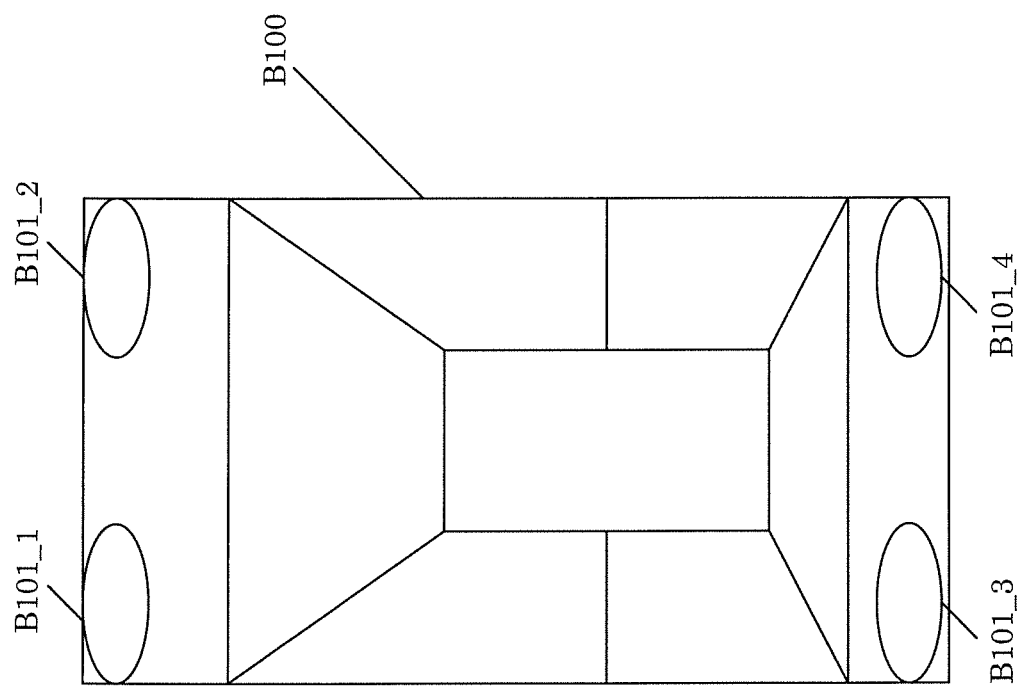
FIG. 68 illustrates one example of a plurality of light sources included in a vehicle.

For example, automobile B100 illustrated in FIG. 68 includes light sources B101_1, B101_2, B101_3, and B101_4, and one or more of these light sources may be the light source to be used by the transmission device according to the present specification for transmitting the modulated optical signal.

Moreover, the function for selecting which light source among the plurality of light sources included in automobile B100 the transmission device according to the present specification uses for transmitting the modulated optical signal may be included in the transmission device or a device connected to the transmission device. Moreover, the brightness of the light source, the angle of emission of the light source, the positioning of the light source may be configurable.

When the automobile or vehicle includes the reception device or part of the reception device described in the present specification, or when the automobile or vehicle and the reception device described in the present specification or part of the functions of the reception device described in the present specification are connected via an interface, the light receiver included in the reception device described in the present specification may be a light receiver included in the automobile or vehicle (for example, an image sensor or photodiode).

Figure 69:
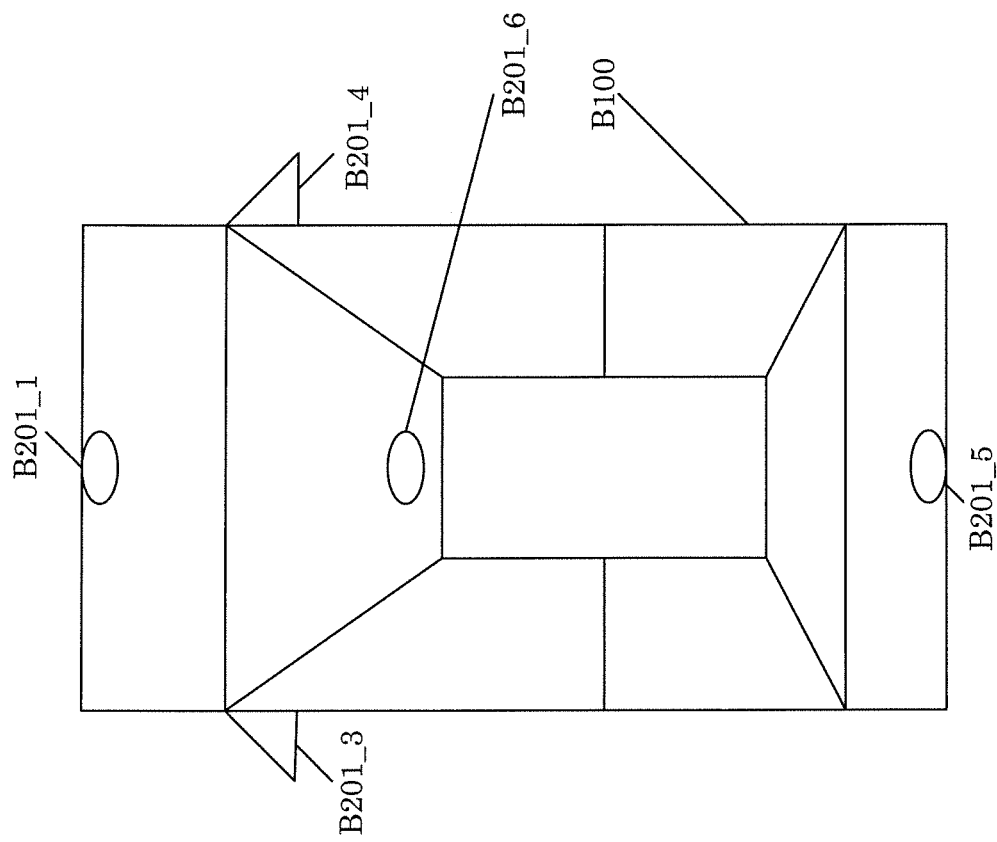
FIG. 69 illustrates one example of a plurality of light receivers included in a vehicle.

For example, automobile B100 illustrated in FIG. 69 includes light receivers B201_1, B201_2, B201_3, B201_4, B201_5, and B201_6, and one or more of these light receivers may be the light receiver to be used by the reception device according to the present specification for receiving the modulated optical signal.

Moreover, the function for selecting which light receiver among the plurality of light receivers included in automobile B100 the reception device according to the present specification uses for receiving the modulated optical signal may be included in the reception device or a device connected to the reception device. Moreover, the angle of the light receiver and the positioning of the light receiver may be configurable.

Furthermore, the reception device described in the present specification may display, on the front panel included in the automobile or in the cockpit of the vehicle, a notification indicating that data has been received. Moreover, the reception device described in the present specification may notify a user that data has been received by vibrating the steering wheel of, for example, the automobile, or vibrating a vibrator included on the steering wheel.

(Supplemental Information 4)

In the present specification, a server may provide an application related to processes pertaining to the reception device, and the functions of the reception device according to the present specification may be implemented by the terminal installing the application. Note that the application may be provided to the terminal by the communication device including in the transmission device according to the present specification connecting to a server over a network, and may be provided to the terminal by a communication device including a different transmission function connecting to a server over a network.

Similarly, in the present specification, a server may provide an application related to processes pertaining to the transmission device, and the functions of the transmission device according to the present specification may be implemented by the terminal installing the application. Note that a method in which the application is provided to a different communication device by the communication device connecting to a server over a network is conceivable.

Moreover, a server may provide software related to the light source included in the transmission device and the light receiver included in the reception device, and transmission and reception of the modulated optical signal by the light source included in the transmission device and the light receiver included in the reception device, respectively, may be supported by obtaining this software.

Furthermore, the transmission device according to the present specification may function as a server, and an application included in the transmission device may be provided to the communication device using some communication means, and the reception device according to the present specification can be implemented by the application obtained by the communication device downloading the application.

Note that in the present specification, there is reference to a "lamp" and a "light source", but the method may be a method of a projector or display displaying, for example, an image, a video, or advertisement, and the modulated optical signal being included in that light. In other words, the "lamp" and the "light source" may include functions other than the emission of light. Moreover, the "lamp" and the "light source" may comprise a plurality of lamps and light sources, respectively.

Furthermore, the transmission method used by the communication device that generates a modulated optical signal and emits light may be a method other than the transmission method described in the present specification. Moreover, the modulated optical signal may include information other than what is described in the present specification.

Moreover, the lamp and/or light source, such as an LED lamp and/or light source, may itself include the functions of the transmission device described in the present specification.

Furthermore, the transmission device and the reception device disclosed in the present specification are exemplified as, but not limited to being equipped in a vehicle. The transmission device and the reception device may be equipped in something other than a vehicle, and may be provided as stand-alone units. Even in such cases, the operations described n the present specification can be implemented and the same advantageous effects can be achieved.

(Supplemental Information 5)

The communication device and reception device according to the present disclosure may be implemented as any one of the aspects according to Embodiments 1 through 11.

In other words, a first communication device according to one aspect of the present disclosure includes: a light receiver that receives a first optical signal and a second optical signal and generates a reception signal, the first optical signal transmitting first identifier information indicating an identifier of the first communication device, and the second optical signal transmitting second identifier information indicating an identifier of a second communication device; a demodulator that demodulates the reception signal to obtain the first identifier information and the second identifier information;

a camera that captures a region including the first optical signal and the second optical signal to obtain video data or still image data; a controller that selects, based on the video data or still image data, one of the first identifier information or the second identifier information; and a communicator that communicates with a communication device corresponding to the selected identifier information.

A second communication device according to one aspect of the present disclosure includes: a light receiver that captures a predetermined region to obtain a reception signal for demodulating an optical signal emitted to the predetermined region and video data or still image data for use in image processing: a demodulator that demodulates the image data to obtain a plurality of items of identifier information indicating identifiers of other corresponding communication devices; a controller that selects, based on the video data or still image data, one item of identifier information from among the plurality of items of identifier information; and a communicator that wirelessly communicates with another communication device that corresponds to the selected identifier information.

A first reception device according to one aspect of the present disclosure includes: a first light receiver that receives a first optical signal and a second optical signal and generates an optical reception signal, the first optical signal transmitting first identifier information indicating an identifier of a first communication device and the second optical signal transmitting second identifier information indicating an identifier of a second communication device; a demodulator that demodulates the optical reception signal to obtain the first identifier information and the second identifier information; a second light receiver that obtains video data or still image data in which a region including the first optical signal and the second optical signal is captured; and a controller that selects, based on the video data or the still image data, one of the first identifier information or the second identifier information.

A second reception device according to one aspect of the present disclosure includes: a light receiver that receives a first optical signal and a second optical signal and generates a reception signal, the first optical signal transmitting first identifier information indicating an identifier of a first communication device and the second optical signal transmitting second identifier information indicating an identifier of a second communication device; a demodulator that demodulates the reception signal to obtain the first identifier information and the second identifier information; a camera that captures a region including the first optical signal and the second optical signal to obtain video data or still image data; and an analyzer that analyzes the video data or the still image data to generate relative position information indicating a positional relationship between a first transmitter that transmitted the first optical signal and a second transmitter that transmitted the second optical signal.

A third reception device according to one aspect of the present disclosure includes: a light receiver that uses an image sensor to receive a first optical signal and a second optical signal and generates a reception signal, the first optical signal transmitting first identifier information indicating an identifier of a first communication device, the second optical signal transmitting second identifier information indicating an identifier of a second communication device; a demodulator that demodulates the reception signal to obtain the first identifier information and the second identifier information; and an analyzer that generates first position information indicating a position of a first transmitter that transmitted the first optical signal and second position information indicating a position of a second transmitter that transmitted the second optical signal.

A fourth reception device according to one aspect of the present disclosure includes: a light receiver that captures a predetermined region to obtain a reception signal for demodulating an optical signal emitted to the predetermined region and video data or still image data for use in image processing; a demodulator that demodulates the reception signal to receive demodulated data; and an analyzer that analyzes the video data or still image data to generate attribute information indicating an attribute of a transmitter that transmitted an optical signal corresponding to the demodulated data.

Moreover, the reception device according to the present disclosure may be in accordance with one of the aspects according to Embodiments 8 through 11.

In other words, a reception device according to one aspect of the present disclosure includes: an image sensor that captures an image; and a reception unit configured to sample a plurality of pixels included in each of N regions included in an imaging surface of the image sensor to receive, in parallel, N optical signals that are mutually different and transmitted from a plurality of light sources, where N is an integer greater than or equal to two. For example, as illustrated in FIG. 42, the reception device performs line scan sampling on each of the regions A, B, C, and D to receive, in parallel, mutually different optical signals from light sources corresponding to the regions.

This makes it possible for the reception device to securely obtain information such as an SSID by receiving an optical signal. Moreover, since a plurality of mutually different optical signals transmitted from a plurality of light sources are received in parallel, the advantageous effect that data transmission speed increases is achieved.

Moreover, the reception device may further include at least one lens and a lens controller that controls the at least one lens. The lens controller may control the at least one lens to project light from each of the plurality of light sources onto the image sensor via the at least one lens. For example, the lens controller may control a focal length of the at least one lens. Specifically, the at least one lens is, for example, lens (group) A3101 illustrated in FIG. 64 through FIG. 67, and the lens controller is, for example, lens controller A3108 illustrated in FIG. 64 through FIG. 67. Moreover, as a result of the control of the focal length by the lens controller, for example, the reception state illustrated in FIG. 56 and FIG. 63 changes to, for example, the reception state illustrated in FIG. 59 and FIG. 60. Note that aperture and focus may also be controlled in addition to focal length.

With this, it is possible to achieve the advantageous effect that high data reception quality can be achieved.

Moreover, each of the optical signals respectively transmitted from the plurality of light sources may include signal count information related to the total number of the optical signals transmitted from the plurality of light sources, the reception device may further include a recognition unit configured to recognize a reception state of the N optical signals, the recognition unit may be configured to recognize the reception state based on (i) a value of N denoting the total number of the optical signals received by the reception unit and (ii) the signal count information included in each of the optical signals received by the reception unit, and the lens controller may control the focal length of the at least one lens based on the reception state recognized by the recognition unit. For example, the recognition unit may be configured to determine whether or not the reception state is a state in which all of the optical signals transmitted from the plurality of light sources have been received by the reception unit, based on (i) the value of N denoting the total number of the optical signals received by the reception unit and (ii) the total number of the optical signals indicated by the signal count information, and the lens controller may control the at least one lens to reduce the focal length of the at least one lens when the recognition unit determines that not all of the optical signals have been received by the reception unit. Specifically, the signal count information is, for example, information included in symbol A2403 including information related to the number of modulated optical signals transmitted illustrated in FIG. 57 and FIG. 58. Moreover, the recognition unit is, object recognition unit A3105 illustrated in FIG. 64 through FIG. 67.

With this, whether or not all of the optical signals transmitted from the plurality of light sources have been received or not is determined based on the value of N denoting the total number of the optical signals received and the number of optical signals indicated in the signal count information. When not all of the optical signals have been received, the focal length of the at least one lens is shortened. As a result, the angle of view widens, which makes it possible to project all of the light from the plurality of light sources onto the image sensor and receive all of the optical signals. Accordingly, it is possible to achieve a high data reception quality.

INDUSTRIAL APPLICABILITY

In one aspect, the present disclosure is applicable as an optical communication system.

The invention claimed is:

1. A reception device, comprising:
an image sensor that captures an image;
reception circuitry configured to sample a plurality of pixels included in each of N regions included in an imaging surface of the image sensor to receive, in parallel, N optical signals that are mutually different and transmitted from a plurality of light sources, where N is an integer greater than or equal to two;
at least one lens; and
a lens controller that controls the at least one lens,
wherein the lens controller controls the at least one lens to project light from each of the plurality of light sources onto the image sensor via the at least one lens,
wherein the lens controller controls a focal length of the at least one lens,
wherein each of the optical signals respectively transmitted from the plurality of light sources includes signal count information related to a total number of the optical signals transmitted from the plurality of light sources,
the reception device further comprises recognition circuitry configured to recognize a reception state of the N optical signals,
the recognition circuitry is configured to recognize the reception state based on (i) a value of N denoting a total number of the optical signals received by the reception circuitry and (ii) the signal count information included in each of the optical signals received by the reception circuitry, and
the lens controller controls the focal length of the at least one lens based on the reception state recognized by the recognition circuitry.

2. The reception device according to claim 1,
wherein the recognition circuitry is configured to determine whether or not the reception state is a state in which all of the optical signals transmitted from the plurality of light sources have been received by the reception circuitry, based on (i) the value of N denoting the total number of the optical signals received by the reception circuitry and (ii) the total number of the optical signals indicated by the signal count information, and
the lens controller controls the at least one lens to reduce the focal length of the at least one lens when the recognition circuitry determines that not all of the optical signals have been received by the reception circuitry.

3. A reception method, comprising:
capturing an image via an image sensor; and
sampling a plurality of pixels included in each of N regions included in an imaging surface of the image sensor to receive, in parallel, N optical signals that are mutually different and transmitted from a plurality of light sources, where N is an integer greater than or equal to two; and
controlling at least one lens to project light from each of the plurality of light sources onto the image sensor via the at least one lens,
wherein the controlling of the at least one lens includes controlling a focal length of the at least one lens,
wherein each of the optical signals respectively transmitted from the plurality of light sources includes signal count information related to a total number of the optical signals transmitted from the plurality of light sources,
the reception method further includes recognizing a reception state of the N optical signals based on (i) a value of N denoting a total number of the optical signals received and (ii) the signal count information included in each of the optical signals received, and
the controlling of the at least one lens includes controlling the focal length of the at least one lens based on the reception state recognized.

4. The reception method according to claim 3,
wherein the recognizing of the reception state includes determining whether or not the reception state is a state in which all of the optical signals transmitted from the plurality of light sources have been received, based on (i) the value of N denoting the total number of the optical signals received and (ii) the total number of the optical signals indicated by the signal count information, and
the controlling of the at least one lens includes controlling the at least one lens to reduce the focal length of the at least one lens when the recognizing of the reception state determines that not all of the optical signals have been received.

5. A receiving device, comprising:
a lens;
an image sensor that, in operation, captures at least an optical signal among N optical signals through the lens to generate a received signal, where N is an integer greater than or equal to two, the N optical signals being transmitted from a plurality of light sources; and
a processor that, in operation, performs:
when any optical signal among the N optical signals is not included in the received signal, controlling the lens to include the N optical signals in the received signal; and
demodulating the N optical signals,
wherein each of the N optical signals includes information indicating a value of N denoting a number of the optical signals transmitted in parallel.

6. A receiving method, comprising:

capturing, by an image sensor, at least an optical signal among N optical signals through a lens to generate a received signal, where N is an integer greater than or equal to two, the N optical signals being transmitted from a plurality of light sources;

when any optical signal among the N optical signals is not included in the received signal, controlling the lens to include the N optical signals in the received signal; and demodulating the N optical signals, wherein each of the N optical signals includes information indicating a value of N denoting a number of the optical signals transmitted in parallel.

* * * * *